(12) United States Patent
Hwang et al.

(10) Patent No.: US 9,780,981 B2
(45) Date of Patent: Oct. 3, 2017

(54) APPARATUS FOR TRANSMITTING BROADCAST SIGNALS, APPARATUS FOR RECEIVING BROADCAST SIGNALS, METHOD FOR TRANSMITTING BROADCAST SIGNALS AND METHOD FOR RECEIVING BROADCAST SIGNALS

(71) Applicant: LG Electronics Inc., Seoul (KR)

(72) Inventors: Jaeho Hwang, Seoul (KR); Woosuk Ko, Seoul (KR); Sungryong Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/357,843

(22) Filed: Nov. 21, 2016

(65) Prior Publication Data

US 2017/0126448 A1 May 4, 2017

Related U.S. Application Data

(63) Continuation of application No. 14/989,487, filed on Jan. 6, 2016, now Pat. No. 9,537,696, which is a (Continued)

(51) Int. Cl.
*H04L 27/00* (2006.01)
*H04L 27/26* (2006.01)
(Continued)

(52) U.S. Cl.
CPC ......... *H04L 27/2602* (2013.01); *H04H 20/33* (2013.01); *H04H 20/42* (2013.01);
(Continued)

(58) Field of Classification Search
CPC ... H04L 1/0071; H04L 5/0053; H04L 5/0007; H04L 27/2602; H04L 1/0072; H04L 5/0044; H04L 27/2626; H04L 1/0058; H04L 1/0625; H04L 49/201; H04B 7/0413; H04N 21/2383; H04N 21/23614; H04N 21/440227
See application file for complete search history.

(56) References Cited

U.S. PATENT DOCUMENTS 8,135,020 B1    3/2012  Zhang et al.
8,873,679 B2 *  10/2014 Yokokawa ............ H04H 40/18
                                                    375/316
(Continued)

FOREIGN PATENT DOCUMENTS

JP       2004088758 A    3/2004
KR      20130122756 A   11/2013

*Primary Examiner* — Khanh C Tran
(74) *Attorney, Agent, or Firm* — Dentons US LLP

(57) ABSTRACT

Disclosed herein is a method for sending a broadcast signal. The method includes formatting input streams into multiple data pipes (DPs). Formatting the input streams into the multiple DPs includes splitting the input streams into multiple data streams, deleting a null packet included in a data stream, and forming a baseband frame (BBF) by adding a header to the data stream. The baseband frame includes a deleted null packet (DNP) field indicative of the number of deleted null packets, and the DNP field comprises at least one of a first DNP or a second DNP.

10 Claims, 36 Drawing Sheets

Related U.S. Application Data continuation of application No. 14/540,385, filed on Nov. 13, 2014, now Pat. No. 9,264,476.

(60) Provisional application No. 61/908,169, filed on Nov. 24, 2013, provisional application No. 61/903,399, filed on Nov. 13, 2013.

(51) Int. Cl.

| | | |
|---|---|---|
| *H04L 29/06* | (2006.01) | |
| *H04N 21/20* | (2011.01) | |
| *H04N 21/2383* | (2011.01) | |
| *H04H 20/33* | (2008.01) | |
| *H04H 20/42* | (2008.01) | |
| *H04W 28/06* | (2009.01) | |
| *H04N 21/236* | (2011.01) | |
| *H04N 21/2381* | (2011.01) | |

(52) U.S. Cl.
CPC ...... *H04L 27/2627* (2013.01); *H04L 27/2649* (2013.01); *H04L 65/607* (2013.01); *H04N 21/20* (2013.01); *H04N 21/236* (2013.01); *H04N 21/2381* (2013.01); *H04N 21/2383* (2013.01); *H04W 28/065* (2013.01)

(56) References Cited

U.S. PATENT DOCUMENTS

| | | |
|---|---|---|
| 2011/0164706 A1* | 7/2011 | Yokokawa .......... H04L 27/2602 375/340 |
| 2012/0189079 A1 | 7/2012 | Taylor et al. |
| 2012/0307842 A1 | 12/2012 | Petrov et al. |
| 2012/0314762 A1 | 12/2012 | Herrmann et al. |
| 2012/0314786 A1 | 12/2012 | Atungsiri et al. |
| 2012/0327955 A1 | 12/2012 | Herrmann et al. |
| 2013/0039442 A1 | 2/2013 | Smallcomb et al. |
| 2015/0003472 A1 | 1/2015 | Hwang et al. |
| 2015/0063357 A1 | 3/2015 | Hwang et al. |
| 2015/0063490 A1 | 3/2015 | Yang et al. |
| 2015/0071373 A1 | 3/2015 | Oh et al. |

\* cited by examiner

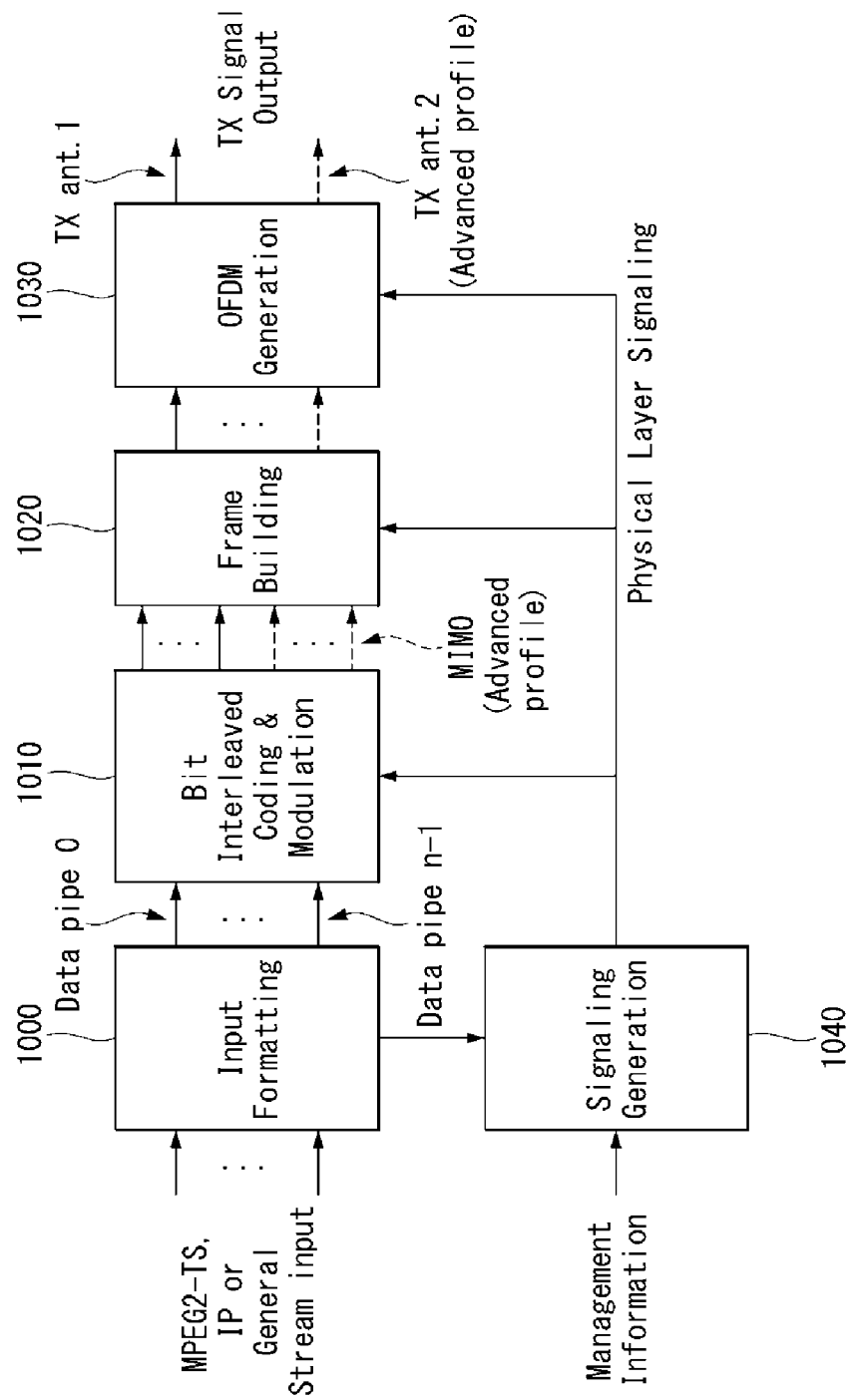
[Figure 1]

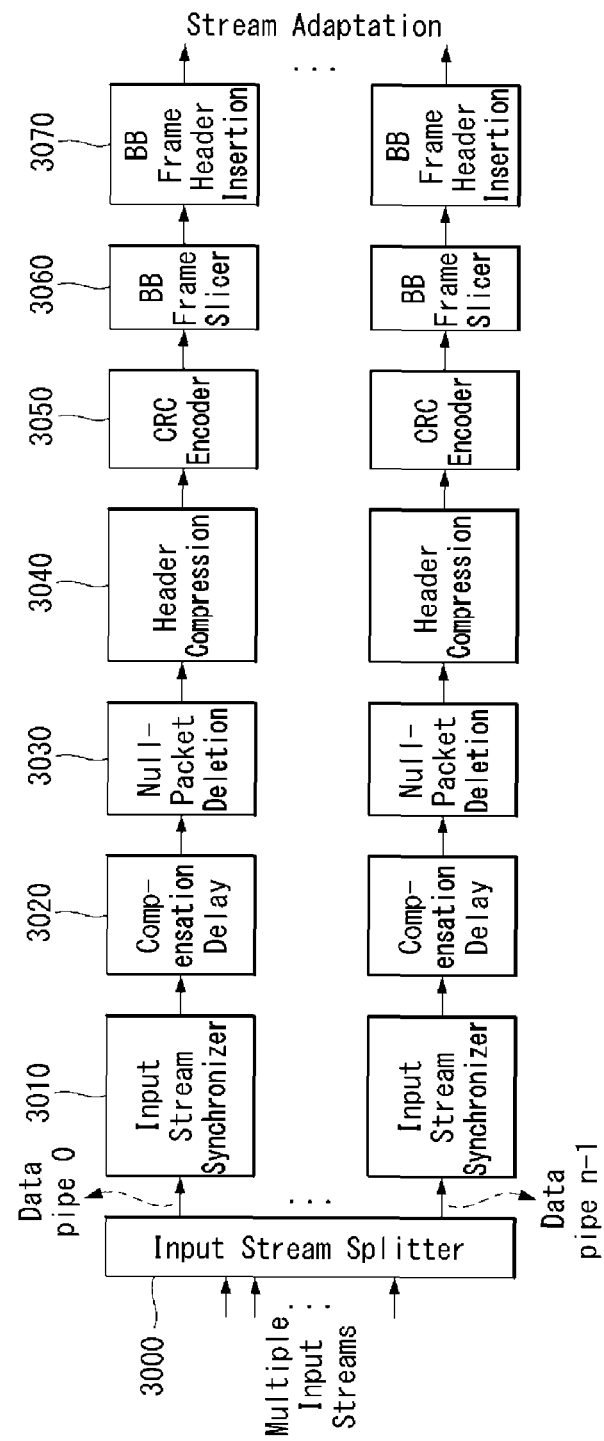

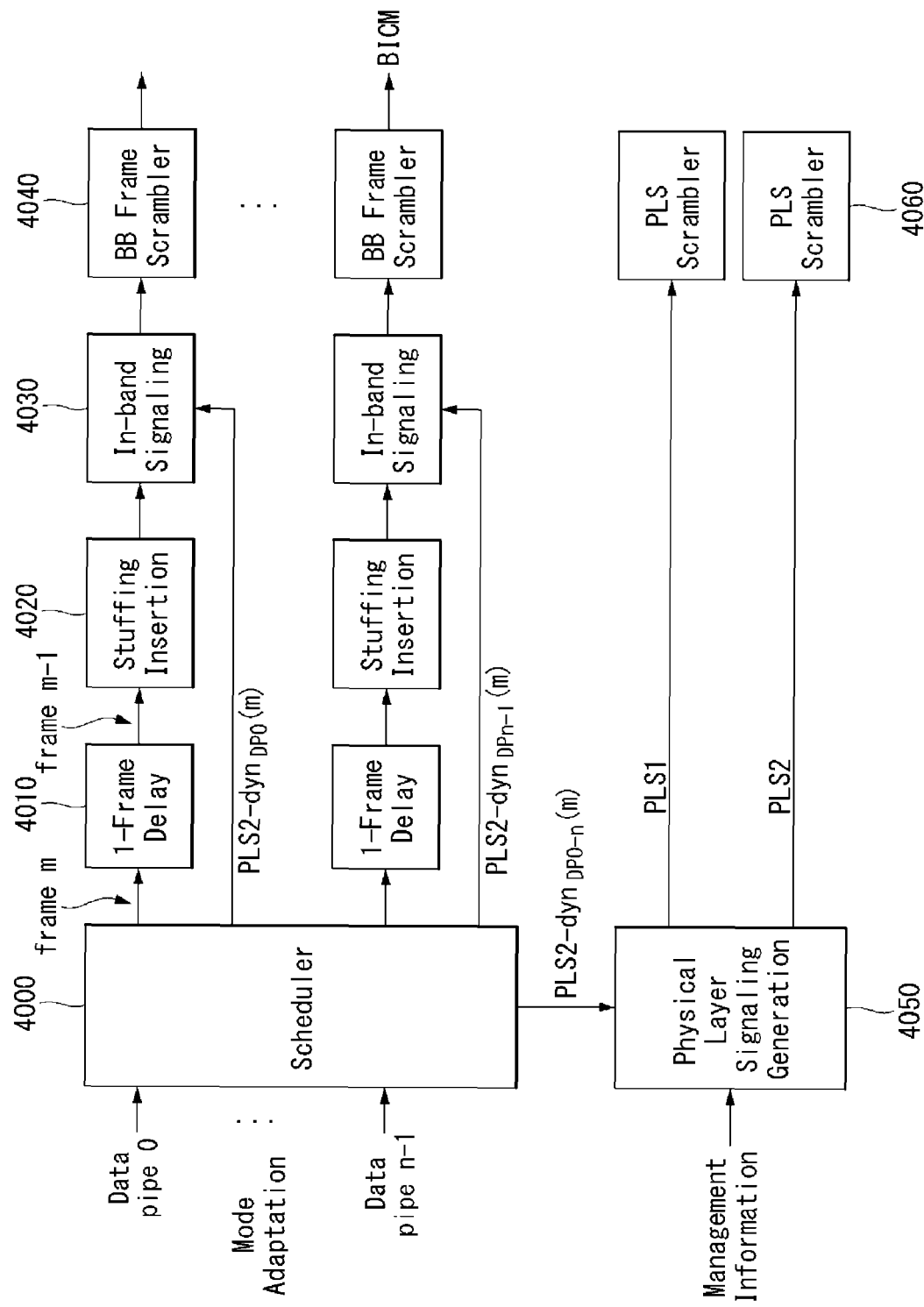

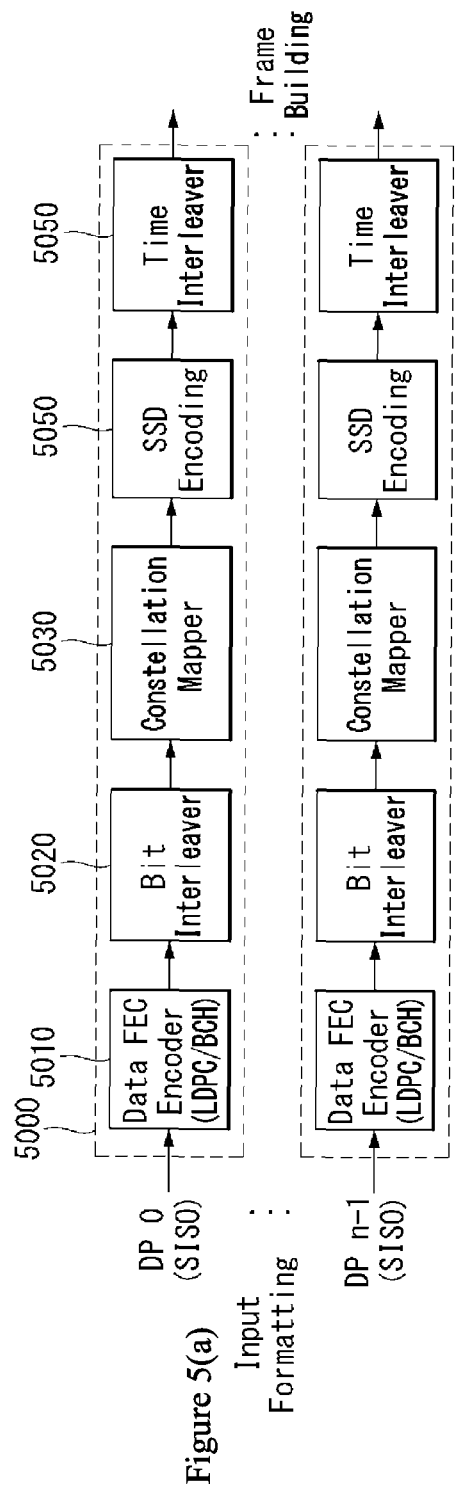
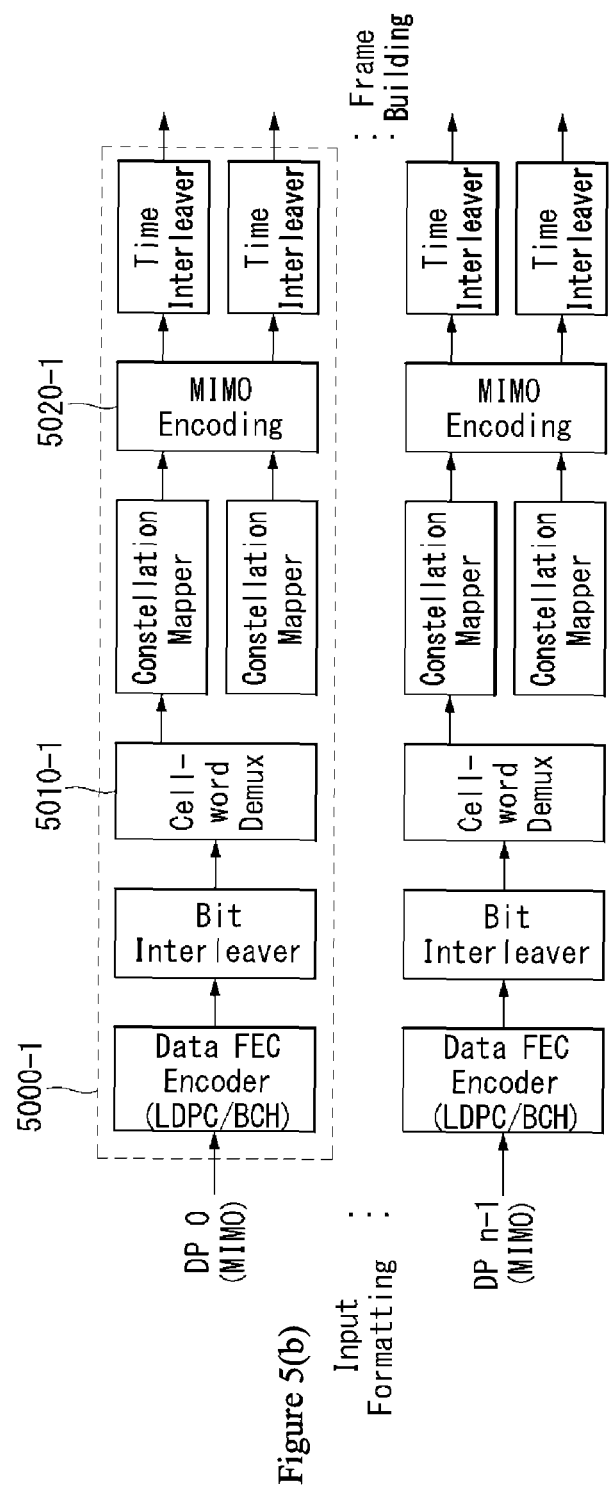
Figure 5(a)
Figure 5(b)

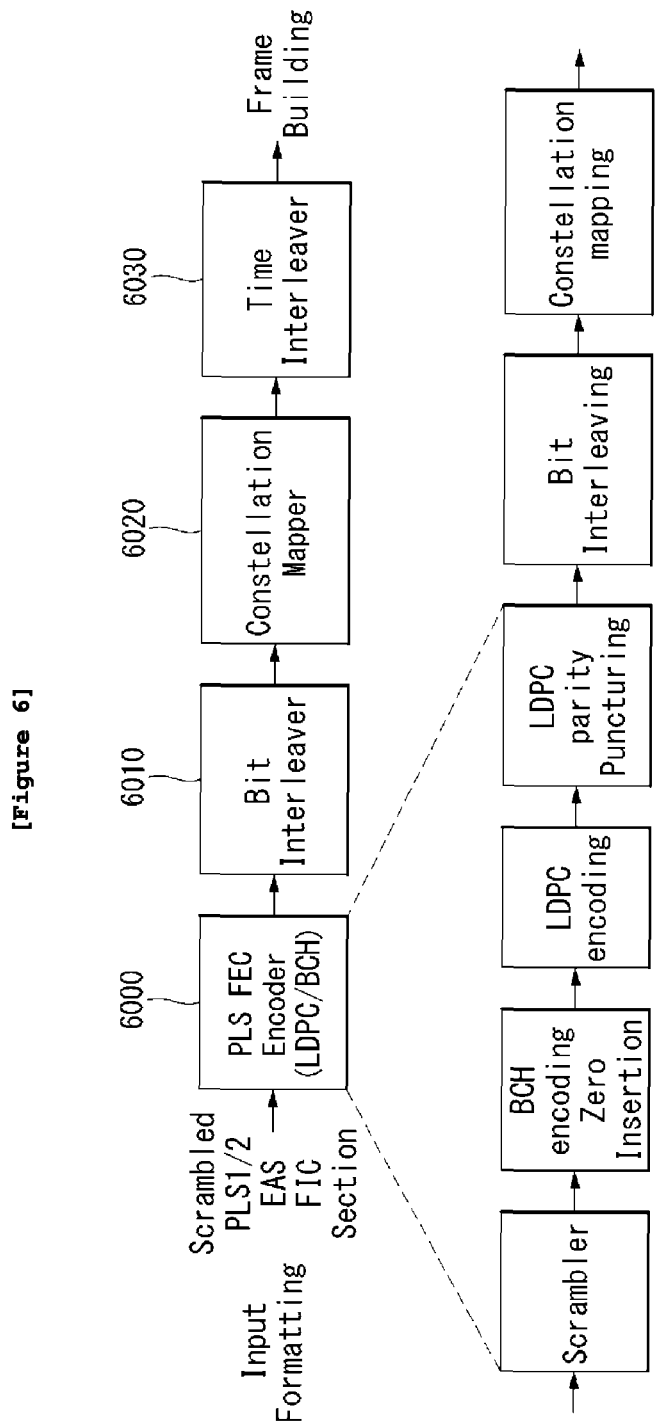

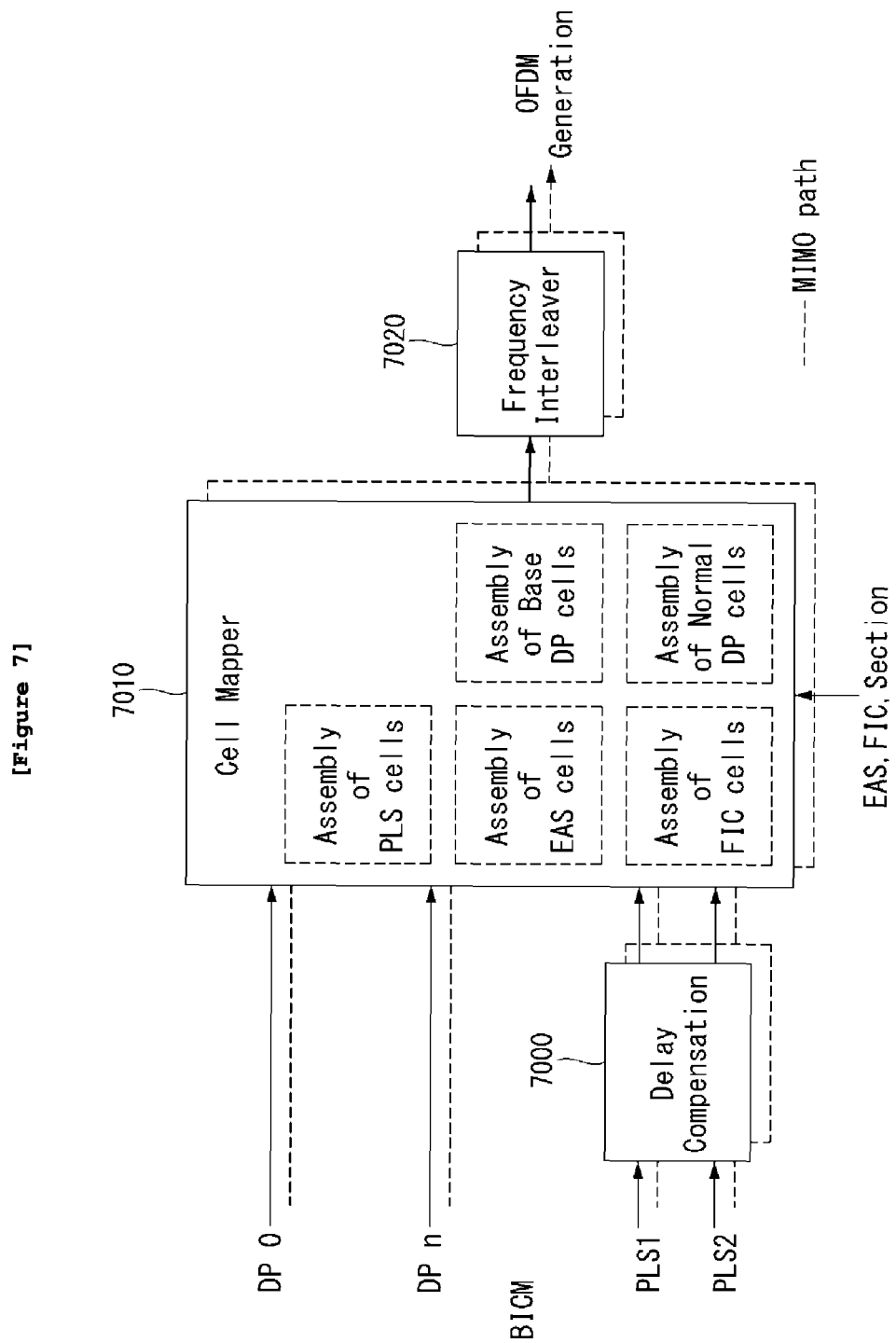

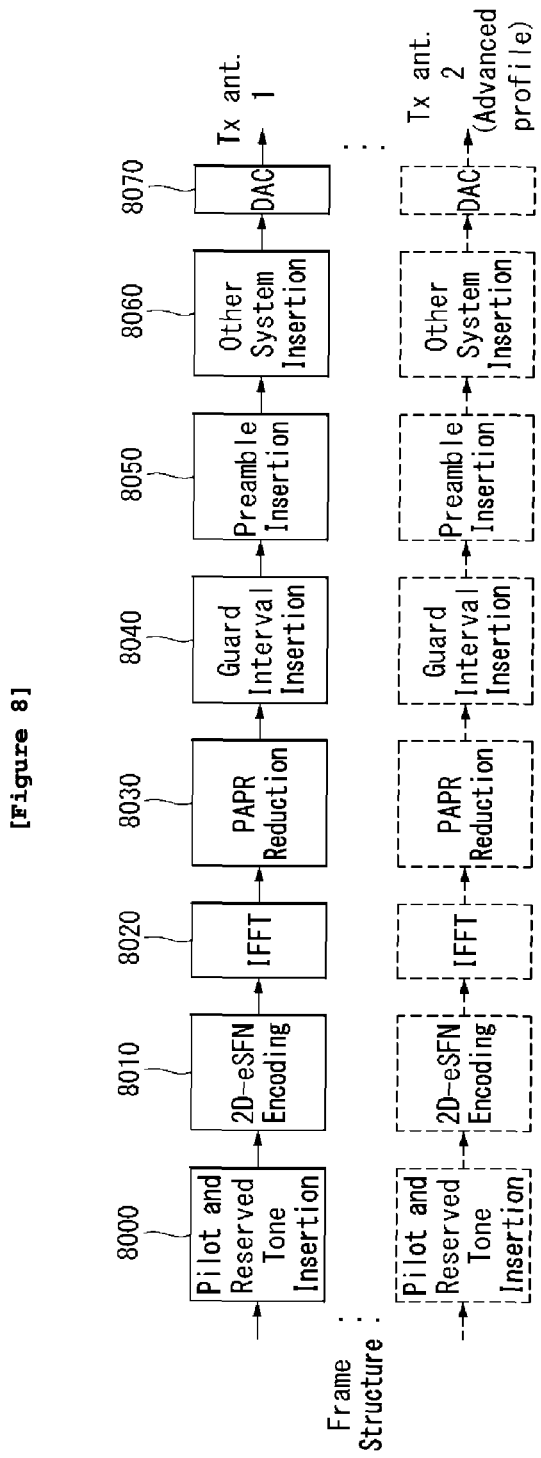
[Figure 8]

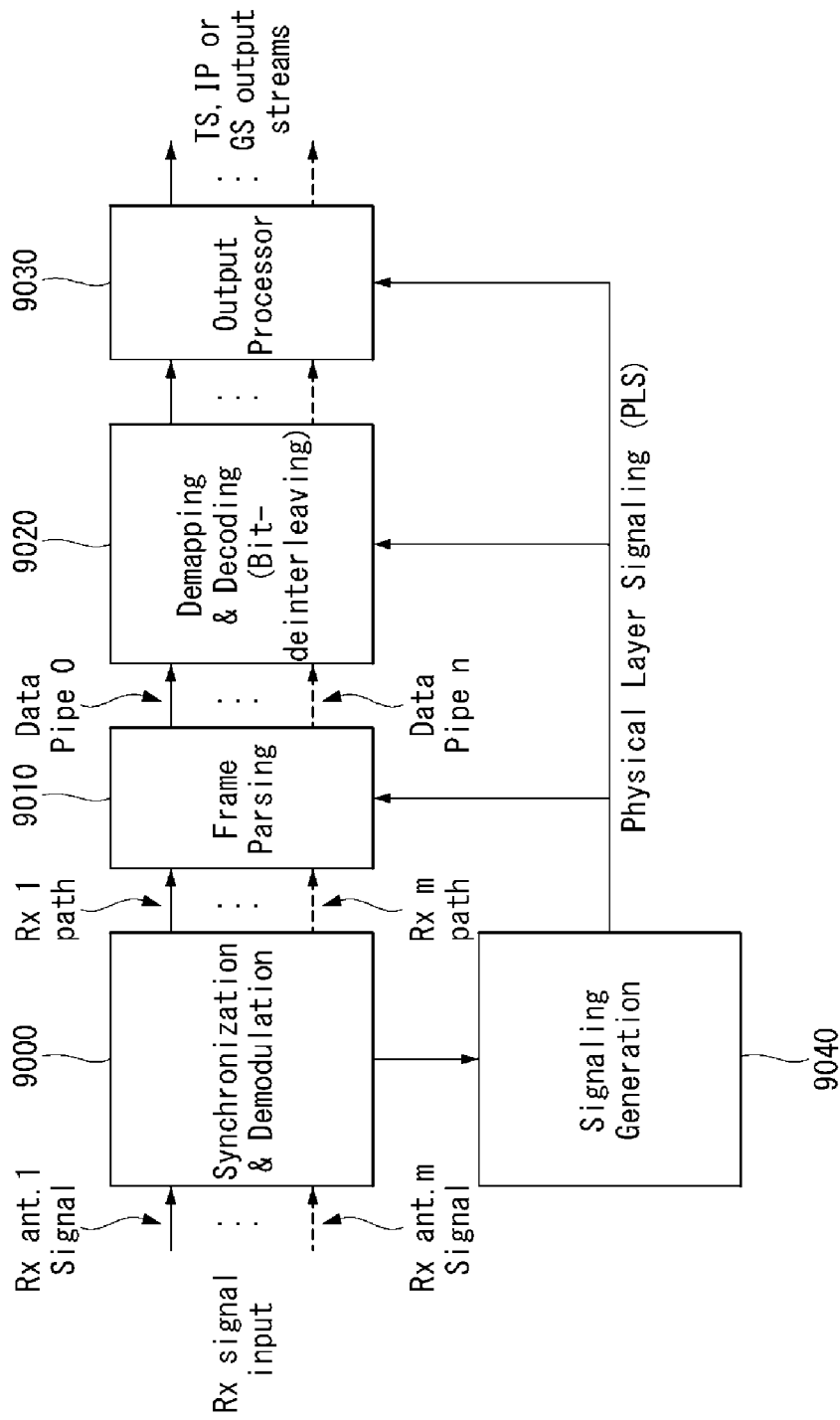

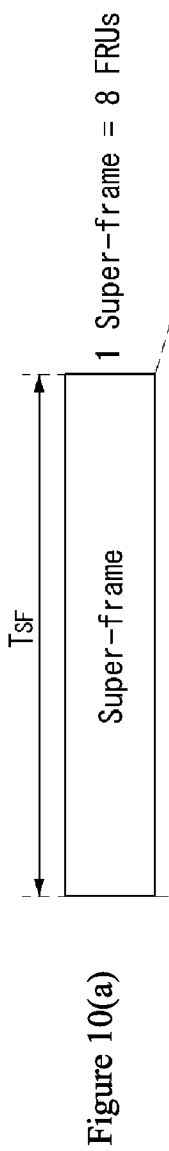
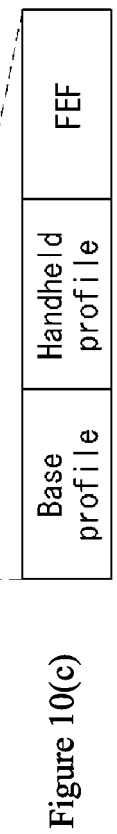
Figure 10(a)
Figure 10(b)
Figure 10(c)
Figure 10(d)

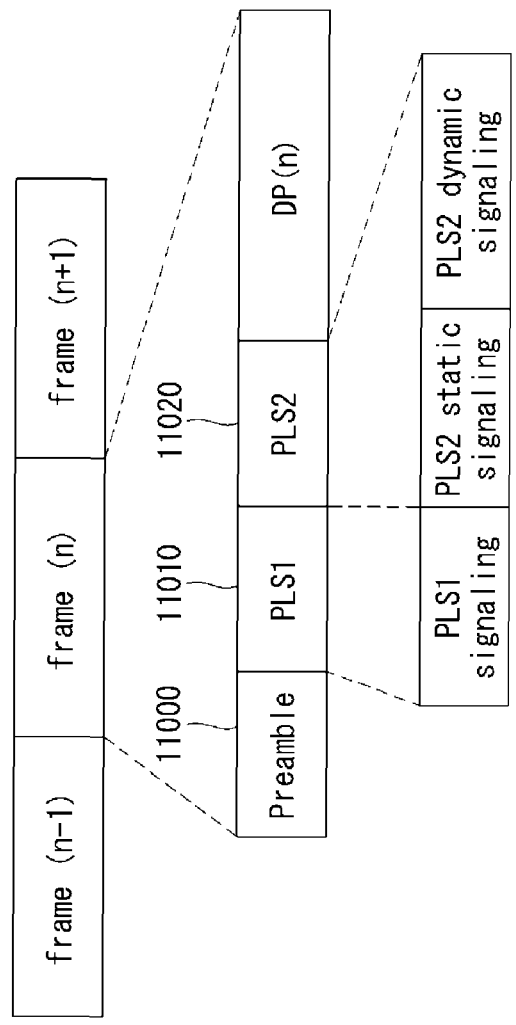

[Figure 12]

| Content | Bits |
|---|---|
| PHY_PROFILE | 3 |
| FFT_SIZE | 2 |
| GI_FRACTION | 3 |
| EAC_FLAG | 1 |
| POLOT_MODE | 1 |
| PAPR_FLAG | 1 |
| FRU_CONFIGURE | 3 |
| RESERVED | 7 |

[Figure 13]

| Content | Bits |
|---|---|
| PREAMBLE_DATA | 20 |
| NUM_FRAME_FRU | 2 |
| PAYLOAD_TYPE | 3 |
| NUM_FSS | 2 |
| SYSTEM_VERSION | 8 |
| CELL_ID | 16 |
| NETWORK_ID | 16 |
| SYSTEM_ID | 16 |
| for i = 0:3 | |
|   FRU_PHY_PROFILE | 3 |
|   FRU_FRAME_LENGTH | 2 |
|   FRU_GI_FRACTION | 3 |
|   RESERVED | 4 |
| end | |
| PLS2_FEC_TYPE | 2 |
| PLS2_MOD | 3 |
| PLS2_SIZE_CELL | 15 |
| PLS2_STAT_SIZE_BIT | 14 |
| PLS2_DYN_SIZE_BIT | 14 |
| PLS2_REP_FLAG | 1 |
| PLS2_REP_SIZE_CELL | 15 |
| PLS2_NEXT_FEC_TYPE | 2 |
| PLS2_NEXT_MOD | 3 |
| PLS2_NEXT_REP_FLAG | 1 |
| PLS2_NEXT_REP_SIZE_CELL | 15 |
| PLS2_NEXT_REP_STAT_SIZE_BIT | 14 |
| PLS2_NEXT_REP_DYN_SIZE_BIT | 14 |
| PLS2_AP_MODE | 2 |
| PLS2_AP_SIZE_CELL | 15 |
| PLS2_NEXT_AP_MODE | 2 |
| PLS2_NEXT_AP_SIZE_CELL | 15 |
| RESERVED | 32 |
| CRC 32 | 32 |

[Figure 14]

| Content | Bit |
|---|---|
| FIC_FLAG | 1 |
| AUX_FLAG | 1 |
| NUM_DP | 6 |
| for i = NUM_DP | |
| DP_ID | 6 |
| DP_TYPE | 3 |
| DP_GROUP_ID | 8 |
| BASE_DP_ID | 6 |
| DP_FEC_TYPE | 2 |
| DP_COD | 4 |
| DP_MOD | 4 |
| DP_SSD_FLAG | 1 |
| if PHY_PROFILE = '010' | |
| DP_MIMO | 3 |
| end | |
| DP_TI_TYPE | 1 |
| DP_TI_LENGTH | 2 |
| DP_TI_BYPASS | 1 |
| DP_FRAME_INTERVAL | 2 |
| DP_FIRST_FRAME_IDX | 5 |
| DP_NUM_BLOCK_MAX | 10 |
| DP_PAYLOAD_TYPE | 2 |
| DP_INBAND_MODE | 2 |
| DP_PROTOCOL_TYPE | 2 |
| DP_CRC_MODE | 2 |

| Content | Bit |
|---|---|
| if DP_PAYLOAD_TYPE==TS('00') | |
| DNP_MODE | 2 |
| ISSY_MODE | 2 |
| HC_MODE_TS | 2 |
| if HC_MODE_TS=='01' or '10' | |
| PID | 13 |
| end | |
| if DP_PAYLOAD_TYPE==IP('01') | |
| HC_MODE_IP | 2 |
| end | |
| RESERVED | 8 |
| end | |
| if FIC_FLAG == 1 | |
| FIC_VERSION | 8 |
| FIC_LENGTH_BYTE | 13 |
| RESERVED | 8 |
| end | |
| if AUX_FLAG == 1 | |
| NUM_AUX | 4 |
| AUX_CONFIG_RFU | 8 |
| for i=1:NUM_AUX | |
| AUX_STREAM_TYPE | 4 |
| AUX_PRIVATE_CONF | 28 |
| end | |
| end | |

[Figure 15]

| Content | Bit |
|---|---|
| FRAME_INDEX | 5 |
| PLS_CHANGE_COUNTER | 4 |
| FIC_CHANGE_COUNTER | 4 |
| RESERVED | 16 |
| for i = 1:NUM_DP | |
|   DP_ID | 6 |
|   DP_START | 15 (or 13) |
|   DP_NUM_BLOCK | 10 |
|   RESERVED | 8 |
| end | |
| EAC_FLAG | 1 |
| EAS_WAKE_UP_VERSION_NUM | 8 |
| if EAC_FLAG == 1 | |
|   EAC_LENGTH_BYTE | 12 |
| else | |
|   EAC_COUNTER | 12 |
| end | |
| for i = 1:NUM_AUX | |
|   AUX_PRIVATE_DYN | 48 |
| end | |
| CRC 32 | 32 |

[Figure 16]

| profile |
|---|
| Auxiliary streams |
| DPs |
| FIC |
| EAC |
| PLS2 |
| PLS1 |
| Preamble |

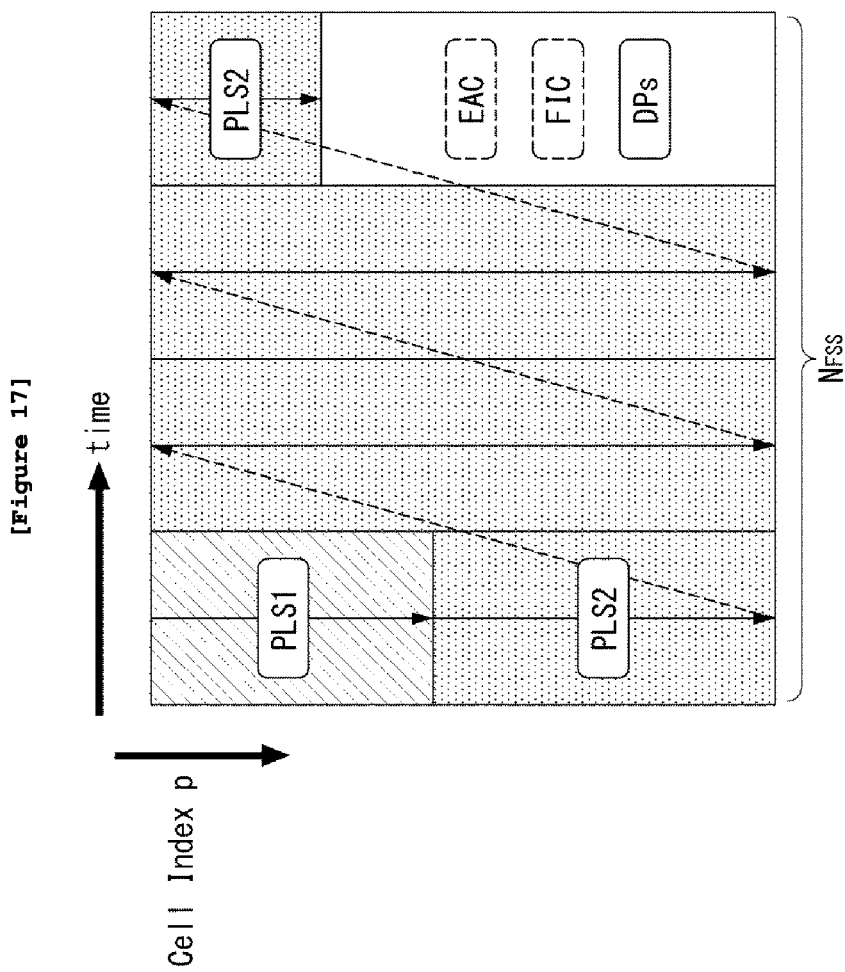
[Figure 17]

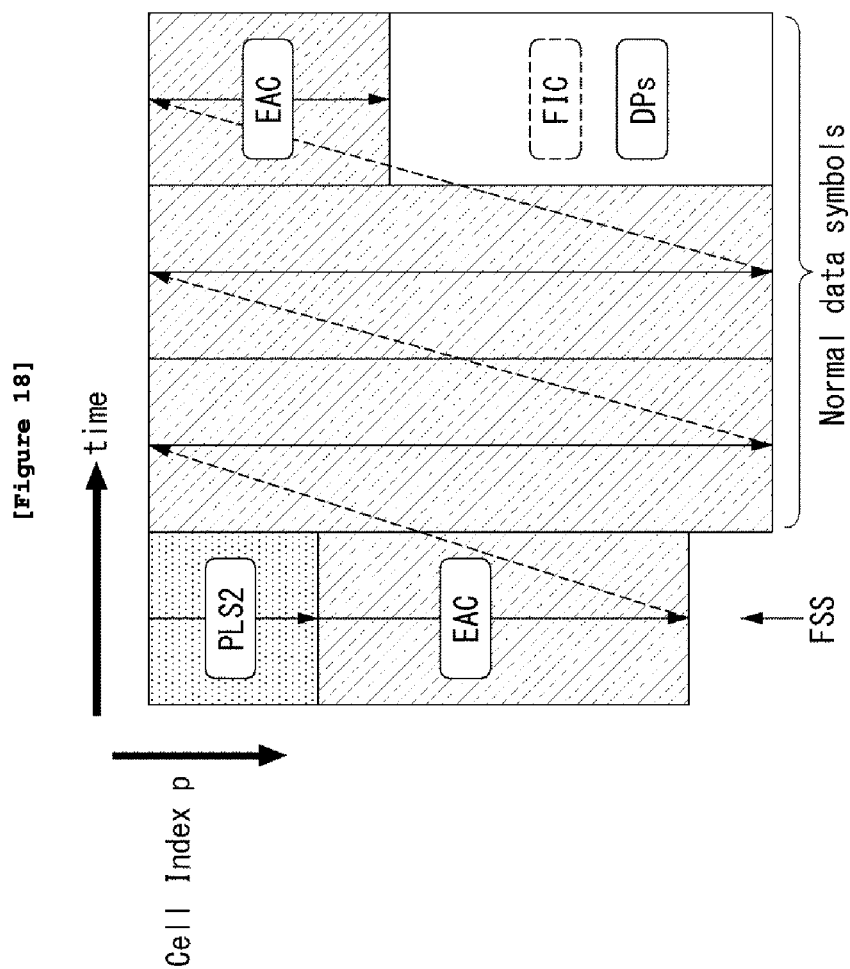
[Figure 18]

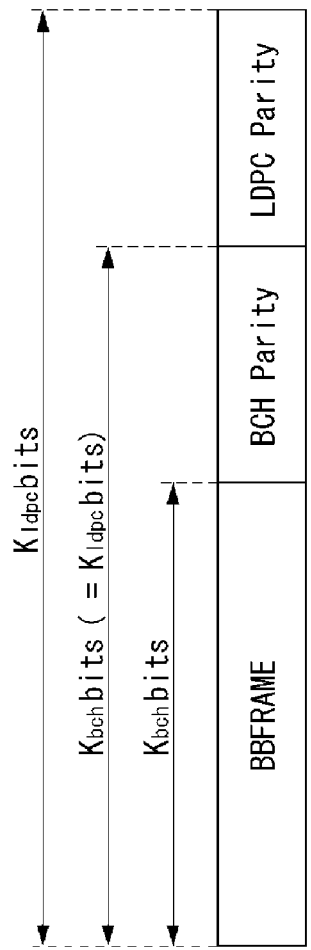
[Figure 22]

[Figure 23]
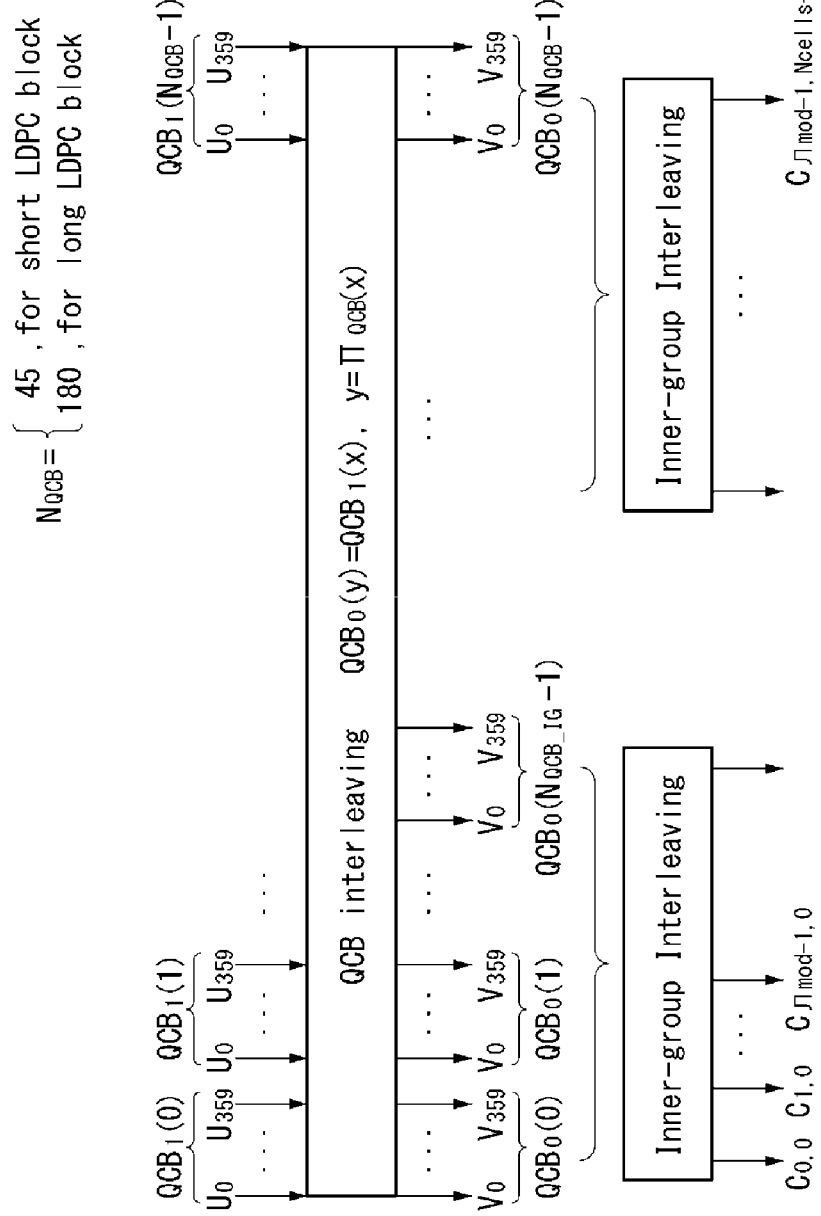

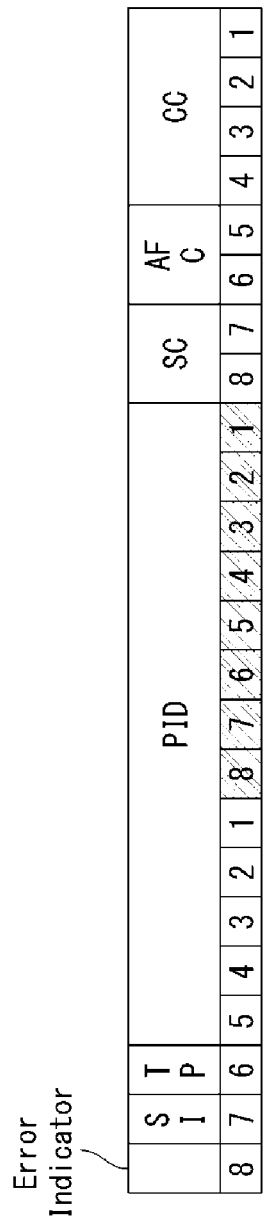
[Figure 28]

[Figure 30]
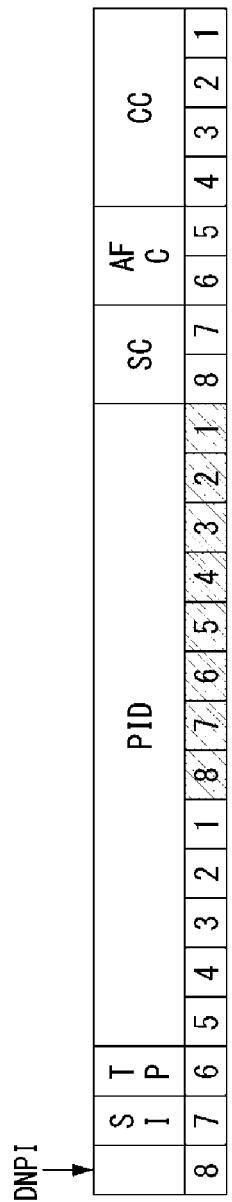

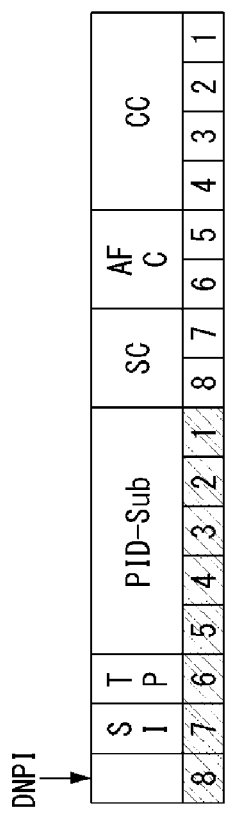
[Figure 31]

[Figure 32]
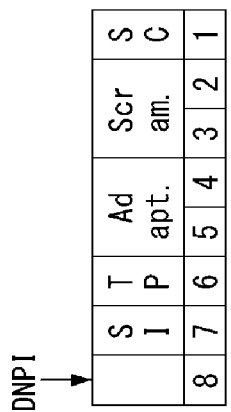

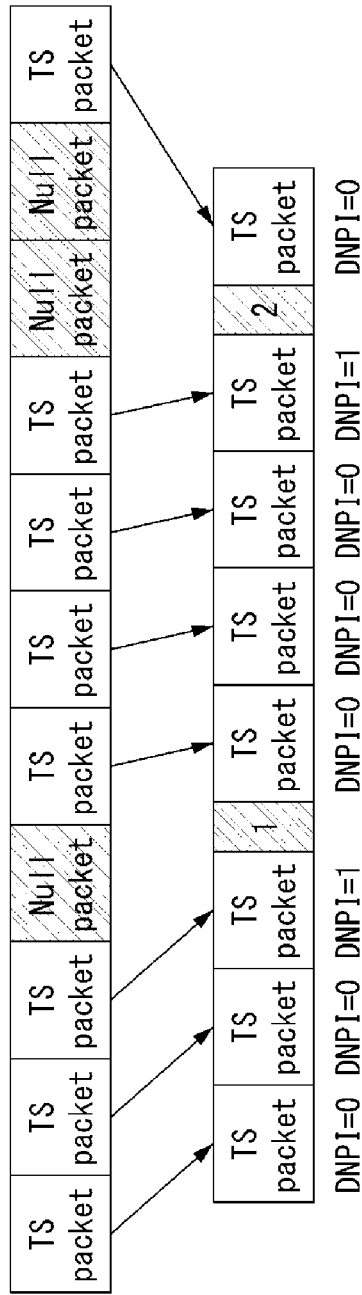

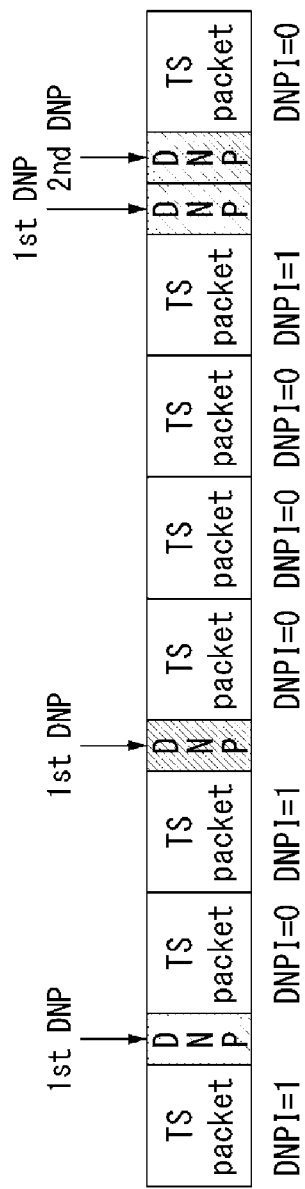
[Figure 35]

APPARATUS FOR TRANSMITTING BROADCAST SIGNALS, APPARATUS FOR RECEIVING BROADCAST SIGNALS, METHOD FOR TRANSMITTING BROADCAST SIGNALS AND METHOD FOR RECEIVING BROADCAST SIGNALS

CROSS-REFERENCE TO RELATED APPLICATIONS

This application is a continuation of U.S. patent application Ser. No. 14/540,385 filed on Nov. 13, 2014, which claims priority to Provisional Application No. 61/903,399 filed on 13 Nov. 2013 in U.S., and Provisional Application No. 61/908,169 filed on 24 Nov. 2014 in US the entire contents of which is hereby incorporated by reference in its entirety.

BACKGROUND OF THE INVENTION

Field of the Invention

The present invention relates to an apparatus for transmitting broadcast signals, an apparatus for receiving broadcast signals and methods for transmitting and receiving broadcast signals.

Related Art

As analog broadcast signal transmission comes to an end, various technologies for transmitting/receiving digital broadcast signals are being developed. A digital broadcast signal may include a larger amount of video/audio data than an analog broadcast signal and further include various types of additional data in addition to the video/audio data.

That is, a digital broadcast system can provide HD (high definition) images, multi-channel audio and various additional services. However, data transmission efficiency for transmission of large amounts of data, robustness of transmission/reception networks and network flexibility in consideration of mobile reception equipment need to be improved for digital broadcast.

SUMMARY OF THE INVENTION

The present invention provides a method of newly defining a deleted null packet indicator (DNPI) and inserting a deleted null packet (DNP) only when a null packet is present in order to solve a problem in that a DNP is inserted irrespective of whether a null packet is present or not.

Furthermore, the present invention provides a method of newly defining a DNP structure of a 2-byte size and deleting a null packet in order to reduce overhead attributable to the transmission of unnecessary null packets.

Technical objects to be achieved by this specification are not limited to the aforementioned objects, and other technical objects that have not been described above will be evidently understood by those skilled in the art to which the present invention pertains from the following description.

In an aspect, there is provided a method for sending a broadcast signal. The method includes formatting at least one input stream into at least one data pipe (DP), encoding the data of the at least one DP for each DP, generating at least one signal frame by mapping the encoded data, and modulating the data of the generated signal frame using an orthogonal frequency division multiplexing (OFDM) scheme and sending a broadcast signal including the modulated data of the signal frame. Formatting the at least one input stream into the at least one DP includes splitting the at least one input stream into at least one data stream, deleting at least one null packet included in the at least one data stream, and forming a baseband frame (BBF) by adding a header to the at least one data stream. The baseband frame includes at least one deleted null packet (DNP) field indicative of the number of deleted null packets, and the at least one DNP field includes at least one of a first DNP and a second DNP.

Furthermore, in the present invention, deleting the at least one null packet includes checking whether the at least one null packet is present or not, deleting the at least one null packet if the at least one null packet is found to be present, counting the number of deleted null packets, and inserting a deleted null packet (DNP) field into a location from which the at least one null packet has been deleted.

Furthermore, in the present invention, the DNP field inserted into the location from which the at least one null packet has been deleted is set as the counted value.

Furthermore, in the present invention, the at least one data stream includes a deleted null packet indicator (DNPI) field indicative of whether or not a next packet is a null packet.

Furthermore, in the present invention, if the DNPI field is set as a value indicating that a next packet is a null packet, the DNP field is inserted into a data packet subsequent to a data packet including the DNPI field.

Furthermore, in the present invention, the header of the at least one data packet is generated by compressing a packet identifier (PID) or deleting the PID.

Furthermore, in the present invention, the DNP field has a size of 2 bytes, and each of the first DNP and the second DNP has a size of 1 byte.

Furthermore, in the present invention, the DNP field includes only the first DNP if the number of deleted null packets is a specific number or less, and the DNP field includes the first DNP and the second DNP if the number of deleted null packets is a specific number or more.

Furthermore, in the present invention, the first DNP is set as a specific value indicative of a specific number of null packets if the first DNP and the second DNP are included in the DNP field, and the second DNP is set as a value obtained by subtracting the value of the first DNP from a total number of deleted null packets.

Furthermore, in the present invention, the second DNP is placed next to the first DNP.

Furthermore, in the present invention, the data stream includes a service or service component stream.

Furthermore, in the present invention, the at least one data stream includes at least one of at least one data packet and at least one null packet, and the DNPI field is included in the header of the at least one data packet.

Furthermore, in another aspect, there is provided a transmission apparatus for sending a broadcast signal. The transmission apparatus includes an input formatting module configured to format at least one input stream into at least one data pipe (DP), a bit interleaved coding and modulation (BICM) module configured to encode the data of the at least one DP for each DP, a frame building module configured to generate at least one signal frame by mapping the encoded data, and an orthogonal frequency division multiplexing (OFDM) generation module configured to modulate the data of the generated signal frame using an OFDM scheme and send a broadcast signal including the modulated data of the signal frame. The input formatting module includes an input stream splitter module configured to split the at least one input stream into at least one data stream, a null packet deletion module configured to delete at least one null packet included in the at least one data stream, and a BB frame header insertion module configured to form a baseband frame (BBF) by adding a header to the at least one data stream. The baseband frame includes at least one deleted null packet (DNP) field indicative of the number of deleted null packets, and the at least one DNP field includes at least one of a first DNP and a second DNP.

Furthermore, in the present invention, the null packet deletion module includes a null packet check module configured to check whether the at least one null packet is present or not, a null packet processing module configured to delete the at least one null packet and count the number of deleted null packets, and a DNP insertion module configured to insert a deleted null packet (DNP) field into a location from which the at least one null packet has been deleted.

Furthermore, in the present invention, the null packet processing module includes a null packet deletion module configured to delete the at least one null packet if the at least one null packet is found to be present and a null packet counter module configured to count the number of deleted null packets.

Furthermore, in the present invention, the at least one data stream includes at least one of at least one data packet and at least one null packet, and a header of the at least one data packet includes a deleted null packet indicator (DNPI) field indicative of whether a next packet is a null packet.

Furthermore, in the present invention, the input stream is a transport stream (TS) stream.

Furthermore, in another aspect, there is provided a receiving apparatus for receiving a broadcast signal. The receiving apparatus includes a demapping and decoding module; and an output processor module restoring multiple data pipes output from the demapping and decoding module to input streams, wherein the output processor module includes a baseband frame processor block decoding information transmitted to a header of a baseband frame and restoring the input streams by using the decoded information, wherein the baseband frame comprises a deleted null packet (DNP) field indicative of a number of deleted null packets, and wherein the DNP field comprises at least one of a first DNP or a second DNP.

This specification is advantageous in that overhead in the transmission of a data stream can be reduced by newly defining a deleted null packet indicator (DNPI) indicative of whether a null packet is present or not and inserting a DNP only when a null packet is present.

Furthermore, the present invention is advantageous in that overhead attributable to the transmission of unnecessary null packets can be reduced by representing the number of null packets through a DNP structure of a 2-byte size.

Advantages that may be achieved by the present invention are not limited to the aforementioned advantages, and those skilled in the art to which the present invention pertains will readily appreciate other advantages that have not been described from the following description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 illustrates a structure of an apparatus for transmitting broadcast signals for future broadcast services according to an embodiment of the present invention;

FIG. 3 illustrates an input formatting block according to another embodiment of the present invention;

FIG. 4 illustrates an input formatting block according to another embodiment of the present invention;

FIG. 5(a) and FIG. 5(b) illustrate a BICM block according to an embodiment of the present invention;

FIG. 6 illustrates a BICM block according to another embodiment of the present invention;

FIG. 7 illustrates a frame building block according to one embodiment of the present invention;

FIG. 8 illustrates an OFMD generation block according to an embodiment of the present invention;

FIG. 9 illustrates a structure of an apparatus for receiving broadcast signals for future broadcast services according to an embodiment of the present invention;

FIG. 10(a), FIG. 10(b), FIG. 10(c) and FIG. 10(d) illustrate a frame structure according to an embodiment of the present invention;

FIG. 11 illustrates a signaling hierarchy structure of the frame according to an embodiment of the present invention;

FIG. 12 illustrates preamble signaling data according to an embodiment of the present invention;

FIG. 13 illustrates PLS1 data according to an embodiment of the present invention;

FIG. 14 illustrates PLS2 data according to an embodiment of the present invention;

FIG. 15 illustrates PLS2 data according to another embodiment of the present invention;

FIG. 16 illustrates a logical structure of a frame according to an embodiment of the present invention;

FIG. 17 illustrates PLS mapping according to an embodiment of the present invention;

FIG. 18 illustrates EAC mapping according to an embodiment of the present invention;

FIG. 22 illustrates an FEC structure according to an embodiment of the present invention;

FIG. 23 illustrates a bit interleaving according to an embodiment of the present invention;

FIG. 27(a) and FIG. 27(b) are diagrams illustrating an example of the mode adaptation module of a reception apparatus proposed by the present invention;

FIG. 28 is a diagram illustrating an example of a conventional TS packet header format;

FIG. 30 is a diagram illustrating an example of the format of a TS packet header proposed by the present invention;

FIG. 31 is a diagram illustrating another example of the format of a TS packet header proposed by the present invention;

FIG. 32 is a diagram illustrating yet another example of the format of a TS packet header proposed by the present invention;

FIG. 33(a) and FIG. 33(b) are diagrams illustrating an example of a method of deleting null packets using the DNPI field of FIGS. 30 to 32;

FIG. 35 illustrates an example of a DNP structure proposed by the present invention.

DESCRIPTION OF EXEMPLARY EMBODIMENTS

Figures 2A, 2B:
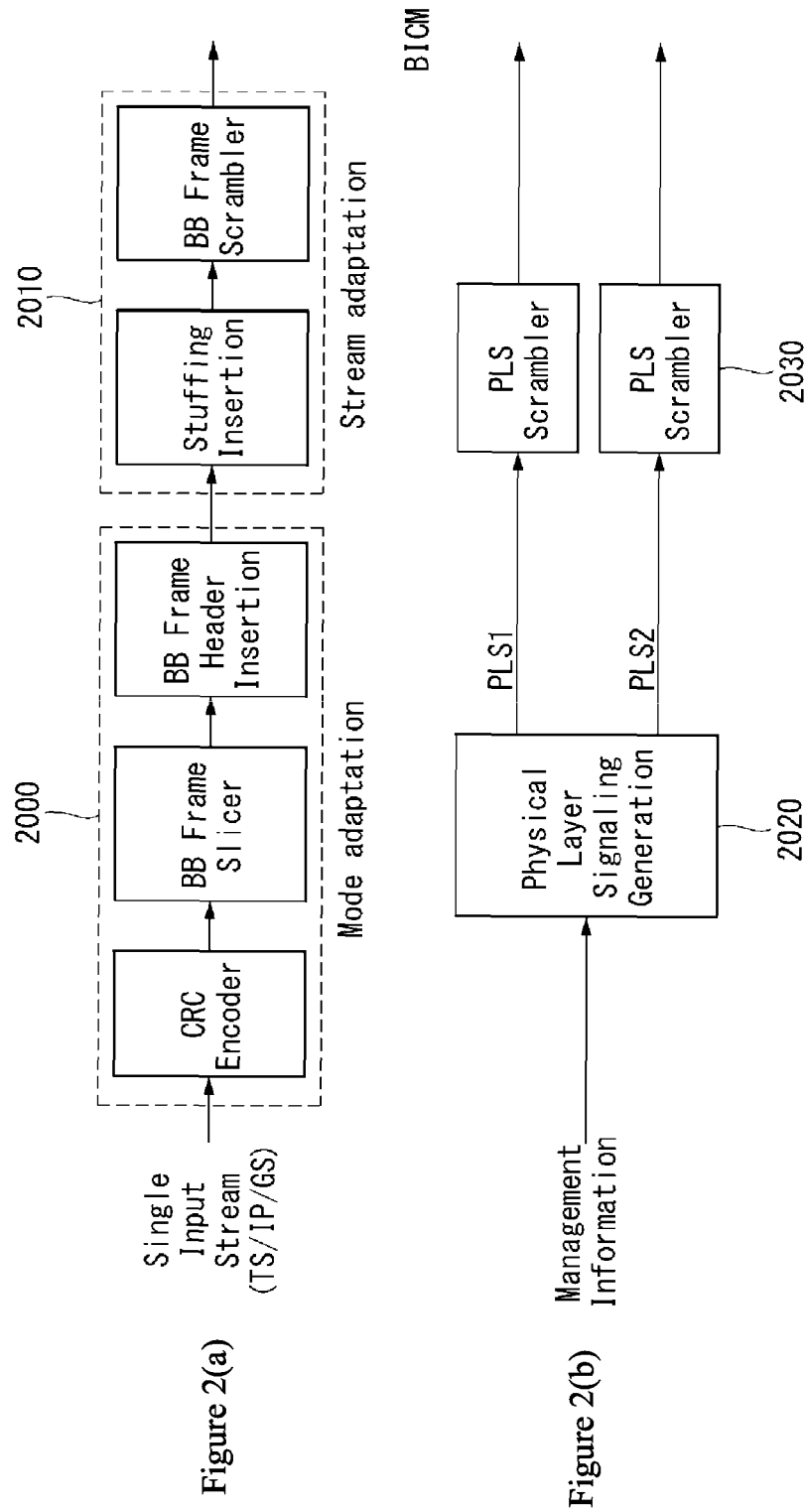
FIG. 2(a) and FIG. 2(b) illustrate an input formatting block according to one embodiment of the present invention.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although most terms used in the present invention have been selected from general ones widely used in the art, some terms have been arbitrarily selected by the applicant and their meanings are explained in detail in the following description as needed. Thus, the present invention should be understood based upon the intended meanings of the terms rather than their simple names or meanings.

The present invention provides apparatuses and methods for transmitting and receiving broadcast signals for future broadcast services. Future broadcast services according to an embodiment of the present invention include a terrestrial broadcast service, a mobile broadcast service, a UHDTV service, etc. The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

While MISO or MIMO uses two antennas in the following for convenience of description, the present invention is applicable to systems using two or more antennas.

The present invention may defines three physical layer (PL) profiles—base, handheld and advanced profiles-each optimized to minimize receiver complexity while attaining the performance required for a particular use case. The physical layer (PHY) profiles are subsets of all configurations that a corresponding receiver should implement.

The three PHY profiles share most of the functional blocks but differ slightly in specific blocks and/or parameters. Additional PHY profiles can be defined in the future. For the system evolution, future profiles can also be multiplexed with the existing profiles in a single RF channel through a future extension frame (FEF). The details of each PHY profile are described below.

1. Base Profile

The base profile represents a main use case for fixed receiving devices that are usually connected to a roof-top antenna. The base profile also includes portable devices that could be transported to a place but belong to a relatively stationary reception category. Use of the base profile could be extended to handheld devices or even vehicular by some improved implementations, but those use cases are not expected for the base profile receiver operation.

Target SNR range of reception is from approximately 10 to 20 dB, which includes the 15 dB SNR reception capability of the existing broadcast system (e.g. ATSC A/53). The receiver complexity and power consumption is not as critical as in the battery-operated handheld devices, which will use the handheld profile. Key system parameters for the base profile are listed in below table 1.

TABLE 1

| LDPC codeword length | 16K, 64K bits |
|---|---|
| Constellation size | 4~10 bpcu (bits per channel use) |
| Time de-interleaving memory size | ≤$2^{19}$ data cells |
| Pilot patterns | Pilot pattern for fixed reception |
| FFT size | 16K, 32K points |

2. Handheld Profile

The handheld profile is designed for use in handheld and vehicular devices that operate with battery power. The devices can be moving with pedestrian or vehicle speed. The power consumption as well as the receiver complexity is very important for the implementation of the devices of the handheld profile. The target SNR range of the handheld profile is approximately 0 to 10 dB, but can be configured to reach below 0 dB when intended for deeper indoor reception.

In addition to low SNR capability, resilience to the Doppler Effect caused by receiver mobility is the most important performance attribute of the handheld profile. Key system parameters for the handheld profile are listed in the below table 2.

TABLE 2

| LDPC codeword length | 16 Kbits |
|---|---|
| Constellation size | 2~8 bpcu |
| Time de-interleaving memory size | ≤$2^{18}$ data cells |
| Pilot patterns | Pilot patterns for mobile and indoor reception |
| FFT size | 8K, 16K points |

3. Advanced Profile

The advanced profile provides highest channel capacity at the cost of more implementation complexity. This profile requires using MIMO transmission and reception, and UHDTV service is a target use case for which this profile is specifically designed. The increased capacity can also be used to allow an increased number of services in a given bandwidth, e.g., multiple SDTV or HDTV services.

The target SNR range of the advanced profile is approximately 20 to 30 dB. MIMO transmission may initially use existing elliptically-polarized transmission equipment, with extension to full-power cross-polarized transmission in the future. Key system parameters for the advanced profile are listed in below table 3.

TABLE 3

| LDPC codeword length | 16K, 64Kbits |
|---|---|
| Constellation size | 8~12 bpcu |
| Time de-interleaving memory size | ≤$2^{19}$ data cells |
| Pilot patterns | Pilot pattern for fixed reception |
| FFT size | 16K, 32K points |

In this case, the base profile can be used as a profile for both the terrestrial broadcast service and the mobile broadcast service. That is, the base profile can be used to define a concept of a profile which includes the mobile profile. Also, the advanced profile can be divided advanced profile for a base profile with MIMO and advanced profile for a handheld profile with MIMO. Moreover, the three profiles can be changed according to intention of the designer.

The following terms and definitions may apply to the present invention. The following terms and definitions can be changed according to design.

auxiliary stream: sequence of cells carrying data of as yet undefined modulation and coding, which may be used for future extensions or as required by broadcasters or network operators base data pipe: data pipe that carries service signaling data baseband frame (or BBFRAME): set of Kbch bits which form the input to one FEC encoding process (BCH and LDPC encoding)

cell: modulation value that is carried by one carrier of the OFDM transmission coded block: LDPC-encoded block of PLS1 data or one of the LDPC-encoded blocks of PLS2 data data pipe: logical channel in the physical layer that carries service data or related metadata, which may carry one or multiple service(s) or service component(s).

data pipe unit: a basic unit for allocating data cells to a DP in a frame.

data symbol: OFDM symbol in a frame which is not a preamble symbol (the frame signaling symbol and frame edge symbol is included in the data symbol)

DP_ID: this 8-bit field identifies uniquely a DP within the system identified by the SYSTEM_ID dummy cell: cell carrying a pseudo-random value used to fill the remaining capacity not used for PLS signaling, DPs or auxiliary streams emergency alert channel: part of a frame that carries EAS information data frame: physical layer time slot that starts with a preamble and ends with a frame edge symbol frame repetition unit: a set of frames belonging to same or different physical layer profile including a FEF, which is repeated eight times in a super-frame fast information channel: a logical channel in a frame that carries the mapping information between a service and the corresponding base DP FECBLOCK: set of LDPC-encoded bits of a DP data FFT size: nominal FFT size used for a particular mode, equal to the active symbol period Is expressed in cycles of the elementary period T frame signaling symbol: OFDM symbol with higher pilot density used at the start of a frame in certain combinations of FFT size, guard interval and scattered pilot pattern, which carries a part of the PLS data frame edge symbol: OFDM symbol with higher pilot density used at the end of a frame in certain combinations of FFT size, guard interval and scattered pilot pattern frame-group: the set of all the frames having the same PHY profile type in a super-frame.

future extension frame: physical layer time slot within the super-frame that could be used for future extension, which starts with a preamble Futurecast UTB system: proposed physical layer broadcasting system, of which the input is one or more MPEG2-TS or IP or general stream(s) and of which the output is an RF signal input stream: A stream of data for an ensemble of services delivered to the end users by the system.

normal data symbol: data symbol excluding the frame signaling symbol and the frame edge symbol PHY profile: subset of all configurations that a corresponding receiver should implement PLS: physical layer signaling data consisting of PLS1 and PLS2

PLS1: a first set of PLS data carried in the FSS symbols having a fixed size, coding and modulation, which carries basic information about the system as well as the parameters needed to decode the PLS2

NOTE: PLS1 data remains constant for the duration of a frame-group.

PLS2: a second set of PLS data transmitted in the FSS symbol, which carries more detailed PLS data about the system and the DPs PLS2 dynamic data: PLS2 data that may dynamically change frame-by-frame PLS2 static data: PLS2 data that remains static for the duration of a frame-group preamble signaling data: signaling data carried by the preamble symbol and used to identify the basic mode of the system preamble symbol: fixed-length pilot symbol that carries basic PLS data and is located in the beginning of a frame NOTE: The preamble symbol is mainly used for fast initial band scan to detect the system signal, its timing, frequency offset, and FFT-size.

reserved for future use: not defined by the present document but may be defined in future super-frame: set of eight frame repetition units time interleaving block (TI block): set of cells within which time interleaving is carried out, corresponding to one use of the time interleaver memory TI group: unit over which dynamic capacity allocation for a particular DP is carried out, made up of an integer, dynamically varying number of XFECBLOCKs NOTE: The TI group may be mapped directly to one frame or may be mapped to multiple frames. It may contain one or more TI blocks.

Type 1 DP: DP of a frame where all DPs are mapped into the frame in TDM fashion

Type 2 DP: DP of a frame where all DPs are mapped into the frame in FDM fashion

XFECBLOCK: set of Ncells cells carrying all the bits of one LDPC FECBLOCK

FIG. 1 illustrates a structure of an apparatus for transmitting broadcast signals for future broadcast services according to an embodiment of the present invention.

The apparatus for transmitting broadcast signals for future broadcast services according to an embodiment of the present invention can include an input formatting block 1000, a BICM (Bit interleaved coding & modulation) block 1010, a frame structure block 1020, an OFDM (Orthogonal Frequency Division Multiplexing) generation block 1030 and a signaling generation block 1040. A description will be given of the operation of each module of the apparatus for transmitting broadcast signals.

IP stream/packets and MPEG2-TS are the main input formats, other stream types are handled as General Streams. In addition to these data inputs, Management Information is input to control the scheduling and allocation of the corresponding bandwidth for each input stream. One or multiple TS stream(s), IP stream(s) and/or General Stream(s) inputs are simultaneously allowed.

The input formatting block 1000 can demultiplex each input stream into one or multiple data pipe(s), to each of which an independent coding and modulation is applied. The data pipe (DP) is the basic unit for robustness control, thereby affecting quality-of-service (QoS). One or multiple service(s) or service component(s) can be carried by a single DP. Details of operations of the input formatting block 1000 will be described later.

The data pipe is a logical channel in the physical layer that carries service data or related metadata, which may carry one or multiple service(s) or service component(s).

Also, the data pipe unit: a basic unit for allocating data cells to a DP in a frame.

In the BICM block 1010, parity data is added for error correction and the encoded bit streams are mapped to complex-value constellation symbols. The symbols are interleaved across a specific interleaving depth that is used for the corresponding DP. For the advanced profile, MIMO encoding is performed in the BICM block 1010 and the additional data path is added at the output for MIMO transmission. Details of operations of the BICM block 1010 will be described later.

The Frame Building block 1020 can map the data cells of the input DPs into the OFDM symbols within a frame. After mapping, the frequency interleaving is used for frequency-domain diversity, especially to combat frequency-selective fading channels. Details of operations of the Frame Building block 1020 will be described later.

After inserting a preamble at the beginning of each frame, the OFDM Generation block 1030 can apply conventional OFDM modulation having a cyclic prefix as guard interval. For antenna space diversity, a distributed MISO scheme is applied across the transmitters. In addition, a Peak-to-Average Power Reduction (PAPR) scheme is performed in the time domain. For flexible network planning, this proposal provides a set of various FFT sizes, guard interval lengths and corresponding pilot patterns. Details of operations of the OFDM Generation block 1030 will be described later.

The Signaling Generation block 1040 can create physical layer signaling information used for the operation of each functional block. This signaling information is also transmitted so that the services of interest are properly recovered at the receiver side. Details of operations of the Signaling Generation block 1040 will be described later.

FIGS. 2, 3 and 4 illustrate the input formatting block 1000 according to embodiments of the present invention. A description will be given of each figure.

FIG. 2 illustrates an input formatting block according to one embodiment of the present invention. FIG. 2 shows an input formatting module when the input signal is a single input stream.

The input formatting block illustrated in FIG. 2 corresponds to an embodiment of the input formatting block 1000 described with reference to FIG. 1.

The input to the physical layer may be composed of one or multiple data streams. Each data stream is carried by one DP. Mode adaptation modules slice an incoming data stream into data fields of the baseband frame (BBF). The system supports three types of input data streams: MPEG2-TS, Internet protocol (IP) and Generic stream (GS). MPEG2-TS is characterized by fixed length (188 byte) packets with the first byte being a sync-byte (0x47). An IP stream is composed of variable length IP datagram packets, as signaled within IP packet headers. The system supports both IPv4 and IPv6 for the IP stream. GS may be composed of variable length packets or constant length packets, signaled within encapsulation packet headers.

(a) shows a mode adaptation block 2000 and a stream adaptation 2010 for signal DP and (b) shows a PLS generation block 2020 and a PLS scrambler 2030 for generating and processing PLS data. A description will be given of the operation of each block.

The Input Stream Splitter splits the input TS, IP, GS streams into multiple service or service component (audio, video, etc.) streams. The mode adaptation module 2010 is comprised of a CRC Encoder, BB (baseband) Frame Slicer, and BB Frame Header Insertion block.

The CRC Encoder provides three kinds of CRC encoding for error detection at the user packet (UP) level, i.e., CRC-8, CRC-16, and CRC-32. The computed CRC bytes are appended after the UP. CRC-8 is used for TS stream and CRC-32 for IP stream. If the GS stream doesn't provide the CRC encoding, the proposed CRC encoding should be applied.

BB Frame Slicer maps the input into an internal logical-bit format. The first received bit is defined to be the MSB. The BB Frame Slicer allocates a number of input bits equal to the available data field capacity. To allocate a number of input bits equal to the BBF payload, the UP packet stream is sliced to fit the data field of BBF.

BB Frame Header Insertion block can insert fixed length BBF header of 2 bytes is inserted in front of the BB Frame. The BBF header is composed of STUFFI (1 bit), SYNCD (13 bits), and RFU (2 bits). In addition to the fixed 2-Byte BBF header, BBF can have an extension field (1 or 3 bytes) at the end of the 2-byte BBF header.

The stream adaptation 2010 is comprised of stuffing insertion block and BB scrambler.

The stuffing insertion block can insert stuffing field into a payload of a BB frame. If the input data to the stream adaptation is sufficient to fill a BB-Frame, STUFFI is set to '0' and the BBF has no stuffing field. Otherwise STUFFI is set to '1' and the stuffing field is inserted immediately after the BBF header. The stuffing field comprises two bytes of the stuffing field header and a variable size of stuffing data.

The BB scrambler scrambles complete BBF for energy dispersal. The scrambling sequence is synchronous with the BBF. The scrambling sequence is generated by the feedback shift register.

The PLS generation block 2020 can generate physical layer signaling (PLS) data. The PLS provides the receiver with a means to access physical layer DPs. The PLS data consists of PLS1 data and PLS2 data.

The PLS1 data is a first set of PLS data carried in the FSS symbols in the frame having a fixed size, coding and modulation, which carries basic information about the system as well as the parameters needed to decode the PLS2 data. The PLS1 data provides basic transmission parameters including parameters required to enable the reception and decoding of the PLS2 data. Also, the PLS1 data remains constant for the duration of a frame-group.

The PLS2 data is a second set of PLS data transmitted in the FSS symbol, which carries more detailed PLS data about the system and the DPs. The PLS2 contains parameters that provide sufficient information for the receiver to decode the desired DP. The PLS2 signaling further consists of two types of parameters, PLS2 Static data (PLS2-STAT data) and PLS2 dynamic data (PLS2-DYN data). The PLS2 Static data is PLS2 data that remains static for the duration of a frame-group and the PLS2 dynamic data is PLS2 data that may dynamically change frame-by-frame.

The details of the PLS data will be described later.

The PLS scrambler 2030 can scramble the generated PLS data for energy dispersal.

The above-described blocks may be omitted or replaced by blocks having similar or identical functions.

FIG. 3 illustrates an input formatting block according to another embodiment of the present invention.

The input formatting block illustrated in FIG. 3 corresponds to an embodiment of the input formatting block 1000 described with reference to FIG. 1.

FIG. 3 shows a mode adaptation block of the input formatting block when the input signal corresponds to multiple input streams.

The mode adaptation block of the input formatting block for processing the multiple input streams can independently process the multiple input streams.

The order of each internal block diagram of the mode adaptation module can be changed.

Referring to FIG. 3, the mode adaptation block for respectively processing the multiple input streams can include an input stream splitter 3000, an input stream synchronizer 3010, a compensating delay block 3020, a null packet deletion block 3030, a head compression block 3040, a CRC encoder 3050, a BB frame slicer 3060 and a BB header insertion block 3070. Description will be given of each block of the mode adaptation block.

Operations of the CRC encoder 3050, BB frame slicer 3060 and BB header insertion block 3070 correspond to those of the CRC encoder, BB frame slicer and BB header insertion block described with reference to FIG. 2 and thus description thereof is omitted.

The input stream splitter 3000 can split the input TS, IP, GS streams into multiple service or service component (audio, video, etc.) streams.

The input stream synchronizer 3010 may be referred as ISSY. The ISSY can provide suitable means to guarantee Constant Bit Rate (CBR) and constant end-to-end transmission delay for any input data format. The ISSY is always used for the case of multiple DPs carrying TS, and optionally used for multiple DPs carrying GS streams.

The compensating delay block 3020 can delay the split TS packet stream following the insertion of ISSY information to allow a TS packet recombining mechanism without requiring additional memory in the receiver.

The null packet deletion block 3030, is used only for the TS input stream case. Some TS input streams or split TS streams may have a large number of null-packets present in order to accommodate VBR (variable bit-rate) services in a CBR TS stream. In this case, in order to avoid unnecessary transmission overhead, null-packets can be identified and not transmitted. In the receiver, deleted null-packets can be re-inserted in the exact place where they were originally by reference to a deleted null-packet (DNP) counter that is inserted in the transmission, thus guaranteeing constant bit-rate and avoiding the need for time-stamp (PCR) updating.

The head compression block 3040 can provide packet header compression to increase transmission efficiency for TS or IP input streams. Because the receiver can have a priori information on certain parts of the header, this known information can be deleted in the transmitter.

For Transport Stream, the receiver has a-priori information about the sync-byte configuration (0x47) and the packet length (188 Byte). If the input TS stream carries content that has only one PID, i.e., for only one service component (video, audio, etc.) or service sub-component (SVC base layer, SVC enhancement layer, MVC base view or MVC dependent views), TS packet header compression can be applied (optionally) to the Transport Stream. IP packet header compression is used optionally if the input steam is an IP stream.

The above-described blocks may be omitted or replaced by blocks having similar or identical functions.

FIG. 4 illustrates an input formatting block according to another embodiment of the present invention.

The input formatting block illustrated in FIG. 4 corresponds to an embodiment of the input formatting block 1000 described with reference to FIG. 1.

FIG. 4 illustrates a stream adaptation block of the input formatting module when the input signal corresponds to multiple input streams.

Referring to FIG. 4, the mode adaptation block for respectively processing the multiple input streams can include a scheduler 4000, an 1-Frame delay block 4010, a stuffing insertion block 4020, an in-band signaling 4030, a BB Frame scrambler 4040, a PLS generation block 4050 and a PLS scrambler 4060. Description will be given of each block of the stream adaptation block.

Operations of the stuffing insertion block 4020, the BB Frame scrambler 4040, the PLS generation block 4050 and the PLS scrambler 4060 correspond to those of the stuffing insertion block, BB scrambler, PLS generation block and the PLS scrambler described with reference to FIG. 2 and thus description thereof is omitted.

The scheduler 4000 can determine the overall cell allocation across the entire frame from the amount of FEC-BLOCKs of each DP. Including the allocation for PLS, EAC and FIC, the scheduler generate the values of PLS2-DYN data, which is transmitted as in-band signaling or PLS cell in FSS of the frame. Details of FECBLOCK, EAC and FIC will be described later.

The 1-Frame delay block 4010 can delay the input data by one transmission frame such that scheduling information about the next frame can be transmitted through the current frame for in-band signaling information to be inserted into the DPs.

The in-band signaling 4030 can insert un-delayed part of the PLS2 data into a DP of a frame.

The above-described blocks may be omitted or replaced by blocks having similar or identical functions.

FIG. 5 illustrates a BICM block according to an embodiment of the present invention.

The BICM block illustrated in FIG. 5 corresponds to an embodiment of the BICM block 1010 described with reference to FIG. 1.

As described above, the apparatus for transmitting broadcast signals for future broadcast services according to an embodiment of the present invention can provide a terrestrial broadcast service, mobile broadcast service, UHDTV service, etc.

Since QoS (quality of service) depends on characteristics of a service provided by the apparatus for transmitting broadcast signals for future broadcast services according to an embodiment of the present invention, data corresponding to respective services needs to be processed through different schemes. Accordingly, the a BICM block according to an embodiment of the present invention can independently process DPs input thereto by independently applying SISO, MISO and MIMO schemes to the data pipes respectively corresponding to data paths. Consequently, the apparatus for transmitting broadcast signals for future broadcast services according to an embodiment of the present invention can control QoS for each service or service component transmitted through each DP.

(a) shows the BICM block shared by the base profile and the handheld profile and (b) shows the BICM block of the advanced profile.

The BICM block shared by the base profile and the handheld profile and the BICM block of the advanced profile can include plural processing blocks for processing each DP.

A description will be given of each processing block of the BICM block for the base profile and the handheld profile and the BICM block for the advanced profile.

A processing block 5000 of the BICM block for the base profile and the handheld profile can include a Data FEC encoder 5010, a bit interleaver 5020, a constellation mapper 5030, an SSD (Signal Space Diversity) encoding block 5040 and a time interleaver 5050.

The Data FEC encoder 5010 can perform the FEC encoding on the input BBF to generate FECBLOCK procedure using outer coding (BCH), and inner coding (LDPC). The outer coding (BCH) is optional coding method. Details of operations of the Data FEC encoder 5010 will be described later.

The bit interleaver 5020 can interleave outputs of the Data FEC encoder 5010 to achieve optimized performance with combination of the LDPC codes and modulation scheme while providing an efficiently implementable structure. Details of operations of the bit interleaver 5020 will be described later.

The constellation mapper 5030 can modulate each cell word from the bit interleaver 5020 in the base and the handheld profiles, or cell word from the Cell-word demultiplexer 5010-1 in the advanced profile using either QPSK, QAM-16, non-uniform QAM (NUQ-64, NUQ-256, NUQ-1024) or non-uniform constellation (NUC-16, NUC-64, NUC-256, NUC-1024) to give a power-normalized constellation point, el. This constellation mapping is applied only for DPs. Observe that QAM-16 and NUQs are square shaped, while NUCs have arbitrary shape. When each constellation is rotated by any multiple of 90 degrees, the rotated constellation exactly overlaps with its original one. This "rotation-sense" symmetric property makes the capacities and the average powers of the real and imaginary components equal to each other. Both NUQs and NUCs are defined specifically for each code rate and the particular one used is signaled by the parameter DP_MOD filed in PLS2 data.

The SSD encoding block 5040 can precode cells in two (2D), three (3D), and four (4D) dimensions to increase the reception robustness under difficult fading conditions.

The time interleaver 5050 can operates at the DP level. The parameters of time interleaving (TI) may be set differently for each DP. Details of operations of the time interleaver 5050 will be described later.

A processing block 5000-1 of the BICM block for the advanced profile can include the Data FEC encoder, bit interleaver, constellation mapper, and time interleaver. However, the processing block 5000-1 is distinguished from the processing block 5000 further includes a cell-word demultiplexer 5010-1 and a MIMO encoding block 5020-1.

Also, the operations of the Data FEC encoder, bit interleaver, constellation mapper, and time interleaver in the processing block 5000-1 correspond to those of the Data FEC encoder 5010, bit interleaver 5020, constellation mapper 5030, and time interleaver 5050 described and thus description thereof is omitted.

The cell-word demultiplexer 5010-1 is used for the DP of the advanced profile to divide the single cell-word stream into dual cell-word streams for MIMO processing. Details of operations of the cell-word demultiplexer 5010-1 will be described later.

The MIMO encoding block 5020-1 can processing the output of the cell-word demultiplexer 5010-1 using MIMO encoding scheme. The MIMO encoding scheme was optimized for broadcast signal transmission. The MIMO technology is a promising way to get a capacity increase but it depends on channel characteristics. Especially for broadcasting, the strong LOS component of the channel or a difference in the received signal power between two antennas caused by different signal propagation characteristics makes it difficult to get capacity gain from MIMO. The proposed MIMO encoding scheme overcomes this problem using a rotation-based pre-coding and phase randomization of one of the MIMO output signals.

MIMO encoding is intended for a 2×2 MIMO system requiring at least two antennas at both the transmitter and the receiver. Two MIMO encoding modes are defined in this proposal; full-rate spatial multiplexing (FR-SM) and full-rate full-diversity spatial multiplexing (FRFD-SM). The FR-SM encoding provides capacity increase with relatively small complexity increase at the receiver side while the FRFD-SM encoding provides capacity increase and additional diversity gain with a great complexity increase at the receiver side. The proposed MIMO encoding scheme has no restriction on the antenna polarity configuration.

MIMO processing is required for the advanced profile frame, which means all DPs in the advanced profile frame are processed by the MIMO encoder. MIMO processing is applied at DP level. Pairs of the Constellation Mapper outputs NUQ (e1,i and e2,i) are fed to the input of the MIMO Encoder. Paired MIMO Encoder output (g1,i and g2,i) is transmitted by the same carrier k and OFDM symbol 1 of their respective TX antennas.

The above-described blocks may be omitted or replaced by blocks having similar or identical functions.

FIG. 6 illustrates a BICM block according to another embodiment of the present invention.

The BICM block illustrated in FIG. 6 corresponds to an embodiment of the BICM block 1010 described with reference to FIG. 1.

FIG. 6 illustrates a BICM block for protection of physical layer signaling (PLS), emergency alert channel (EAC) and fast information channel (FIC). EAC is a part of a frame that carries EAS information data and FIC is a logical channel in a frame that carries the mapping information between a service and the corresponding base DP. Details of the EAC and FIC will be described later.

Referring to FIG. 6, the BICM block for protection of PLS, EAC and FIC can include a PLS FEC encoder 6000, a bit interleaver 6010, a constellation mapper 6020 and time interleaver 6030.

Also, the PLS FEC encoder 6000 can include a scrambler, BCH encoding/zero insertion block, LDPC encoding block and LDPC parity punturing block. Description will be given of each block of the BICM block.

The PLS FEC encoder 6000 can encode the scrambled PLS 1/2 data, EAC and FIC section.

The scrambler can scramble PLS1 data and PLS2 data before BCH encoding and shortened and punctured LDPC encoding.

The BCH encoding/zero insertion block can perform outer encoding on the scrambled PLS 1/2 data using the shortened BCH code for PLS protection and insert zero bits after the BCH encoding. For PLS1 data only, the output bits of the zero insertion may be permuted before LDPC encoding.

The LDPC encoding block can encode the output of the BCH encoding/zero insertion block using LDPC code. To generate a complete coded block, Cldpc, parity bits, Pldpc are encoded systematically from each zero-inserted PLS information block, Ildpc and appended after it.

$$C_{ldpc} = [I_{ldpc} P_{ldpc}] = [i_0, i_1, \ldots, i_{K_{ldpc}-1}, p_0, p_1, \ldots, p_{N_{ldpc}-K_{ldpc}-1}] \quad (1)$$

The LDPC code parameters for PLS1 and PLS2 are as following table 4.

TABLE 4

| Signaling Type | Ksig | Kbch | Nbch_parity | Kldpc (= Nbch) | Nldpc | Nldpc_parity | code rate | Qldpc |
|---|---|---|---|---|---|---|---|---|
| PLS1 | 342 | 1020 | 60 | 1080 | 4320 | 3240 | 1/4 | 36 |
| PLS2 | <1021 | | | | | | | |
| | >1020 | 2100 | | 2160 | 7200 | 5040 | 3/10 | 56 |

The LDPC parity puncturing block can perform puncturing on the PLS1 data and PLS 2 data.

When shortening is applied to the PLS1 data protection, some LDPC parity bits are punctured after LDPC encoding. Also, for the PLS2 data protection, the LDPC parity bits of PLS2 are punctured after LDPC encoding. These punctured bits are not transmitted.

The bit interleaver 6010 can interleave the each shortened and punctured PLS1 data and PLS2 data.

The constellation mapper 6020 can map the bit interleaved PLS1 data and PLS2 data onto constellations.

The time interleaver 6030 can interleave the mapped PLS1 data and PLS2 data.

The above-described blocks may be omitted or replaced by blocks having similar or identical functions.

FIG. 7 illustrates a frame building block according to one embodiment of the present invention.

The frame building block illustrated in FIG. 7 corresponds to an embodiment of the frame building block 1020 described with reference to FIG. 1.

Referring to FIG. 7, the frame building block can include a delay compensation block 7000, a cell mapper 7010 and a frequency interleaver 7020. Description will be given of each block of the frame building block.

The delay compensation block 7000 can adjust the timing between the data pipes and the corresponding PLS data to ensure that they are co-timed at the transmitter end. The PLS data is delayed by the same amount as data pipes are by addressing the delays of data pipes caused by the Input Formatting block and BICM block. The delay of the BICM block is mainly due to the time interleaver 5050. In-band signaling data carries information of the next TI group so that they are carried one frame ahead of the DPs to be signaled. The Delay Compensating block delays in-band signaling data accordingly.

The cell mapper 7010 can map PLS, EAC, FIC, DPs, auxiliary streams and dummy cells into the active carriers of the OFDM symbols in the frame. The basic function of the cell mapper 7010 is to map data cells produced by the TIs for each of the DPs, PLS cells, and EAC/FIC cells, if any, into arrays of active OFDM cells corresponding to each of the OFDM symbols within a frame. Service signaling data (such as PSI(program specific information)/SI) can be separately gathered and sent by a data pipe. The Cell Mapper operates according to the dynamic information produced by the scheduler and the configuration of the frame structure. Details of the frame will be described later.

The frequency interleaver 7020 can randomly interleave data cells received from the cell mapper 7010 to provide frequency diversity. Also, the frequency interleaver 7020 can operate on very OFDM symbol pair comprised of two sequential OFDM symbols using a different interleaving-seed order to get maximum interleaving gain in a single frame. Details of operations of the frequency interleaver 7020 will be described later.

The above-described blocks may be omitted or replaced by blocks having similar or identical functions.

FIG. 8 illustrates an OFMD generation block according to an embodiment of the present invention.

The OFMD generation block illustrated in FIG. 8 corresponds to an embodiment of the OFMD generation block 1030 described with reference to FIG. 1.

The OFDM generation block modulates the OFDM carriers by the cells produced by the Frame Building block, inserts the pilots, and produces the time domain signal for transmission. Also, this block subsequently inserts guard intervals, and applies PAPR (Peak-to-Average Power Radio) reduction processing to produce the final RF signal.

Referring to FIG. 8, the frame building block can include a pilot and reserved tone insertion block 8000, a 2D-eSFN encoding block 8010, an IFFT (Inverse Fast Fourier Transform) block 8020, a PAPR reduction block 8030, a guard interval insertion block 8040, a preamble insertion block 8050, other system insertion block 8060 and a DAC block 8070. Description will be given of each block of the frame building block.

The pilot and reserved tone insertion block 8000 can insert pilots and the reserved tone.

Various cells within the OFDM symbol are modulated with reference information, known as pilots, which have transmitted values known a priori in the receiver. The information of pilot cells is made up of scattered pilots, continual pilots, edge pilots, FSS (frame signaling symbol) pilots and FES (frame edge symbol) pilots. Each pilot is transmitted at a particular boosted power level according to pilot type and pilot pattern. The value of the pilot information is derived from a reference sequence, which is a series of values, one for each transmitted carrier on any given symbol. The pilots can be used for frame synchronization, frequency synchronization, time synchronization, channel estimation, and transmission mode identification, and also can be used to follow the phase noise.

Reference information, taken from the reference sequence, is transmitted in scattered pilot cells in every symbol except the preamble, FSS and FES of the frame. Continual pilots are inserted in every symbol of the frame. The number and location of continual pilots depends on both the FFT size and the scattered pilot pattern. The edge carriers are edge pilots in every symbol except for the preamble symbol. They are inserted in order to allow frequency interpolation up to the edge of the spectrum. FSS pilots are inserted in FSS(s) and FES pilots are inserted in FES. They are inserted in order to allow time interpolation up to the edge of the frame.

The system according to an embodiment of the present invention supports the SFN network, where distributed MISO scheme is optionally used to support very robust transmission mode. The 2D-eSFN is a distributed MISO scheme that uses multiple TX antennas, each of which is located in the different transmitter site in the SFN network.

The 2D-eSFN encoding block 8010 can process a 2D-eSFN processing to distorts the phase of the signals transmitted from multiple transmitters, in order to create both time and frequency diversity in the SFN configuration. Hence, burst errors due to low flat fading or deep-fading for a long time can be mitigated.

The IFFT block 8020 can modulate the output from the 2D-eSFN encoding block 8010 using OFDM modulation scheme. Any cell in the data symbols which has not been designated as a pilot (or as a reserved tone) carries one of the data cells from the frequency interleaver. The cells are mapped to OFDM carriers.

The PAPR reduction block 8030 can perform a PAPR reduction on input signal using various PAPR reduction algorithms in the time domain.

The guard interval insertion block 8040 can insert guard intervals and the preamble insertion block 8050 can insert preamble in front of the signal. Details of a structure of the preamble will be described later. The other system insertion block 8060 can multiplex signals of a plurality of broadcast transmission/reception systems in the time domain such that data of two or more different broadcast transmission/reception systems providing broadcast services can be simultaneously transmitted in the same RF signal bandwidth. In this case, the two or more different broadcast transmission/reception systems refer to systems providing different broadcast services. The different broadcast services may refer to a terrestrial broadcast service, mobile broadcast service, etc. Data related to respective broadcast services can be transmitted through different frames.

The DAC block 8070 can convert an input digital signal into an analog signal and output the analog signal. The signal output from the DAC block 7800 can be transmitted through multiple output antennas according to the physical layer profiles. A Tx antenna according to an embodiment of the present invention can have vertical or horizontal polarity.

The above-described blocks may be omitted or replaced by blocks having similar or identical functions according to design.

FIG. 9 illustrates a structure of an apparatus for receiving broadcast signals for future broadcast services according to an embodiment of the present invention.

The apparatus for receiving broadcast signals for future broadcast services according to an embodiment of the present invention can correspond to the apparatus for transmitting broadcast signals for future broadcast services, described with reference to FIG. 1.

The apparatus for receiving broadcast signals for future broadcast services according to an embodiment of the present invention can include a synchronization & demodulation module 9000, a frame parsing module 9010, a demapping & decoding module 9020, an output processor 9030 and a signaling decoding module 9040. A description will be given of operation of each module of the apparatus for receiving broadcast signals.

The synchronization & demodulation module 9000 can receive input signals through m Rx antennas, perform signal detection and synchronization with respect to a system corresponding to the apparatus for receiving broadcast signals and carry out demodulation corresponding to a reverse procedure of the procedure performed by the apparatus for transmitting broadcast signals.

The frame parsing module 9100 can parse input signal frames and extract data through which a service selected by a user is transmitted. If the apparatus for transmitting broadcast signals performs interleaving, the frame parsing module 9100 can carry out deinterleaving corresponding to a reverse procedure of interleaving. In this case, the positions of a signal and data that need to be extracted can be obtained by decoding data output from the signaling decoding module 9400 to restore scheduling information generated by the apparatus for transmitting broadcast signals.

The demapping & decoding module 9200 can convert the input signals into bit domain data and then deinterleave the same as necessary. The demapping & decoding module 9200 can perform demapping for mapping applied for transmission efficiency and correct an error generated on a transmission channel through decoding. In this case, the demapping & decoding module 9200 can obtain transmission parameters necessary for demapping and decoding by decoding the data output from the signaling decoding module 9400.

The output processor 9300 can perform reverse procedures of various compression/signal processing procedures which are applied by the apparatus for transmitting broadcast signals to improve transmission efficiency. In this case, the output processor 9300 can acquire necessary control information from data output from the signaling decoding module 9400. The output of the output processor 8300 corresponds to a signal input to the apparatus for transmitting broadcast signals and may be MPEG-TSs, IP streams (v4 or v6) and generic streams.

The signaling decoding module 9400 can obtain PLS information from the signal demodulated by the synchronization & demodulation module 9000. As described above, the frame parsing module 9100, demapping & decoding module 9200 and output processor 9300 can execute functions thereof using the data output from the signaling decoding module 9400.

FIG. 10 illustrates a frame structure according to an embodiment of the present invention.

FIG. 10 shows an example configuration of the frame types and FRUs in a super-frame. (a) shows a super frame according to an embodiment of the present invention, (b) shows FRU (Frame Repetition Unit) according to an embodiment of the present invention, (c) shows frames of variable PHY profiles in the FRU and (d) shows a structure of a frame.

A super-frame may be composed of eight FRUs. The FRU is a basic multiplexing unit for TDM of the frames, and is repeated eight times in a super-frame.

Each frame in the FRU belongs to one of the PHY profiles, (base, handheld, advanced) or FEF. The maximum allowed number of the frames in the FRU is four and a given PHY profile can appear any number of times from zero times to four times in the FRU (e.g., base, base, handheld, advanced). PHY profile definitions can be extended using reserved values of the PHY_PROFILE in the preamble, if required.

The FEF part is inserted at the end of the FRU, if included. When the FEF is included in the FRU, the minimum number of FEFs is 8 in a super-frame. It is not recommended that FEF parts be adjacent to each other.

One frame is further divided into a number of OFDM symbols and a preamble. As shown in (d), the frame comprises a preamble, one or more frame signaling symbols (FSS), normal data symbols and a frame edge symbol (FES).

The preamble is a special symbol that enables fast Futurecast UTB system signal detection and provides a set of basic transmission parameters for efficient transmission and reception of the signal. The detailed description of the preamble will be will be described later.

The main purpose of the FSS(s) is to carry the PLS data. For fast synchronization and channel estimation, and hence fast decoding of PLS data, the FSS has denser pilot pattern than the normal data symbol. The FES has exactly the same pilots as the FSS, which enables frequency-only interpolation within the FES and temporal interpolation, without extrapolation, for symbols immediately preceding the FES.

FIG. 11 illustrates a signaling hierarchy structure of the frame according to an embodiment of the present invention.

FIG. 11 illustrates the signaling hierarchy structure, which is split into three main parts: the preamble signaling data 11000, the PLS1 data 11010 and the PLS2 data 11020. The purpose of the preamble, which is carried by the preamble symbol in every frame, is to indicate the transmission type and basic transmission parameters of that frame. The PLS1 enables the receiver to access and decode the PLS2 data, which contains the parameters to access the DP of interest. The PLS2 is carried in every frame and split into two main parts: PLS2-STAT data and PLS2-DYN data. The static and dynamic portion of PLS2 data is followed by padding, if necessary.

FIG. 12 illustrates preamble signaling data according to an embodiment of the present invention.

Preamble signaling data carries 21 bits of information that are needed to enable the receiver to access PLS data and trace DPs within the frame structure. Details of the preamble signaling data are as follows:

PHY_PROFILE: This 3-bit field indicates the PHY profile type of the current frame. The mapping of different PHY profile types is given in below table 5.

TABLE 5

| Value | PHY profile |
|---|---|
| 000 | Base profile |
| 001 | Handheld profile |
| 010 | Advanced profiled |
| 011-110 | Reserved |
| 111 | FEF |

FFT_SIZE: This 2 bit field indicates the FFT size of the current frame within a frame-group, as described in below table 6.

TABLE 6

| Value | FFT size |
|---|---|
| 00 | 8K FFT |
| 01 | 16K FFT |
| 10 | 32K FFT |
| 11 | Reserved |

GI_FRACTION: This 3 bit field indicates the guard interval fraction value in the current super-frame, as described in below table 7.

TABLE 7

| Value | GI_FRACTION |
|---|---|
| 000 | 1/5 |
| 001 | 1/10 |
| 010 | 1/20 |
| 011 | 1/40 |
| 100 | 1/80 |
| 101 | 1/160 |
| 110~111 | Reserved |

EAC_FLAG: This 1 bit field indicates whether the EAC is provided in the current frame. If this field is set to '1', emergency alert service (EAS) is provided in the current frame. If this field set to '0', EAS is not carried in the current frame. This field can be switched dynamically within a super-frame.

PILOT_MODE: This 1-bit field indicates whether the pilot mode is mobile mode or fixed mode for the current frame in the current frame-group. If this field is set to '0', mobile pilot mode is used. If the field is set to '1', the fixed pilot mode is used.

PAPR_FLAG: This 1-bit field indicates whether PAPR reduction is used for the current frame in the current frame-group. If this field is set to value '1', tone reservation is used for PAPR reduction. If this field is set to '0', PAPR reduction is not used.

FRU_CONFIGURE: This 3-bit field indicates the PHY profile type configurations of the frame repetition units (FRU) that are present in the current super-frame. All profile types conveyed in the current super-frame are identified in this field in all preambles in the current super-frame. The 3-bit field has a different definition for each profile, as show in below table 8.

TABLE 8

| | Current PHY_PROFILE = '000' (base) | Current PHY_PROFILE = '001' (handheld) | Current PHY_PROFILE = '010' (advanced) | Current PHY_PROFILE = '111' (FEF) |
|---|---|---|---|---|
| FRU_CONFIGURE = 000 | Only base profile present | Only handheld profile present | Only advanced profile present | Only FEF present |
| FRU_CONFIGURE = 1XX | Handheld profile present | Base profile present | Base profile present | Base profile present |
| FRU_CONFIGURE = X1X | Advanced profile present | Advanced profile present | Handheld profile present | Handheld profile present |
| FRU_CONFIGURE = XX1 | FEF present | FEF present | FEF present | Advanced profile present |

RESERVED: This 7-bit field is reserved for future use.

FIG. 13 illustrates PLS1 data according to an embodiment of the present invention.

PLS1 data provides basic transmission parameters including parameters required to enable the reception and decoding of the PLS2. As above mentioned, the PLS1 data remain unchanged for the entire duration of one frame-group. The detailed definition of the signaling fields of the PLS1 data are as follows:

PREAMBLE_DATA: This 20-bit field is a copy of the preamble signaling data excluding the EAC_FLAG.

NUM_FRAME_FRU: This 2-bit field indicates the number of the frames per FRU.

PAYLOAD_TYPE: This 3-bit field indicates the format of the payload data carried in the frame-group. PAYLOAD_TYPE is signaled as shown in table 9.

TABLE 9

| Value | Payload type |
|---|---|
| 1XX | TS stream is transmitted |
| X1X | IP stream is transmitted |
| XX1 | GS stream is transmitted |

NUM_FSS: This 2-bit field indicates the number of FSS symbols in the current frame.

SYSTEM_VERSION: This 8-bit field indicates the version of the transmitted signal format. The SYSTEM_VERSION is divided into two 4-bit fields, which are a major version and a minor version.

Major version: The MSB four bits of SYSTEM_VERSION field indicate major version information. A change in the major version field indicates a non-backward-compatible change. The default value is '0000'. For the version described in this standard, the value is set to '0000'.

Minor version: The LSB four bits of SYSTEM_VERSION field indicate minor version information. A change in the minor version field is backward-compatible.

CELL_ID: This is a 16-bit field which uniquely identifies a geographic cell in an ATSC network. An ATSC cell coverage area may consist of one or more frequencies, depending on the number of frequencies used per Futurecast UTB system. If the value of the CELL_ID is not known or unspecified, this field is set to '0'.

NETWORK_ID: This is a 16-bit field which uniquely identifies the current ATSC network.

SYSTEM_ID: This 16-bit field uniquely identifies the Futurecast UTB system within the ATSC network. The Futurecast UTB system is the terrestrial broadcast system whose input is one or more input streams (TS, IP, GS) and whose output is an RF signal. The Futurecast UTB system carries one or more PHY profiles and FEF, if any. The same Futurecast UTB system may carry different input streams and use different RF frequencies in different geographical areas, allowing local service insertion. The frame structure and scheduling is controlled in one place and is identical for all transmissions within a Futurecast UTB system. One or more Futurecast UTB systems may have the same SYSTEM_ID meaning that they all have the same physical layer structure and configuration.

The following loop consists of FRU_PHY_PROFILE, FRU_FRAME_LENGTH, FRU_GI_FRACTION, and RESERVED which are used to indicate the FRU configuration and the length of each frame type. The loop size is fixed so that four PHY profiles (including a FEF) are signaled within the FRU. If NUM_FRAME_FRU is less than 4, the unused fields are filled with zeros.

FRU_PHY_PROFILE: This 3-bit field indicates the PHY profile type of the (i+1)th (i is the loop index) frame of the associated FRU. This field uses the same signaling format as shown in the table 8.

FRU_FRAME_LENGTH: This 2-bit field indicates the length of the (i+1)th frame of the associated FRU. Using FRU_FRAME_LENGTH together with FRU_GI_FRACTION, the exact value of the frame duration can be obtained.

FRU_GI_FRACTION: This 3-bit field indicates the guard interval fraction value of the (i+1)th frame of the associated FRU. FRU_GI_FRACTION is signaled according to the table 7.

RESERVED: This 4-bit field is reserved for future use.

The following fields provide parameters for decoding the PLS2 data.

PLS2_FEC_TYPE: This 2-bit field indicates the FEC type used by the PLS2 protection. The FEC type is signaled according to table 10. The details of the LDPC codes will be described later.

TABLE 10

| Contents | PLS2 FEC type |
|---|---|
| 00 | 4K-1/4 and 7K-3/10 LDPC codes |
| 01~11 | Reserved |

PLS2_MOD: This 3-bit field indicates the modulation type used by the PLS2. The modulation type is signaled according to table 11.

TABLE 11

| Value | PLS2_MODE |
|---|---|
| 000 | BPSK |
| 001 | QPSK |
| 010 | QAM-16 |
| 011 | NUQ-64 |
| 100~111 | Reserved |

PLS2_SIZE_CELL: This 15-bit field indicates Ctotal_partial_block, the size (specified as the number of QAM cells) of the collection of full coded blocks for PLS2 that is carried in the current frame-group. This value is constant during the entire duration of the current frame-group.

PLS2_STAT_SIZE_BIT: This 14-bit field indicates the size, in bits, of the PLS2-STAT for the current frame-group. This value is constant during the entire duration of the current frame-group.

PLS2_DYN_SIZE_BIT: This 14-bit field indicates the size, in bits, of the PLS2-DYN for the current frame-group. This value is constant during the entire duration of the current frame-group.

PLS2_REP_FLAG: This 1-bit flag indicates whether the PLS2 repetition mode is used in the current frame-group. When this field is set to value '1', the PLS2 repetition mode is activated. When this field is set to value '0', the PLS2 repetition mode is deactivated.

PLS2_REP_SIZE_CELL: This 15-bit field indicates Ctotal_partial_block, the size (specified as the number of QAM cells) of the collection of partial coded blocks for PLS2 carried in every frame of the current frame-group, when PLS2 repetition is used. If repetition is not used, the value of this field is equal to 0. This value is constant during the entire duration of the current frame-group.

PLS2_NEXT_FEC_TYPE: This 2-bit field indicates the FEC type used for PLS2 that is carried in every frame of the next frame-group. The FEC type is signaled according to the table 10.

PLS2_NEXT_MOD: This 3-bit field indicates the modulation type used for PLS2 that is carried in every frame of the next frame-group. The modulation type is signaled according to the table 11.

PLS2_NEXT_REP_FLAG: This 1-bit flag indicates whether the PLS2 repetition mode is used in the next frame-group. When this field is set to value '1', the PLS2 repetition mode is activated. When this field is set to value '0', the PLS2 repetition mode is deactivated.

PLS2_NEXT_REP_SIZE_CELL: This 15-bit field indicates Ctotal_full_block, The size (specified as the number of QAM cells) of the collection of full coded blocks for PLS2 that is carried in every frame of the next frame-group, when PLS2 repetition is used. If repetition is not used in the next frame-group, the value of this field is equal to 0. This value is constant during the entire duration of the current frame-group.

PLS2_NEXT_REP_STAT_SIZE_BIT: This 14-bit field indicates the size, in bits, of the PLS2-STAT for the next frame-group. This value is constant in the current frame-group.

PLS2_NEXT_REP_DYN_SIZE_BIT: This 14-bit field indicates the size, in bits, of the PLS2-DYN for the next frame-group. This value is constant in the current frame-group.

PLS2_AP_MODE: This 2-bit field indicates whether additional parity is provided for PLS2 in the current frame-group. This value is constant during the entire duration of the current frame-group. The below table 12 gives the values of this field. When this field is set to '00', additional parity is not used for the PLS2 in the current frame-group.

TABLE 12

| Value | PLS2-AP mode |
|---|---|
| 00 | AP is not provided |
| 01 | AP1 mode |
| 10~11 | Reserved |

PLS2_AP_SIZE_CELL: This 15-bit field indicates the size (specified as the number of QAM cells) of the additional parity bits of the PLS2. This value is constant during the entire duration of the current frame-group.

PLS2_NEXT_AP_MODE: This 2-bit field indicates whether additional parity is provided for PLS2 signaling in every frame of next frame-group. This value is constant during the entire duration of the current frame-group. The table 12 defines the values of this field PLS2_NEXT_AP_SIZE_CELL: This 15-bit field indicates the size (specified as the number of QAM cells) of the additional parity bits of the PLS2 in every frame of the next frame-group. This value is constant during the entire duration of the current frame-group.

RESERVED: This 32-bit field is reserved for future use.

CRC_32: A 32-bit error detection code, which is applied to the entire PLS1 signaling.

FIG. 14 illustrates PLS2 data according to an embodiment of the present invention.

FIG. 14 illustrates PLS2-STAT data of the PLS2 data. The PLS2-STAT data are the same within a frame-group, while the PLS2-DYN data provide information that is specific for the current frame.

The details of fields of the PLS2-STAT data are as follows:

FIC_FLAG: This 1-bit field indicates whether the FIC is used in the current frame-group. If this field is set to '1', the FIC is provided in the current frame. If this field set to '0', the FIC is not carried in the current frame. This value is constant during the entire duration of the current frame-group.

AUX_FLAG: This 1-bit field indicates whether the auxiliary stream(s) is used in the current frame-group. If this field is set to '1', the auxiliary stream is provided in the current frame. If this field set to '0', the auxiliary stream is not carried in the current frame. This value is constant during the entire duration of current frame-group.

NUM_DP: This 6-bit field indicates the number of DPs carried within the current frame. The value of this field ranges from 1 to 64, and the number of DPs is NUM_DP+1.

DP_ID: This 6-bit field identifies uniquely a DP within a PHY profile.

DP_TYPE: This 3-bit field indicates the type of the DP. This is signaled according to the below table 13.

TABLE 13

| Value | DP Type |
|---|---|
| 000 | DP Type 1 |
| 001 | DP Type 2 |
| 010~111 | reserved |

DP_GROUP_ID: This 8-bit field identifies the DP group with which the current DP is associated. This can be used by a receiver to access the DPs of the service components associated with a particular service, which will have the same DP_GROUP_ID.

BASE_DP_ID: This 6-bit field indicates the DP carrying service signaling data (such as PSI/SI) used in the Management layer. The DP indicated by BASE_DP_ID may be either a normal DP carrying the service signaling data along with the service data or a dedicated DP carrying only the service signaling data DP_FEC_TYPE: This 2-bit field indicates the FEC type used by the associated DP. The FEC type is signaled according to the below table 14.

TABLE 14

| Value | FEC_TYPE |
|---|---|
| 00 | 16K LDPC |
| 01 | 64K LDPC |
| 10~11 | Reserved |

DP_COD: This 4-bit field indicates the code rate used by the associated DP. The code rate is signaled according to the below table 15.

TABLE 15

| Value | Code rate |
|---|---|
| 0000 | 5/15 |
| 0001 | 6/15 |
| 0010 | 7/15 |
| 0011 | 8/15 |
| 0100 | 9/15 |
| 0101 | 10/15 |
| 0110 | 11/15 |
| 0111 | 12/15 |
| 1000 | 13/15 |
| 1001~1111 | Reserved |

DP_MOD: This 4-bit field indicates the modulation used by the associated DP. The modulation is signaled according to the below table 16.

TABLE 16

| Value | Modulation |
| --- | --- |
| 0000 | QPSK |
| 0001 | QAM-16 |
| 0010 | NUQ-64 |
| 0011 | NUQ-256 |
| 0100 | NUQ-1024 |
| 0101 | NUC-16 |
| 0110 | NUC-64 |
| 0111 | NUC-256 |
| 1000 | NUC-1024 |
| 1001~1111 | reserved |

DP_SSD_FLAG: This 1-bit field indicates whether the SSD mode is used in the associated DP. If this field is set to value '1', SSD is used. If this field is set to value '0', SSD is not used.

The following field appears only if PHY_PROFILE is equal to '010', which indicates the advanced profile:

DP_MIMO: This 3-bit field indicates which type of MIMO encoding process is applied to the associated DP. The type of MIMO encoding process is signaled according to the table 17.

TABLE 17

| Value | MIMO encoding |
| --- | --- |
| 000 | FR-SM |
| 001 | FRFD-SM |
| 010~111 | reserved |

DP_TI_TYPE: This 1-bit field indicates the type of time-interleaving. A value of '0' indicates that one TI group corresponds to one frame and contains one or more TI-blocks. A value of '1' indicates that one TI group is carried in more than one frame and contains only one TI-block.

DP_TI_LENGTH: The use of this 2-bit field (the allowed values are only 1, 2, 4, 8) is determined by the values set within the DP_TI_TYPE field as follows:

If the DP_TI_TYPE is set to the value '1', this field indicates PI, the number of the frames to which each TI group is mapped, and there is one TI-block per TI group (NTI=1). The allowed PI values with 2-bit field are defined in the below table 18.

If the DP_TI_TYPE is set to the value '0', this field indicates the number of TI-blocks NTI per TI group, and there is one TI group per frame (PI=1). The allowed PI values with 2-bit field are defined in the below table 18.

TABLE 18

| 2-bit field | PI | NTI |
| --- | --- | --- |
| 00 | 1 | 1 |
| 01 | 2 | 2 |
| 10 | 4 | 3 |
| 11 | 8 | 4 |

DP_FRAME_INTERVAL: This 2-bit field indicates the frame interval (IJUMP) within the frame-group for the associated DP and the allowed values are 1, 2, 4, 8 (the corresponding 2-bit field is '00', '01', '10', or '11', respectively). For DPs that do not appear every frame of the frame-group, the value of this field is equal to the interval between successive frames. For example, if a DP appears on the frames 1, 5, 9, 13, etc., this field is set to '4'. For DPs that appear in every frame, this field is set to '1'.

DP_TI_BYPASS: This 1-bit field determines the availability of time interleaver 5050. If time interleaving is not used for a DP, it is set to '1'. Whereas if time interleaving is used it is set to '0'.

DP_FIRST_FRAME_IDX: This 5-bit field indicates the index of the first frame of the super-frame in which the current DP occurs. The value of DP_FIRST_FRAME_IDX ranges from 0 to 31

DP_NUM_BLOCK_MAX: This 10-bit field indicates the maximum value of DP_NUM_BLOCKS for this DP. The value of this field has the same range as DP_NUM_BLOCKS.

DP_PAYLOAD_TYPE: This 2-bit field indicates the type of the payload data carried by the given DP. DP_PAYLOAD_TYPE is signaled according to the below table 19.

TABLE 19

| Value | Payload Type |
| --- | --- |
| 00 | TS. |
| 01 | IP |
| 10 | GS |
| 11 | reserved |

DP_INBAND_MODE: This 2-bit field indicates whether the current DP carries in-band signaling information. The in-band signaling type is signaled according to the below table 20.

TABLE 20

| Value | In-band mode |
| --- | --- |
| 00 | In-band signaling is not carried. |
| 01 | INBAND-PLS is carried only |
| 10 | INBAND-ISSY is carried only |
| 11 | INBAND-PLS and INBAND-ISSY are carried |

DP_PROTOCOL_TYPE: This 2-bit field indicates the protocol type of the payload carried by the given DP. It is signaled according to the below table 21 when input payload types are selected.

TABLE 21

| Value | If DP_PAYLOAD_TYPE Is TS | If DP_PAYLOAD_TYPE Is IP | If DP_PAYLOAD_TYPE Is GS |
| --- | --- | --- | --- |
| 00 | MPEG2-TS | IPv4 | (Note) |
| 01 | Reserved | IPv6 | Reserved |
| 10 | Reserved | Reserved | Reserved |
| 11 | Reserved | Reserved | Reserved |

DP_CRC_MODE: This 2-bit field indicates whether CRC encoding is used in the Input Formatting block. The CRC mode is signaled according to the below table 22.

TABLE 22

| Value | CRC mode |
| --- | --- |
| 00 | Not used |
| 01 | CRC-8 |
| 10 | CRC-16 |
| 11 | CRC-32 |

DNP_MODE: This 2-bit field indicates the null-packet deletion mode used by the associated DP when DP_PAYLOAD_TYPE is set to TS ('00'). DNP_MODE is signaled according to the below table 23. If DP_PAYLOAD_TYPE is not TS ('00'), DNP_MODE is set to the value '00'.

TABLE 23

| Value | Null-packet deletion mode |
|-------|---------------------------|
| 00 | Not used |
| 01 | DNP-NORMAL |
| 10 | DNP-OFFSET |
| 11 | reserved |

ISSY_MODE: This 2-bit field indicates the ISSY mode used by the associated DP when DP_PAYLOAD_TYPE is set to TS ('00'). The ISSY_MODE is signaled according to the below table 24 If DP_PAYLOAD_TYPE is not TS ('00'), ISSY_MODE is set to the value '00'.

TABLE 24

| Value | ISSY mode |
|-------|-----------|
| 00 | Not used |
| 01 | ISSY-UP |
| 10 | ISSY-BBF |
| 11 | reserved |

HC_MODE_TS: This 2-bit field indicates the TS header compression mode used by the associated DP when DP_PAYLOAD_TYPE is set to TS ('00'). The HC_MODE_TS is signaled according to the below table 25.

TABLE 25

| Value | Header compression mode |
|-------|------------------------|
| 00 | HC_MODE_TS 1 |
| 01 | HC_MODE_TS 2 |
| 10 | HC_MODE_TS 3 |
| 11 | HC_MODE_TS 4 |

HC_MODE_IP: This 2-bit field indicates the IP header compression mode when DP_PAYLOAD_TYPE is set to IP ('01'). The HC_MODE_IP is signaled according to the below table 26.

TABLE 26

| Value | Header compression mode |
|-------|------------------------|
| 00 | No compression |
| 01 | HC_MODE_IP 1 |
| 10~11 | reserved |

PID: This 13-bit field indicates the PID number for TS header compression when DP_PAYLOAD_TYPE is set to TS ('00') and HC_MODE_TS is set to '01' or '10'.

RESERVED: This 8-bit field is reserved for future use.

The following field appears only if FIC_FLAG is equal to '1':

FIC_VERSION: This 8-bit field indicates the version number of the FIC.

FIC_LENGTH_BYTE: This 13-bit field indicates the length, in bytes, of the FIC.

RESERVED: This 8-bit field is reserved for future use.

The following field appears only if AUX_FLAG is equal to '1':

NUM_AUX: This 4-bit field indicates the number of auxiliary streams. Zero means no auxiliary streams are used.

AUX_CONFIG_RFU: This 8-bit field is reserved for future use.

AUX_STREAM_TYPE: This 4-bit is reserved for future use for indicating the type of the current auxiliary stream.

AUX_PRIVATE_CONFIG: This 28-bit field is reserved for future use for signaling auxiliary streams.

FIG. 15 illustrates PLS2 data according to another embodiment of the present invention.

FIG. 15 illustrates PLS2-DYN data of the PLS2 data. The values of the PLS2-DYN data may change during the duration of one frame-group, while the size of fields remains constant.

The details of fields of the PLS2-DYN data are as follows:

FRAME_INDEX: This 5-bit field indicates the frame index of the current frame within the super-frame. The index of the first frame of the super-frame is set to '0'.

PLS_CHANGE_COUNTER: This 4-bit field indicates the number of super-frames ahead where the configuration will change. The next super-frame with changes in the configuration is indicated by the value signaled within this field. If this field is set to the value '0000', it means that no scheduled change is foreseen: e.g., value '1' indicates that there is a change in the next super-frame.

FIC_CHANGE_COUNTER: This 4-bit field indicates the number of super-frames ahead where the configuration (i.e., the contents of the FIC) will change. The next super-frame with changes in the configuration is indicated by the value signaled within this field. If this field is set to the value '0000', it means that no scheduled change is foreseen: e.g. value '0001' indicates that there is a change in the next super-frame.

RESERVED: This 16-bit field is reserved for future use.

The following fields appear in the loop over NUM_DP, which describe the parameters associated with the DP carried in the current frame.

DP_ID: This 6-bit field indicates uniquely the DP within a PHY profile.

DP_START: This 15-bit (or 13-bit) field indicates the start position of the first of the DPs using the DPU addressing scheme. The DP_START field has differing length according to the PHY profile and FFT size as shown in the below table 27.

TABLE 27

| | DP_START field size | |
|---|---|---|
| PHY profile | 64K | 16K |
| Base | 13 bits | 15 bits |
| Handheld | — | 13 bits |
| Advanced | 13 bits | 15 bits |

DP_NUM_BLOCK: This 10-bit field indicates the number of FEC blocks in the current TI group for the current DP. The value of DP_NUM_BLOCK ranges from 0 to 1023

RESERVED: This 8-bit field is reserved for future use.

The following fields indicate the FIC parameters associated with the EAC.

EAC_FLAG: This 1-bit field indicates the existence of the EAC in the current frame. This bit is the same value as the EAC_FLAG in the preamble.

EAS_WAKE_UP_VERSION_NUM: This 8-bit field indicates the version number of a wake-up indication.

If the EAC_FLAG field is equal to '1', the following 12 bits are allocated for EAC_LENGTH_BYTE field. If the EAC_FLAG field is equal to '0', the following 12 bits are allocated for EAC_COUNTER.

EAC_LENGTH_BYTE: This 12-bit field indicates the length, in byte, of the EAC.

EAC_COUNTER: This 12-bit field indicates the number of the frames before the frame where the EAC arrives.

The following field appears only if the AUX_FLAG field is equal to '1':

AUX_PRIVATE_DYN: This 48-bit field is reserved for future use for signaling auxiliary streams. The meaning of this field depends on the value of AUX_STREAM_TYPE in the configurable PLS2-STAT.

CRC_32: A 32-bit error detection code, which is applied to the entire PLS2.

FIG. 16 illustrates a logical structure of a frame according to an embodiment of the present invention.

As above mentioned, the PLS, EAC, FIC, DPs, auxiliary streams and dummy cells are mapped into the active carriers of the OFDM symbols in the frame. The PLS1 and PLS2 are first mapped into one or more FSS(s). After that, EAC cells, if any, are mapped immediately following the PLS field, followed next by FIC cells, if any. The DPs are mapped next after the PLS or EAC, FIC, if any. Type 1 DPs follows first, and Type 2 DPs next. The details of a type of the DP will be described later. In some case, DPs may carry some special data for EAS or service signaling data. The auxiliary stream or streams, if any, follow the DPs, which in turn are followed by dummy cells. Mapping them all together in the above mentioned order, i.e. PLS, EAC, FIC, DPs, auxiliary streams and dummy data cells exactly fill the cell capacity in the frame.

FIG. 17 illustrates PLS mapping according to an embodiment of the present invention.

PLS cells are mapped to the active carriers of FSS(s). Depending on the number of cells occupied by PLS, one or more symbols are designated as FSS(s), and the number of FSS(s) NFSS is signaled by NUM_FSS in PLS1. The FSS is a special symbol for carrying PLS cells. Since robustness and latency are critical issues in the PLS, the FSS(s) has higher density of pilots allowing fast synchronization and frequency-only interpolation within the FSS.

PLS cells are mapped to active carriers of the NFSS FSS(s) in a top-down manner as shown in an example in FIG. 17. The PLS1 cells are mapped first from the first cell of the first FSS in an increasing order of the cell index. The PLS2 cells follow immediately after the last cell of the PLS1 and mapping continues downward until the last cell index of the first FSS. If the total number of required PLS cells exceeds the number of active carriers of one FSS, mapping proceeds to the next FSS and continues in exactly the same manner as the first FSS.

After PLS mapping is completed, DPs are carried next. If EAC, FIC or both are present in the current frame, they are placed between PLS and "normal" DPs.

FIG. 18 illustrates EAC mapping according to an embodiment of the present invention.

EAC is a dedicated channel for carrying EAS messages and links to the DPs for EAS. EAS support is provided but EAC itself may or may not be present in every frame. EAC, if any, is mapped immediately after the PLS2 cells. EAC is not preceded by any of the FIC, DPs, auxiliary streams or dummy cells other than the PLS cells. The procedure of mapping the EAC cells is exactly the same as that of the PLS.

The EAC cells are mapped from the next cell of the PLS2 in increasing order of the cell index as shown in the example in FIG. 18. Depending on the EAS message size, EAC cells may occupy a few symbols, as shown in FIG. 18.

EAC cells follow immediately after the last cell of the PLS2, and mapping continues downward until the last cell index of the last FSS. If the total number of required EAC cells exceeds the number of remaining active carriers of the last FSS mapping proceeds to the next symbol and continues in exactly the same manner as FSS(s). The next symbol for mapping in this case is the normal data symbol, which has more active carriers than a FSS.

After EAC mapping is completed, the FIC is carried next, if any exists. If FIC is not transmitted (as signaled in the PLS2 field), DPs follow immediately after the last cell of the EAC.

Figure 19B:
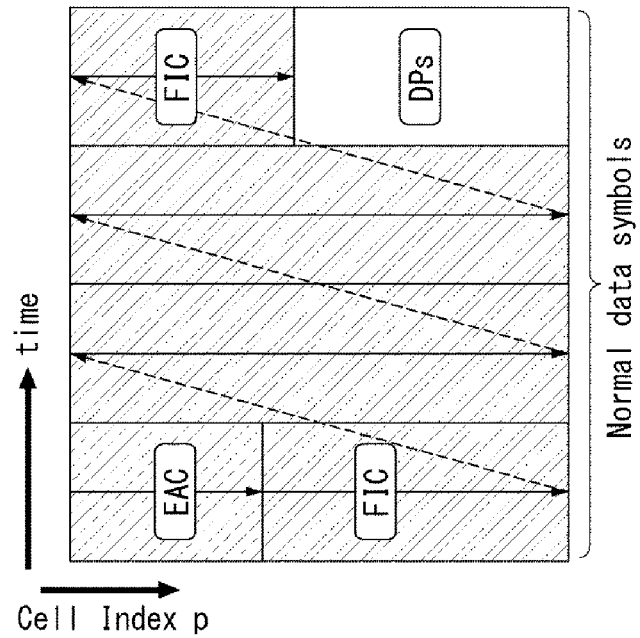
FIG. 19(a) and FIG. 19(b) illustrate FIC mapping according to an embodiment of the present invention.
Figure 19A:
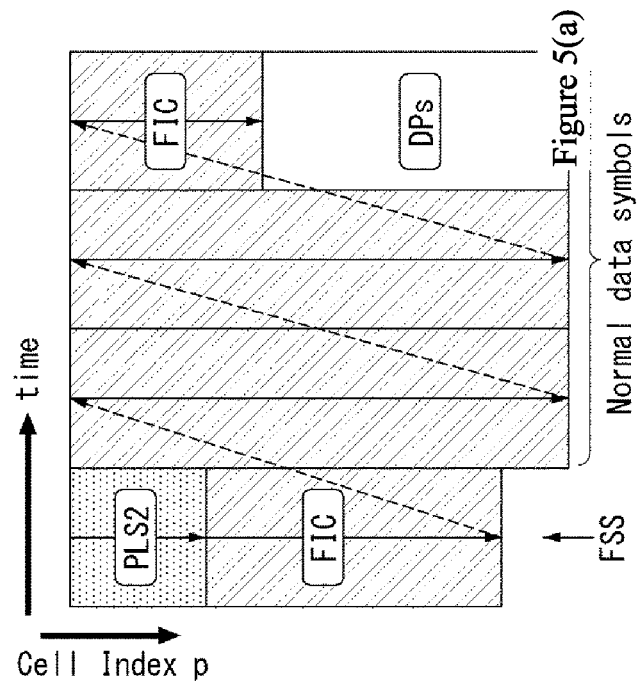

FIG. 19 illustrates FIC mapping according to an embodiment of the present invention.

(a) shows an example mapping of an FIC cell without EAC and (b) shows an example mapping of an FIC cell with EAC.

FIC is a dedicated channel for carrying cross-layer information to enable fast service acquisition and channel scanning. This information primarily includes channel binding information between DPs and the services of each broadcaster. For fast scan, a receiver can decode FIC and obtain information such as broadcaster ID, number of services, and BASE_DP_ID. For fast service acquisition, in addition to FIC, base DP can be decoded using BASE_DP_ID. Other than the content it carries, a base DP is encoded and mapped to a frame in exactly the same way as a normal DP. Therefore, no additional description is required for a base DP. The FIC data is generated and consumed in the Management Layer. The content of FIC data is as described in the Management Layer specification.

The FIC data is optional and the use of FIC is signaled by the FIC_FLAG parameter in the static part of the PLS2. If FIC is used, FIC_FLAG is set to '1' and the signaling field for FIC is defined in the static part of PLS2. Signaled in this field are FIC_VERSION, and FIC_LENGTH_BYTE. FIC uses the same modulation, coding and time interleaving parameters as PLS2. FIC shares the same signaling parameters such as PLS2 MOD and PLS2 FEC. FIC data, if any, is mapped immediately after PLS2 or EAC if any. FIC is not preceded by any normal DPs, auxiliary streams or dummy cells. The method of mapping FIC cells is exactly the same as that of EAC which is again the same as PLS.

Without EAC after PLS, FIC cells are mapped from the next cell of the PLS2 in an increasing order of the cell index as shown in an example in (a). Depending on the FIC data size, FIC cells may be mapped over a few symbols, as shown in (b).

FIC cells follow immediately after the last cell of the PLS2, and mapping continues downward until the last cell index of the last FSS. If the total number of required FIC cells exceeds the number of remaining active carriers of the last FSS, mapping proceeds to the next symbol and continues in exactly the same manner as FSS(s). The next symbol for mapping in this case is the normal data symbol which has more active carriers than a FSS.

If EAS messages are transmitted in the current frame, EAC precedes FIC, and FIC cells are mapped from the next cell of the EAC in an increasing order of the cell index as shown in (b).

After FIC mapping is completed, one or more DPs are mapped, followed by auxiliary streams, if any, and dummy cells.

Figure 20B:
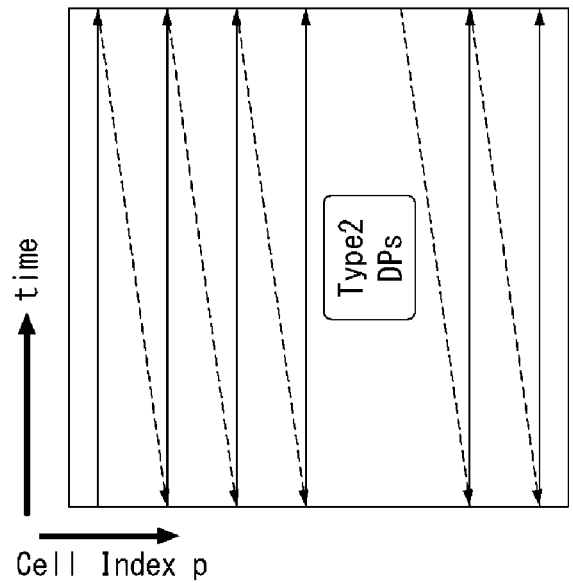
FIG. 20(a) and FIG. 20(b) illustrate a type of DP according to an embodiment of the present invention.
Figure 20A:
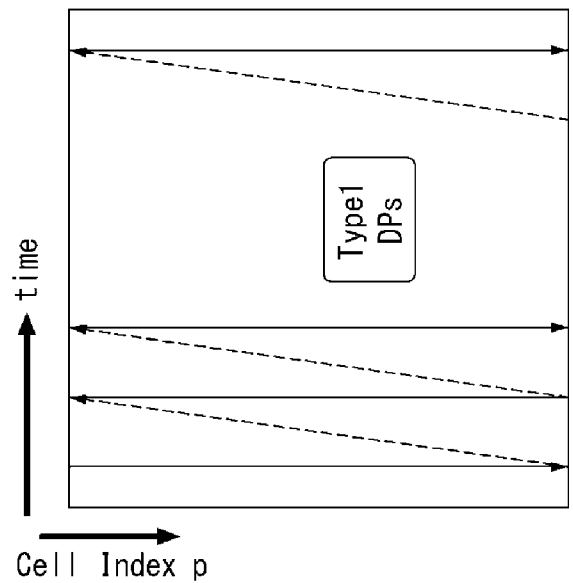

FIG. 20 illustrates a type of DP according to an embodiment of the present invention.

shows type 1 DP and (b) shows type 2 DP.

After the preceding channels, i.e., PLS, EAC and FIC, are mapped, cells of the DPs are mapped. A DP is categorized into one of two types according to mapping method:

Type 1 DP: DP is mapped by TDM
Type 2 DP: DP is mapped by FDM

The type of DP is indicated by DP_TYPE field in the static part of PLS2. FIG. 20 illustrates the mapping orders of Type 1 DPs and Type 2 DPs. Type 1 DPs are first mapped in the increasing order of cell index, and then after reaching the last cell index, the symbol index is increased by one. Within the next symbol, the DP continues to be mapped in the increasing order of cell index starting from p=0. With a number of DPs mapped together in one frame, each of the Type 1 DPs are grouped in time, similar to TDM multiplexing of DPs.

Type 2 DPs are first mapped in the increasing order of symbol index, and then after reaching the last OFDM symbol of the frame, the cell index increases by one and the symbol index rolls back to the first available symbol and then increases from that symbol index. After mapping a number of DPs together in one frame, each of the Type 2 DPs are grouped in frequency together, similar to FDM multiplexing of DPs.

Type 1 DPs and Type 2 DPs can coexist in a frame if needed with one restriction; Type 1 DPs always precede Type 2 DPs. The total number of OFDM cells carrying Type 1 and Type 2 DPs cannot exceed the total number of OFDM cells available for transmission of DPs:

$$D_{DP1}+D_{DP2} \leq D_{DP} \quad (2)$$

where DDP1 is the number of OFDM cells occupied by Type 1 DPs, DDP2 is the number of cells occupied by Type 2 DPs. Since PLS, EAC, FIC are all mapped in the same way as Type 1 DP, they all follow "Type 1 mapping rule". Hence, overall, Type 1 mapping always precedes Type 2 mapping.

Figures 21A, 21B:
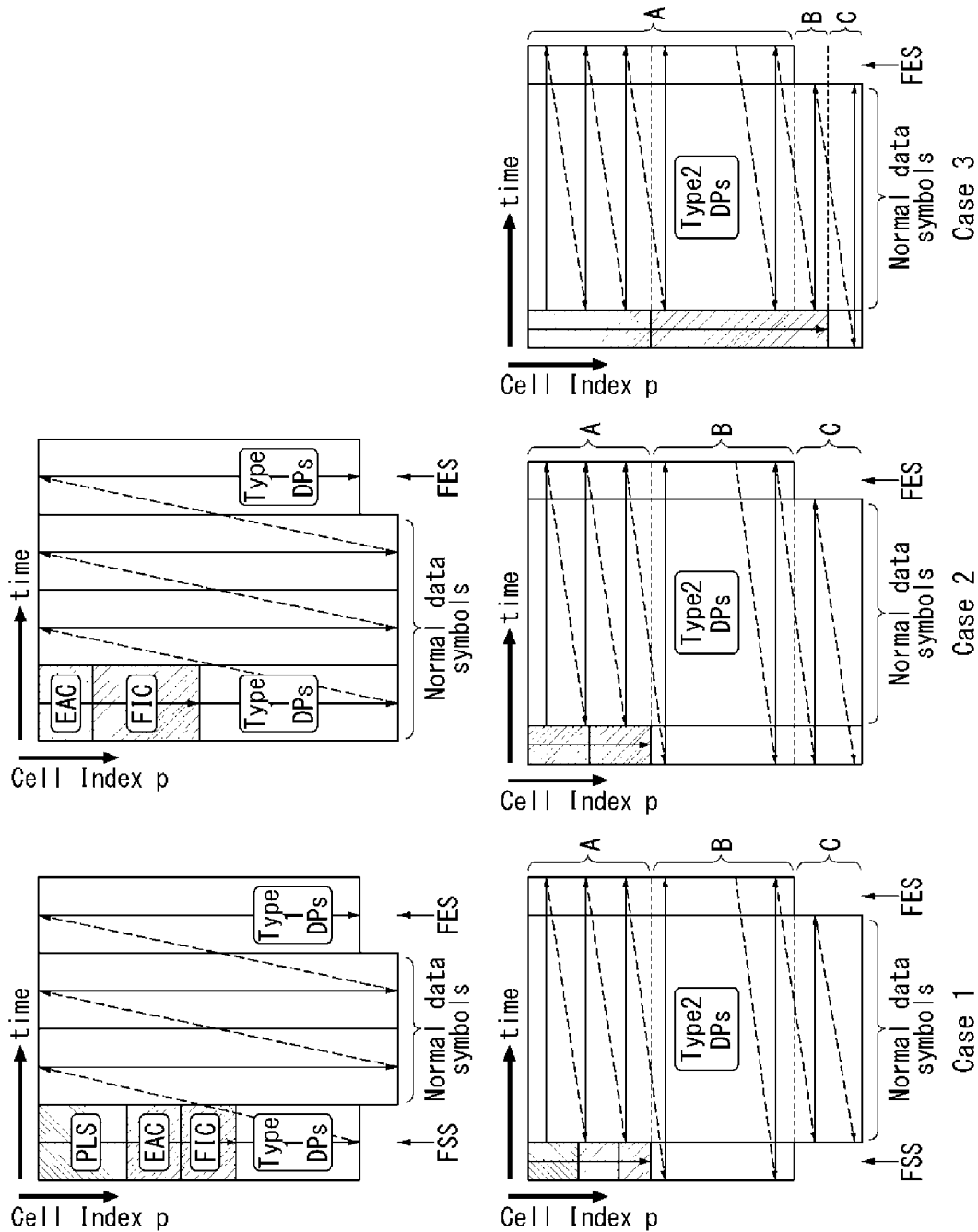
FIG. 21(a) and FIG. 21(b) illustrate DP mapping according to an embodiment of the present invention.

FIG. 21 illustrates DP mapping according to an embodiment of the present invention.

shows an addressing of OFDM cells for mapping type 1 DPs and (b) shows the addressing of OFDM cells for mapping for type 2 DPs.

Addressing of OFDM cells for mapping Type 1 DPs (0, . . . , DDP1–1) is defined for the active data cells of Type 1 DPs. The addressing scheme defines the order in which the cells from the TIs for each of the Type 1 DPs are allocated to the active data cells. It is also used to signal the locations of the DPs in the dynamic part of the PLS2.

Without EAC and FIC, address 0 refers to the cell immediately following the last cell carrying PLS in the last FSS. If EAC is transmitted and FIC is not in the corresponding frame, address 0 refers to the cell immediately following the last cell carrying EAC. If FIC is transmitted in the corresponding frame, address 0 refers to the cell immediately following the last cell carrying FIC. Address 0 for Type 1 DPs can be calculated considering two different cases as shown in (a). In the example in (a), PLS, EAC and FIC are assumed to be all transmitted. Extension to the cases where either or both of EAC and FIC are omitted is straightforward. If there are remaining cells in the FSS after mapping all the cells up to FIC as shown on the left side of (a).

Addressing of OFDM cells for mapping Type 2 DPs (0, . . . , DDP2–1) is defined for the active data cells of Type 2 DPs. The addressing scheme defines the order in which the cells from the TIs for each of the Type 2 DPs are allocated to the active data cells. It is also used to signal the locations of the DPs in the dynamic part of the PLS2.

Three slightly different cases are possible as shown in (b). For the first case shown on the left side of (b), cells in the last FSS are available for Type 2 DP mapping. For the second case shown in the middle, FIC occupies cells of a normal symbol, but the number of FIC cells on that symbol is not larger than CFSS. The third case, shown on the right side in (b), is the same as the second case except that the number of FIC cells mapped on that symbol exceeds CFSS.

The extension to the case where Type 1 DP(s) precede Type 2 DP(s) is straightforward since PLS, EAC and FIC follow the same "Type 1 mapping rule" as the Type 1 DP(s).

A data pipe unit (DPU) is a basic unit for allocating data cells to a DP in a frame.

A DPU is defined as a signaling unit for locating DPs in a frame. A Cell Mapper 7010 may map the cells produced by the TIs for each of the DPs. A Time interleaver 5050 outputs a series of TI-blocks and each TI-block comprises a variable number of XFECBLOCKs which is in turn composed of a set of cells. The number of cells in an XFECBLOCK, Ncells, is dependent on the FECBLOCK size, Nldpc, and the number of transmitted bits per constellation symbol. A DPU is defined as the greatest common divisor of all possible values of the number of cells in a XFECBLOCK, Ncells, supported in a given PHY profile. The length of a DPU in cells is defined as LDPU. Since each PHY profile supports different combinations of FECBLOCK size and a different number of bits per constellation symbol, LDPU is defined on a PHY profile basis.

FIG. 22 illustrates an FEC structure according to an embodiment of the present invention.

FIG. 22 illustrates an FEC structure according to an embodiment of the present invention before bit interleaving. As above mentioned, Data FEC encoder may perform the FEC encoding on the input BBF to generate FECBLOCK procedure using outer coding (BCH), and inner coding (LDPC). The illustrated FEC structure corresponds to the FECBLOCK. Also, the FECBLOCK and the FEC structure have same value corresponding to a length of LDPC codeword.

The BCH encoding is applied to each BBF (Kbch bits), and then LDPC encoding is applied to BCH-encoded BBF (Kldpc bits=Nbch bits) as illustrated in FIG. 22.

The value of Nldpc is either 64800 bits (long FECBLOCK) or 16200 bits (short FECBLOCK).

The below table 28 and table 29 show FEC encoding parameters for a long FECBLOCK and a short FECBLOCK, respectively.

TABLE 28

| LDPC Rate | Nldpc | Kldpc | Kbch | BCH error correction capability | Nbch – Kbch |
|---|---|---|---|---|---|
| 5/15 | 64800 | 21600 | 21408 | 12 | 192 |
| 6/15 | | 25920 | 25728 | | |
| 7/15 | | 30240 | 30048 | | |
| 8/15 | | 34560 | 34368 | | |
| 9/15 | | 38880 | 38688 | | |
| 10/15 | | 43200 | 43008 | | |
| 11/15 | | 47520 | 47328 | | |
| 12/15 | | 51840 | 51648 | | |
| 13/15 | | 56160 | 55968 | | |

TABLE 29

| LDPC Rate | Nldpc | Kldpc | Kbch | BCH error correction capability | Nbch – Kbch |
|---|---|---|---|---|---|
| 5/15 | 16200 | 5400 | 5232 | 12 | 168 |
| 6/15 | | 6480 | 6312 | | |
| 7/15 | | 7560 | 7392 | | |
| 8/15 | | 8640 | 8472 | | |
| 9/15 | | 9720 | 9552 | | |
| 10/15 | | 10800 | 10632 | | |
| 11/15 | | 11880 | 11712 | | |
| 12/15 | | 12960 | 12792 | | |
| 13/15 | | 14040 | 13872 | | |

The details of operations of the BCH encoding and LDPC encoding are as follows:

A 12-error correcting BCH code is used for outer encoding of the BBF. The BCH generator polynomial for short FECBLOCK and long FECBLOCK are obtained by multiplying together all polynomials.

LDPC code is used to encode the output of the outer BCH encoding. To generate a completed Bldpc (FECBLOCK), Pldpc (parity bits) is encoded systematically from each Ildpc (BCH-encoded BBF), and appended to Ildpc. The completed Bldpc (FECBLOCK) are expressed as follow Math figure.

$$B_{ldpc} = [I_{ldpc} P_{ldpc}] = [i_0, i_1, \ldots, i_{K_{ldpc}-1}, p_0, p_1, \ldots p_{N_{ldpc}-K_{ldpc}-1}] \quad (3)$$

The parameters for long FECBLOCK and short FECBLOCK are given in the above table 28 and 29, respectively.

The detailed procedure to calculate Nldpc Kldpc parity bits for long FECBLOCK, is as follows:

1) Initialize the parity bits, $$p_0 = p_1 = p_2 = \ldots = p_{N_{ldpc}-K_{ldpc}-1} = 0 \quad (4)$$

2) Accumulate the first information bit—i0, at parity bit addresses specified in the first row of addresses of parity check matrix. The details of addresses of parity check matrix will be described later. For example, for rate 13/15:

$$p_{983} = p_{983} \oplus i_0 \quad p_{2815} = p_{2815} \oplus i_0 \quad p_{4837} = p_{4837} \oplus i_0$$
$$p_{4989} = p_{4989} \oplus i_0 \quad p_{6138} = p_{6138} \oplus i_0$$
$$p_{6458} = p_{6458} \oplus i_0 \quad p_{6921} = p_{6921} \oplus i_0$$
$$p_{6974} = p_{6974} \oplus i_0 \quad p_{7572} = p_{7572} \oplus i_0$$
$$p_{8260} = p_{8260} \oplus i_0 \quad p_{8496} = p_{8496} \oplus i_0 \quad (5)$$

3) For the next 359 information bits, is, s=1, 2, . . . , 359 accumulate is at parity bit addresses using following Math figure.

$$\{x + (s \bmod 360) \times Q_{ldpc}\} \bmod (N_{ldpc} - K_{ldpc}) \quad (6)$$

where x denotes the address of the parity bit accumulator corresponding to the first bit i0, and Qldpc is a code rate dependent constant specified in the addresses of parity check matrix. Continuing with the example, Qldpc=24 for rate 13/15, so for information bit i1, the following operations are performed:

$$p_{1007} = p_{1007} \oplus i_1 \quad p_{2839} = p_{2839} \oplus i_1 p_{4861} = p_{4861} \oplus i_1$$
$$p_{5013} = p_{5013} \oplus i_1 p_{6162} = p_{6162} \oplus i_1$$
$$p_{6482} = p_{6482} \oplus i_1 p_{6945} = p_{6945} \oplus i_1$$
$$p_{6998} = p_{6998} \oplus i_1 p_{7596} = p_{7596} \oplus i_1$$
$$p_{8284} = p_{8284} \oplus i_1 p_{8520} = p_{8520} \oplus i_1 \quad (7)$$

4) For the 361st information bit i360, the addresses of the parity bit accumulators are given in the second row of the addresses of parity check matrix. In a similar manner the addresses of the parity bit accumulators for the following 359 information bits is, s=361, 362, . . . , 719 are obtained using the Math FIG. 6, where x denotes the address of the parity bit accumulator corresponding to the information bit i360, i.e., the entries in the second row of the addresses of parity check matrix.

5) In a similar manner, for every group of 360 new information bits, a new row from addresses of parity check matrixes used to find the addresses of the parity bit accumulators.

After all of the information bits are exhausted, the final parity bits are obtained as follows:

6) Sequentially perform the following operations starting with i=1

$$p_i = p_i \oplus p_{i-1}, \, i=1,2, \ldots, N_{ldpc}-K_{ldpc}-1 \quad (8)$$

where final content of pi, i=0, 1, . . . Nldpc −Kldpc −1 is equal to the parity bit pi.

TABLE 30

| Code Rate | Qldpc |
|---|---|
| 5/15 | 120 |
| 6/15 | 108 |
| 7/15 | 96 |
| 8/15 | 84 |
| 9/15 | 72 |
| 10/15 | 60 |
| 11/15 | 48 |
| 12/15 | 36 |
| 13/15 | 24 |

This LDPC encoding procedure for a short FECBLOCK is in accordance with t LDPC encoding procedure for the long FECBLOCK, except replacing the table 30 with table 31, and replacing the addresses of parity check matrix for the long FECBLOCK with the addresses of parity check matrix for the short FECBLOCK.

TABLE 31

| Code Rate | Qldpc |
|---|---|
| 5/15 | 30 |
| 6/15 | 27 |
| 7/15 | 24 |
| 8/15 | 21 |
| 9/15 | 18 |
| 10/15 | 15 |
| 11/15 | 12 |
| 12/15 | 9 |
| 13/15 | 6 |

FIG. 23 illustrates a bit interleaving according to an embodiment of the present invention.

The outputs of the LDPC encoder are bit-interleaved, which consists of parity interleaving followed by Quasi-Cyclic Block (QCB) interleaving and inner-group interleaving.

shows Quasi-Cyclic Block (QCB) interleaving and (b) shows inner-group interleaving.

The FECBLOCK may be parity interleaved. At the output of the parity interleaving, the LDPC codeword consists of 180 adjacent QC blocks in a long FECBLOCK and 45 adjacent QC blocks in a short FECBLOCK. Each QC block in either a long or short FECBLOCK consists of 360 bits. The parity interleaved LDPC codeword is interleaved by QCB interleaving. The unit of QCB interleaving is a QC block. The QC blocks at the output of parity interleaving are permutated by QCB interleaving as illustrated in FIG. 23, where Ncells=64800/ηmod or 16200/ηmod according to the FECBLOCK length. The QCB interleaving pattern is unique to each combination of modulation type and LDPC code rate.

After QCB interleaving, inner-group interleaving is performed according to modulation type and order (ηmod) which is defined in the below table 32. The number of QC blocks for one inner-group, NQCB_IG, is also defined.

TABLE 32

| Modulation type | ηmod | NQCB_IG |
|---|---|---|
| QAM-16 | 4 | 2 |
| NUC-16 | 4 | 4 |
| NUQ-64 | 6 | 3 |
| NUC-64 | 6 | 6 |
| NUQ-256 | 8 | 4 |
| NUC-256 | 8 | 8 |

TABLE 32-continued

| Modulation type | ηmod | NQCB_IG |
|---|---|---|
| NUQ-1024 | 10 | 5 |
| NUC-1024 | 10 | 10 |

The inner-group interleaving process is performed with NQCB_IG QC blocks of the QCB interleaving output. Inner-group interleaving has a process of writing and reading the bits of the inner-group using 360 columns and NQCB_IG rows. In the write operation, the bits from the QCB interleaving output are written row-wise. The read operation is performed column-wise to read out m bits from each row, where m is equal to 1 for NUC and 2 for NUQ.

Figure 24A:
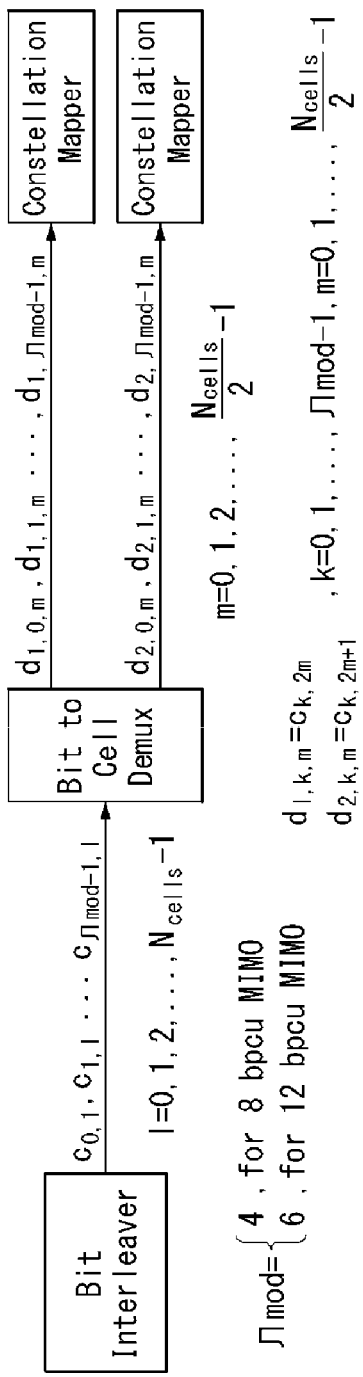
FIG. 24(a) and FIG. 24(b) illustrate a cell-word demultiplexing according to an embodiment of the present invention.
Figure 24B:
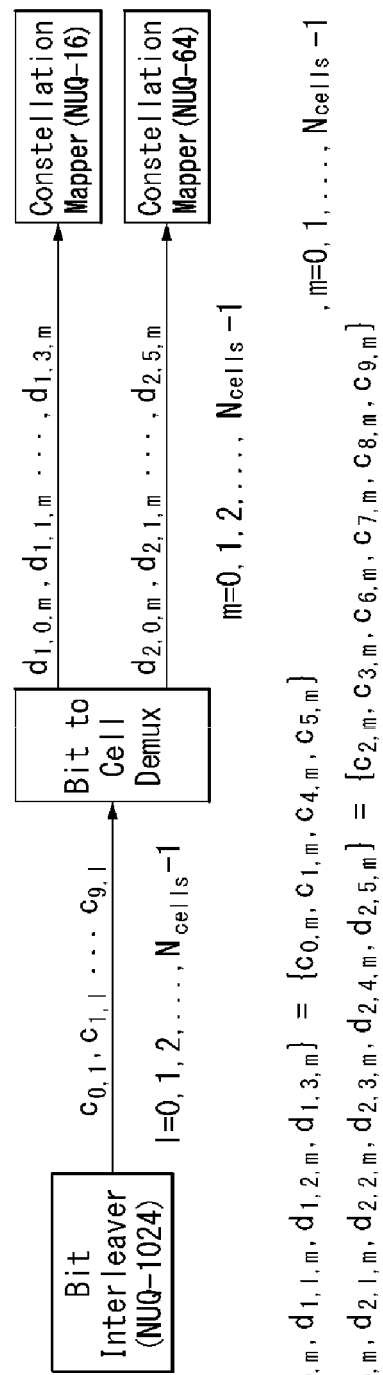

FIG. 24 illustrates a cell-word demultiplexing according to an embodiment of the present invention.

shows a cell-word demultiplexing for 8 and 12 bpcu MIMO and (b) shows a cell-word demultiplexing for 10 bpcu MIMO.

Each cell word (c0,l, c1,l, ..., cηmod−1,l) of the bit interleaving output is demultiplexed into (d1,0,m, d1,1,m..., d1,ηmod−1,m) and (d2,0,m, d2,1,m..., d2,ηmod−1,m) as shown in (a), which describes the cell-word demultiplexing process for one XFECBLOCK.

For the 10 bpcu MIMO case using different types of NUQ for MIMO encoding, the Bit Interleaver for NUQ-1024 is re-used. Each cell word (c0,l, c1,l, ..., c9,l) of the Bit Interleaver output is demultiplexed into (d1,0,m, d1,1,m..., d1,3,m) and (d2,0,m, d2,1,m..., d2,5,m), as shown in (b).

Figure 25A:
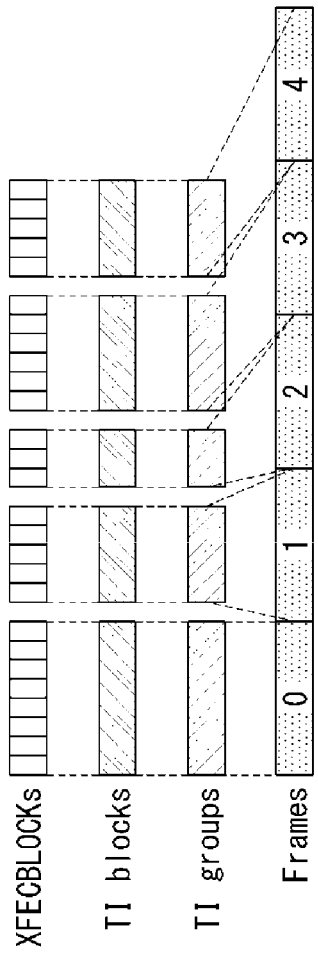
FIG. 25(a), FIG. 25(b) and FIG. 25(c) illustrate a time interleaving according to an embodiment of the present invention.
Figure 25B:
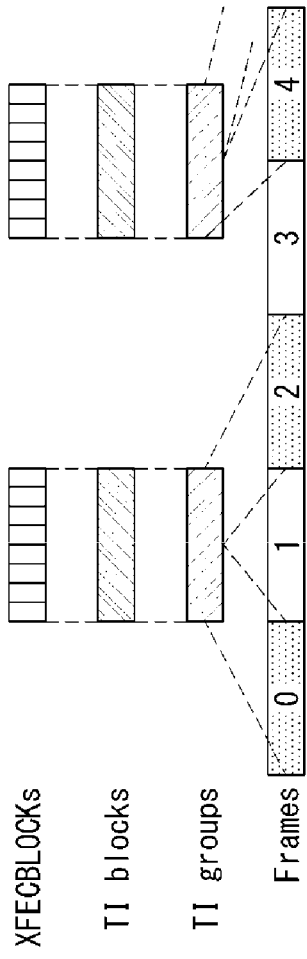
Figure 25C:
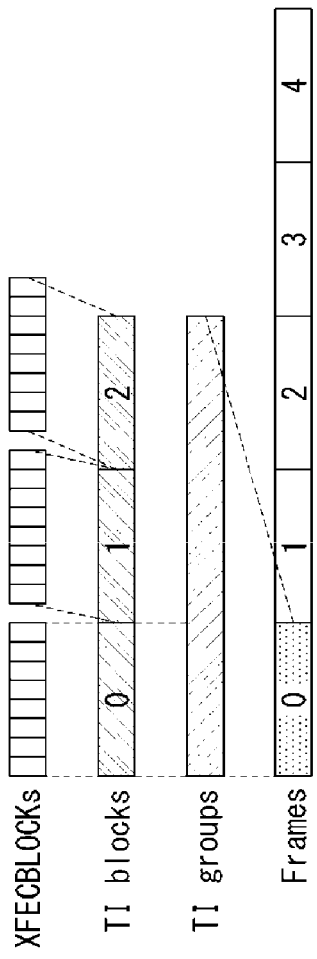

FIG. 25 illustrates a time interleaving according to an embodiment of the present invention.

to (c) show examples of TI mode.

The time interleaver operates at the DP level. The parameters of time interleaving (TI) may be set differently for each DP.

The following parameters, which appear in part of the PLS2-STAT data, configure the TI:

DP_TI_TYPE (allowed values: 0 or 1): Represents the TI mode; '0' indicates the mode with multiple TI blocks (more than one TI block) per TI group. In this case, one TI group is directly mapped to one frame (no inter-frame interleaving). '1' indicates the mode with only one TI block per TI group. In this case, the TI block may be spread over more than one frame (inter-frame interleaving).

DP_TI_LENGTH: If DP_TI_TYPE '0', this parameter is the number of TI blocks NTI per TI group. For DP_TI_TYPE='1', this parameter is the number of frames PI spread from one TI group.

DP_NUM_BLOCK_MAX (allowed values: 0 to 1023): Represents the maximum number of XFECBLOCKs per TI group.

DP_FRAME_INTERVAL (allowed values: 1, 2, 4, 8): Represents the number of the frames IJUMP between two successive frames carrying the same DP of a given PHY profile.

DP_TI_BYPASS (allowed values: 0 or 1): If time interleaving is not used for a DP, this parameter is set to '1'. It is set to '0' if time interleaving is used.

Additionally, the parameter DP_NUM_BLOCK from the PLS2-DYN data is used to represent the number of XFEC-BLOCKs carried by one TI group of the DP.

When time interleaving is not used for a DP, the following TI group, time interleaving operation, and TI mode are not considered. However, the Delay Compensation block for the dynamic configuration information from the scheduler will still be required. In each DP, the XFECBLOCKs received from the SSD/MIMO encoding are grouped into TI groups. That is, each TI group is a set of an integer number of XFECBLOCKs and will contain a dynamically variable number of XFECBLOCKs. The number of XFECBLOCKs in the TI group of index n is denoted by NxBLOCK_Group (n) and is signaled as DP_NUM_BLOCK in the PLS2-DYN data. Note that NxBLOCK_Group(n) may vary from the minimum value of 0 to the maximum value NxBLOCK_Group_MAX (corresponding to DP_NUM_BLOCK_MAX) of which the largest value is 1023.

Each TI group is either mapped directly onto one frame or spread over PI frames. Each TI group is also divided into more than one TI blocks(NTI), where each TI block corresponds to one usage of time interleaver memory. The TI blocks within the TI group may contain slightly different numbers of XFECBLOCKs. If the TI group is divided into multiple TI blocks, it is directly mapped to only one frame. There are three options for time interleaving (except the extra option of skipping the time interleaving) as shown in the below table 33.

TABLE 33

| Mode | Description |
|---|---|
| Option-1 | Each TI group contains one TI block and is mapped directly to one frame as shown in (a). This option is signaled in the PLS2-STAT by DP_TI_TYPE = '0' and DP_TI_LENGTH = '1'(NTI = 1). |
| Option-2 | Each TI group contains one TI block and is mapped to more than one frame. (b) shows an example, where one TI group is mapped to two frames, i.e., DP_TI_LENGTH = '2' (PI = 2) and DP_FRAME_INTERVAL (IJUMP = 2). This provides greater time diversity for low data-rate services. This option is signaled in the PLS2-STAT by DP_TI_TYPE = '1'. |
| Option-3 | Each TI group is divided into multiple TI blocks and is mapped directly to one frame as shown in (c). Each TI block may use full TI memory, so as to provide the maximum bit-rate for a DP. This option is signaled in the PLS2-STAT signaling by DP_TI_TYPE = '0' and DP_TI_LENGTH = NTI, while PI = 1. |

In each DP, the TI memory stores the input XFEC-BLOCKs (output XFECBLOCKs from the SSD/MIMO encoding block). Assume that input XFECBLOCKs are defined as $$(d_{n,s,0,0}, d_{n,s,0,1}, \ldots, d_{n,s,0,N_{cells}-1}, d_{n,s,1,0}, \ldots, d_{n,s,1,N_{cells}-1}, \ldots, d_{n,s,N_{xBLOCK}-TI_{(n,s)}-1,0}, \ldots, d_{n,s,N_{xBLOCK}-TI_{(n,s)}-1,N_{cells}-1}),$$

where $d_{n,s,r,q}$ is the qth cell of the rth XFECBLOCK in the sth TI block of the nth TI group and represents the outputs of SSD and MIMO encodings as follows $$d_{n,s,r,q} = \begin{cases} f_{n,s,r,q}, & \text{the output of } SSD \ldots \text{ encoding} \\ g_{n,s,r,q}, & \text{the output of } MIMO \text{ encoding} \end{cases}.$$

In addition, assume that output XFECBLOCKs from the time interleaver 5050 are defined as $$(h_{n,s,0}, h_{n,s,1}, \ldots, h_{n,s,i}, \ldots, h_{n,s,N_{xBlock}-TI_{(n,s)}\times N_{cells}-1}),$$

where $h_{n,s,i}$ the ith output cell (for i=0, ..., $N_{xBLOCK\_TI}$ (n,s)×$N_{cells}$−1) in the sth TI block of the nth TI group.

Typically, the time interleaver will also act as a buffer for DP data prior to the process of frame building. This is achieved by means of two memory banks for each DP. The first TI-block is written to the first bank. The second TI-block is written to the second bank while the first bank is being read from and so on.

The TI is a twisted row-column block interleaver. For the sth TI block of the nth TI group, the number of rows $N_r$ of a TI memory is equal to the number of cells $N_{cells}$, i.e., $N_r=N_{cells}$ while the number of columns $N_c$ is equal to the number $N_{xBLOCK\_TI}(n,s)$ Hereinafter, a method of deleting null packets through the null packet deletion block using the deleted null packet indicator (DNPI) and the deleted null packet (DNP) structure proposed by the present invention is described in detail.

FIG. 26 is a diagram illustrating an example of the mode adaptation module of a transmission apparatus to which proposed methods may be applied.

Figures 26A, 26B:
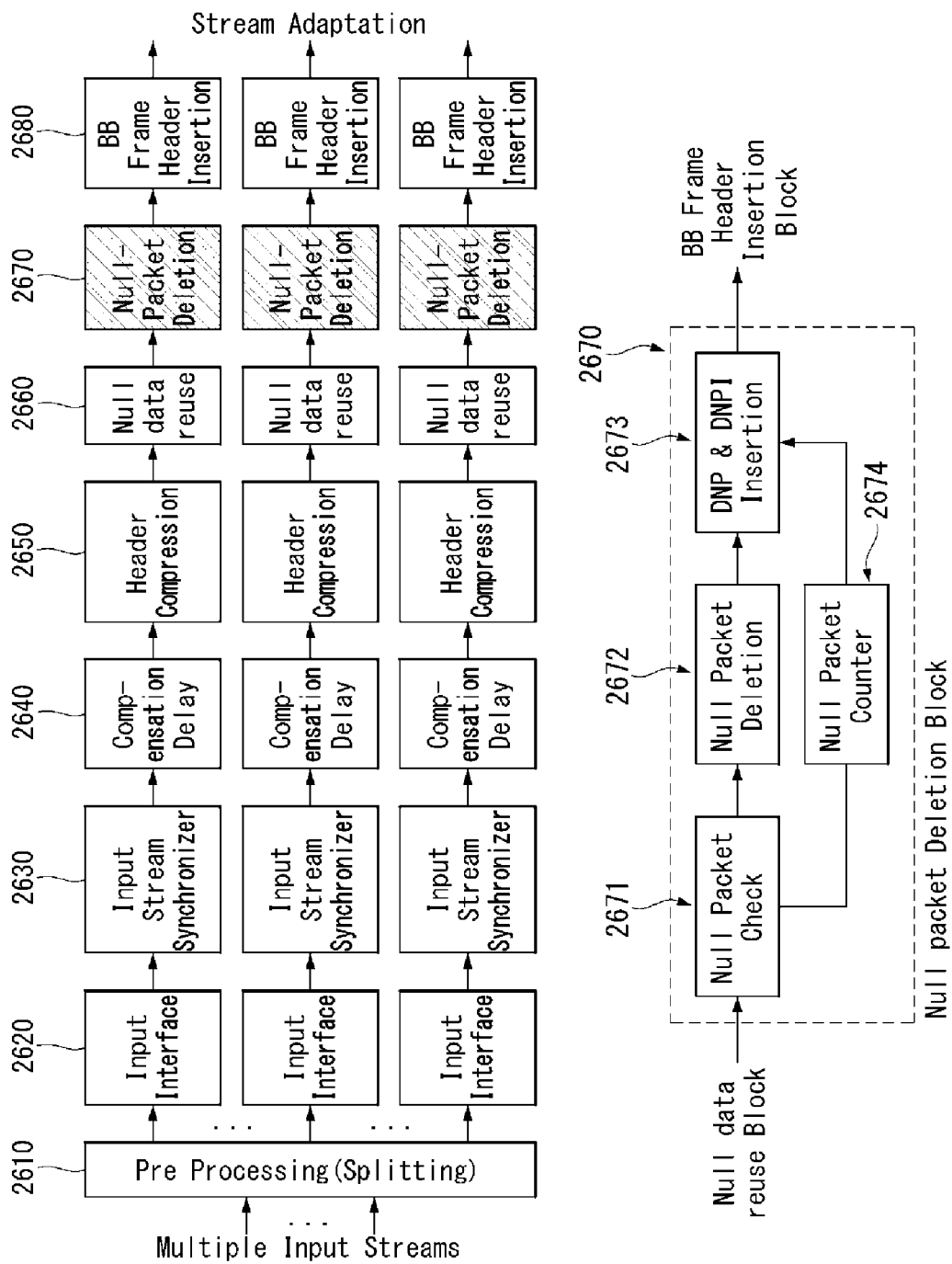
FIG. 26(a) and FIG. 26(b) are diagrams illustrating an example of the mode adaptation module of a transmission apparatus to which proposed methods may be applied.

More specifically, FIG. 26(a) illustrates an example of an internal block diagram of the mode adaptation module, and FIG. 26(b) illustrates an example of an internal block diagram of the null packet deletion block of FIGS. 3 and 26(a).

Each internal block diagram of the mode adaptation module of FIGS. 3 and 26(a) is operated independently, and the order of each internal block diagram of the mode adaptation module can be changed.

As illustrated in FIG. 26(a), the mode adaptation module may be configured to include at least one of pre-processing (or splitting) blocks 2610, input interface blocks 2620, input stream synchronizer blocks 2630, compensating delay blocks 2640, header compression blocks 2650, null data reuse blocks 2660, null packet deletion blocks 2670, and BB frame header insertion blocks 2680.

The pre-processing block 2610 may split or demultiplex a plurality of input streams into a plurality of data pipes.

The pre-processing block 2610 may perform the same function as that of the input stream splitter of FIG. 3. Accordingly, the pre-processing block may be represented as the input stream splitter.

In this case, the data pipe may also be called a physical layer pipe (PLP). In this case, an input stream may be a TS (MPEG2-TS), an Internet protocol (IP) and/or a generic stream (GS). In some embodiments, an input stream of another form is possible.

The header compression block 2650 may compress a packet header. Such compression may be performed in order to increase transfer efficiency of a TS or IP input stream. Since a receiver already has priori information about a header, known data may be deleted from a transmitter. For example, information, such as a PID, may be compressed, and pieces of information of other forms may be deleted or replaced. In some embodiments, the header compression block may be placed behind the null packet deletion block.

The null data reuse block 2660 may perform an operation for inserting null data into a packet after header compression. The null data reuse block 2660 may be omitted in some embodiments.

The null packet deletion block 2670 preferably may be used in the case of a TS input stream.

Specific TS input streams or TS streams split by the pre-processing block may include a lot of null packets in order to support variable bit rate (VBR) services in a constant bit rate (CBR) TS stream.

Accordingly, the transmission apparatus may identify null packets and may not send the identified null packets in order to reduce overhead attributable to the transmission of unnecessary packets.

The reception apparatus accurately inserts deleted null packets into their original locations using a DNP counter (or DNP) with respect to the null packets deleted by the transmission apparatus.

The null packet deletion block 2670 checks whether a null packet is present or not through a DNPI included in a TS packet header and inserts a DNP into the location of a deleted null packet only when a null packet is present.

As illustrated in FIG. 26(b), the null packet deletion block 2670 may be configured to include a null packet check (sub) block 2671, a null packet deletion (sub) block 2672, a DNP and DNPI insertion (sub) block 2673, and a null packet counter (sub) block 2674.

In this case, the term "block" may also be called as a "module" or a "unit."

An element(s) other than the elements of FIG. 26(a) may be added to the mode adaptation module of the transmission apparatus, or some of the elements of FIG. 26(a) may be omitted from the mode adaptation module of the transmission apparatus.

The null packet check block 2671 checks whether a corresponding packet is a null packet by analyzing the packet identifier (PID) of an input TS packet, that is, a packet output by the null data reuse block.

If, as a result of the check, the corresponding packet is a null packet, the null packet is deleted by the null packet deletion block 2672, and the value of a null packet counter in the null packet counter block 2674 is increased by 1 whenever a null packet is deleted.

If, as a result of the check, a corresponding packet is not a null packet, the null packet deletion block 2672 performs no operation, and the value of the null packet counter in the null packet counter block is reset to "0".

In this case, the concept of the null packet counter may be the same as that of a DNP to be described later.

The DNP and DNPI insertion block 2673 inserts a DNP ahead of a TS packet that is transmitted after a null packet and a DNPI in TS packet header with reference to the value of the null packet counter of the null packet counter block.

That is, the DNP and DNPI insertion block 2673 generates a DNP based on the value of the null packet counter and inserts a deleted null packet indicator (DNPI) indicative of whether a null packet is present or not in TS packet header.

As described above, the value of the null packet counter is the same as a value set in a DNP that is inserted into a location from which a null packet is deleted.

For example, the DNPI may be set to "1" if a null packet is present, may be set to "0" if a null packet is not present, and may be included in a TS packet header. In this case, the setting value of the DNPI may be changed depending on an implementation method.

FIG. 27 is a diagram illustrating an example of the mode adaptation module of a reception apparatus proposed by the present invention.

Figures 26B, 27A:
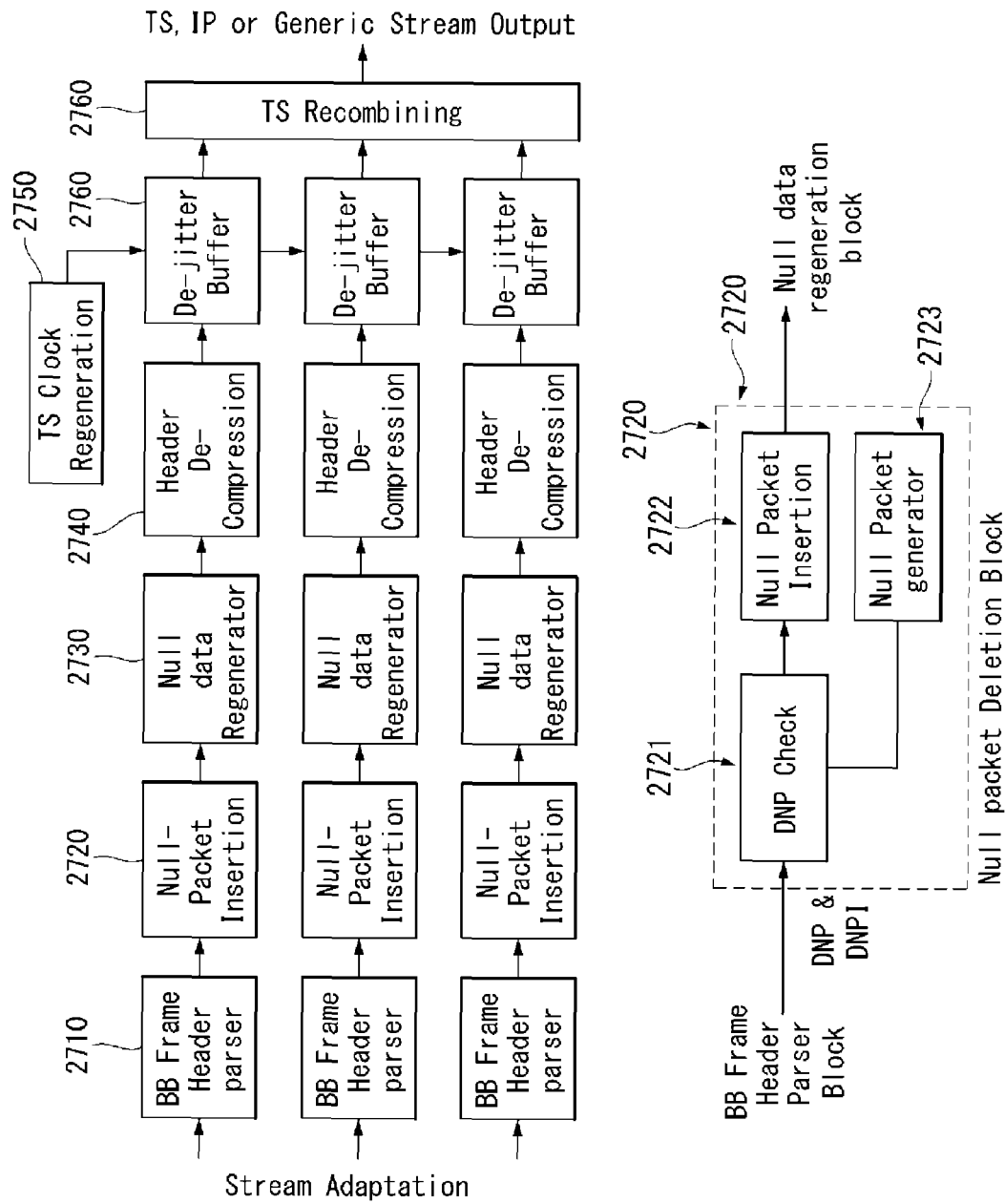

More specifically, FIG. 27(a) illustrates an example of an internal block diagram of the mode adaptation module, and FIG. 27(b) illustrates an example of an internal block diagram of the null packet insertion block of FIG. 27(a).

As illustrated in FIG. 27(a), the mode adaptation module of the reception apparatus may be configured to include at least one of BB frame header parser blocks 2710, null packet insertion blocks 2720, null data regenerator blocks 2730, header de-compression blocks 2740, a TS clock regeneration block 2750, de-jitter buffer blocks 2760, and a TS recombining block 2770.

An element(s) other than the elements of FIG. 27(a) may be added to the mode adaptation module of the reception apparatus, or some of the elements of FIG. 27(a) may be omitted from the elements of FIG. 27(a).

The null data regenerator block 2730 may be an element corresponding to the null data reuse block of the transmission apparatus. The null data regenerator block 2730 may send output to the header de-compression block 2740. In some embodiments, the null data regenerator block 2730 may be omitted.

The header de-compression block 2740 may be an element corresponding to the header compression block of the transmission apparatus. The header de-compression block may restore a compressed packet header. As described above, a packet header may have been compressed in order to transfer efficiency of a TS or IP input stream. In some embodiments, the header de-compression block 2740 may be placed ahead of the null packet insertion block 2720.

The null packet insertion block 2720 may be placed next the BB frame header parser block 2710. The null packet insertion block 2720 accurately inserts deleted null packets into their original locations using a DNP counter (or a DNP) with respect to the null packets deleted by the null packet deletion block of the transmission apparatus.

As illustrated in FIG. 27(b), the null packet insertion block 2720 may be configured to include at least one of a DNP check (sub) block 2721, a null packet insertion (sub) block 2722, and a null packet generator (sub) block 2723.

Likewise, the term "block" may also be represented as a "module" or a "unit".

The DNP check block 2721 obtains a DNP and a DNPI from the BB frame header parser block.

Furthermore, the DNP check block 2721 transfers the obtained DNP and DNPI to the null packet insertion block 2722.

The null packet insertion block 2722 receives a previously generated null packet from the null packet generator block 2723 and inserts null packets into their original locations using the DNP and DNPI received from the DNP check block 2721.

Hereinafter, a method of indicating whether a null packet is present or not using the error indicator of a TS packet header, proposed by the present invention, as a DNPI and deleting a null packet by inserting a DNP indicative of the number of null packets only when a null packet is present is described in detail.

First, a conventional TS packet header format and a conventional method of deleting null packets are described with reference to FIGS. 28 and 29.

FIG. 28 is a diagram illustrating an example of the conventional TS packet header format.

As illustrated in FIG. 28, the TS packet header may be configured to include a transport error indicator field, a payload unit start indicator (SI) field, a transport priority (TP) field, a packet identifier (PID) field, a scrambling control (SC) field, an adaptation field control (AFC) field, a continuity counter (CC) field, etc.

The transport error indicator field is used as an indicator that is used for a reception apparatus to notify a transmission apparatus whether an error has occurred by placing marking in the error indicator when an error occurs in a signal after receiving the signal.

The error indicator is always set to "0" and transmitted because the transmission apparatus assumes an error-free situation when sending a signal.

The payload unit SI field is indicative of a location where the payload of a TS packet is started.

The TP field is indicative of the TP of a TS packet.

The PID field is indicative of an identifier (ID) for identifying a TS packet.

FIG. 29 is a diagram illustrating an example of a conventional method of deleting null packets.

Figures 29A, 29B:
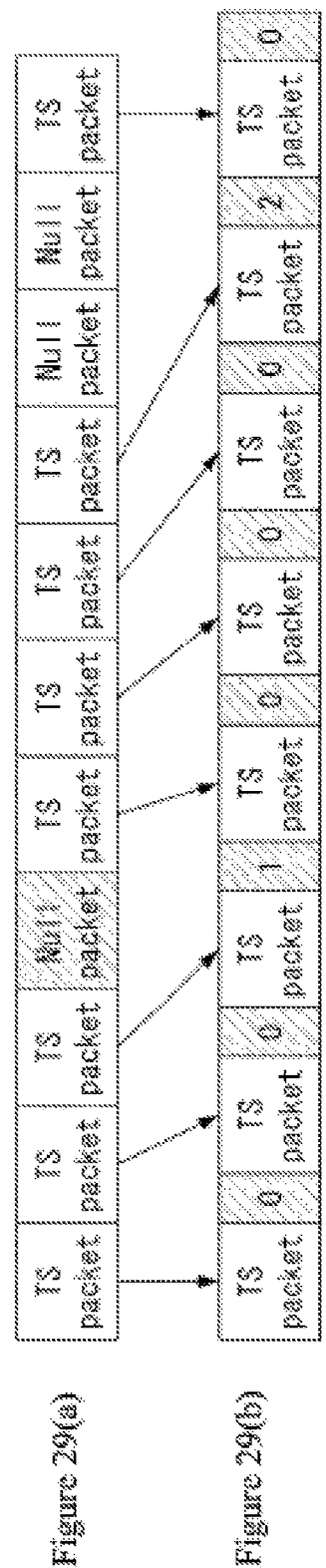
FIG. 29(a) and FIG. 29(b) are diagrams illustrating an example of a conventional method of deleting null packets.

As illustrated in FIG. 29(a), in the conventional method of deleting null packets, if null packets are present in a TS stream, the null packets are deleted, and a specific field of a specific byte size (or a specific byte) is inserted into a location from which the null packet has been deleted in order to be indicative of the number of deleted null packets.

In this case, the specific field may be a deleted null packet (DNP), and the size of the specific field may be a size of 1 byte (8 bits). If the size of the specific field is 1 byte, a total number of null packets that may be deleted are 255.

The reception apparatus may restore null packets, deleted by the transmission apparatus, through the specific field, that is, a DNP.

As illustrated in FIG. 29(b), in the conventional method of deleting null packets, a DNP is always inserted between TS packets irrespective of whether a null packet is present or not. That is, a DNP is always inserted between a current TS packet and a next TS packet.

That is, although a null packet is not present in a TS stream, a DNP is placed (or inserted) ahead of a next TS packet. In this case, the DNP is set to "0."

Furthermore, if a null packet is present in a TS stream, the null packet is deleted, and a DNP is inserted into the location of the deleted null packet, that is, ahead of a next TS packet. In this case, the DNP is set to a value corresponding to the number of deleted null packets.

For example, if a single null packet is deleted, a DNP is set to "1." If two null packets are deleted, a DNP is inserted into a location from which the two null packets have been deleted. In this case, the DNP is set to "2."

As described above, in the conventional method of deleting null packets in FIG. 29, although a null packet is not present in a TS stream, a DNP of 1 byte is always added. This results in overhead in the transmission of a TS stream.

Furthermore, as illustrated in FIG. 29, in a TS stream not including many null packets, DNPs of 8 bytes are added, thereby resulting great overhead in transmission.

That is, in FIG. 29, a DNP indicative of the number of null packets is always inserted into a TS stream irrespective of whether a null packet is present or not in the TS stream. Accordingly, if the number of null packets is small, overhead is generated when a TS stream is transmitted. Furthermore, in a method of inserting a DNP only when a null packet is present using a separate header, overhead is also generated when a TS stream is transmitted if null packets are frequently generated.

A method of deleting null packets through a method of inserting a DNP only when a null packet is present using the error indicator field (1 bit) of a TS packet header as a DNPI, proposed by the present invention, is described in detail with reference to FIGS. 30 to 32.

FIG. 30 is a diagram illustrating an example of the format of a TS packet header proposed by the present invention.

As illustrated in FIG. 30, the TS packet header may be configured to include a deleted null packet indicator (DNPI) field, a payload unit start indicator (SI) field, a transport priority (TP) field, a packet identifier (PID) field, a scrambling control (SC) field, an adaptation field control (AFC) field, and a continuity counter (CC) field.

The DNPI field is indicative of whether a null packet is present or not. The DNPI field provides notification of whether a packet subsequent to (or placed behind) a TS packet including the DNPI field is a null packet and may be represented as a size of 1 bit.

For example, if the DNPI field is set to "1", it indicates that a null packet is present. More specifically, it indicates that a TS packet subsequent to a TS packet including the DNPI field is a null packet.

For another example, if the DNPI field is set to "1", it indicates that a null packet is deleted and a DNP indicative of the number of null packets is inserted into a location from which the null packet has been deleted.

If the DNPI field is set to "0", it indicates that a null packet is not present. More specifically, it indicates that a TS packet subsequent to a TS packet including the DNPI field is not a null packet.

If the DNPI field is set to "0", a DNP is not inserted.

The payload unit SI field, the TP field, the PID field, the SC field, the AFC field, and the CC field have been described with reference to FIG. 28, and thus detailed descriptions thereof are omitted.

FIG. 31 is a diagram illustrating another example of the format of a TS packet header proposed by the present invention.

More specifically, FIG. 31 illustrates an example of the format of a TS packet header including a DNPI field if a TS packet header is compressed, in particular, if a PID is compressed.

The compression of a PID is applied to a case where a single data pipe DP includes a single TS packet stream.

The single TS packet stream includes the PID value of a single program map table (PMT) packet and one or more service packets having different PIDs.

As illustrated in FIG. 31, the TS packet header may include a DNPI field, an SI field, a TP field, a PID-sub field, an SC field, an AFC field, and a CC field.

The DNPI field, SI field, TP field, SC field, AFC field, and CC field have been described in detail with reference to FIGS. 28 and 30, and thus detailed descriptions thereof are omitted.

The PID-sub field is indicative of a PID value after a PID field is compressed.

For example, if the PID field is 13 bits, a PID-sub field after PID compression may have a size of 5 bits or 8 bits.

FIG. 32 is a diagram illustrating yet another example of the format of a TS packet header proposed by the present invention.

More specifically, FIG. 32 illustrates an example of the format of a TS packet header including a DNPI field if the TS packet header is compressed, in particular, if a PID is deleted.

As illustrated in FIG. 32, the TS packet header may include a DNPI field, an SI field, a TP field, an SC field, an AFC field, and a sync. continuity counter field.

The sync. continuity counter field is indicative of a field that replaces the continuity counter field of FIGS. 30 and 31 due to the deletion of a PID.

FIG. 33 is a diagram illustrating an example of a method of deleting null packets using the DNPI field of FIGS. 30 to 32.

A TS packet stream (or a TS stream) input as a null packet deletion block is assumed to be that illustrated in FIG. 33(a).

In such a case, the TS packet stream of FIG. 33(a) may be output as a TS packet stream, such as that of FIG. 33(b), through the null packet deletion block.

More specifically, each TS packet includes a DNPI field indicative of whether a next packet is a null packet through the null packet deletion block.

As described above with reference to FIGS. 30 to 32, the DNPI field may be included at a specific location of each TS packet header.

Furthermore, a null packet present in a TS packet stream is deleted, and a DNP indicative of the number of deleted null packets is inserted into a location from which the null packet has been deleted.

The value of the DNP may be set as a value counted by the DNP counter.

As illustrated in FIG. 33(b), if the value of a DNPI field is "0", a next packet including a DNPI corresponds to a TS packet other than a null packet. Accordingly, a DNP is not inserted because there is no deleted null packet.

Furthermore, if the value of the DNPI field is "1", a null packet is deleted because a next packet including a DNPI corresponds to the null packet. Thus, a DNP set as a value of "1" or "2" is placed at a location from which the null packet has been deleted.

In this case, if the DNP is "1", it indicates that the number of deleted null packets is 1. If the DNP is "2", it indicates that the number of deleted null packets is 2.

The structure of a DNP inserted into a location from which a null packet is deleted through the null packet deletion block proposed by the present invention is described in detail.

First, the structure of a conventional DNP is described with reference to FIG. 34.

FIG. 34 is a diagram illustrating an example of the conventional DNP structure.

As illustrated in FIG. 34, a DNP is inserted between TS packets irrespective of whether a null packet is present or not in a TS stream.

That is, although a null packet is not present between TS packets, a DNP is inserted and the value of the inserted DNP is set to "0".

Likewise, if a null packet is present between TS packets, a DNP is inserted and the value of the inserted DNP is set as a value indicative of the number of (deleted) null packets.

Figures 34A, 34B:
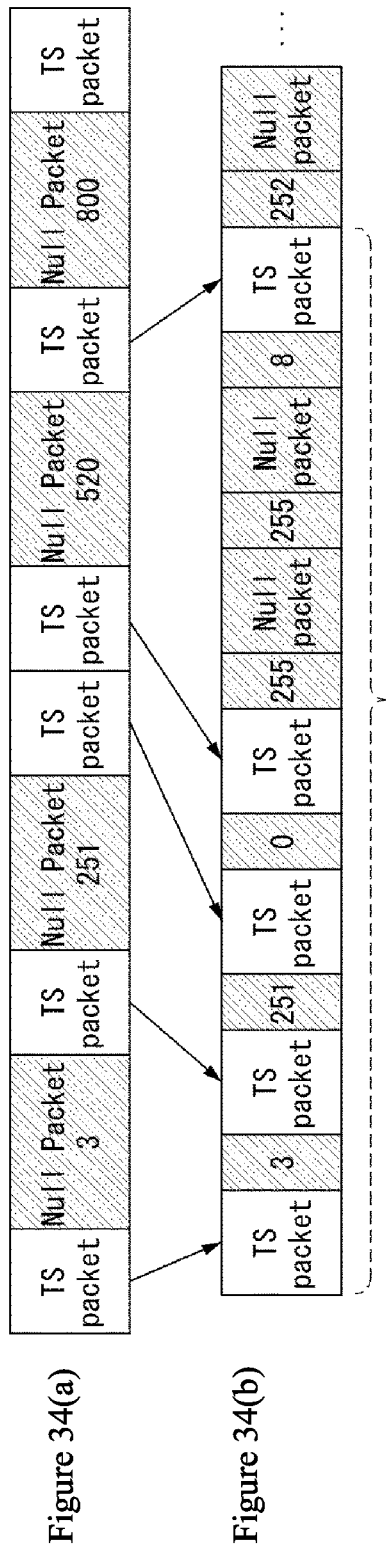
FIG. 34(a) and FIG. 34(b) are diagrams illustrating an example of a conventional DNP structure.

If a TS (packet) stream includes at least one TS packet and at least one null packet as illustrated in FIG. 34(a), it may be seen that a DNP is inserted between TS packets as illustrated in FIG. 34(b).

In this case, the DNP is composed of 8 bits, and the number of null packets deleted through the DNP may be represented as up to a total number of 255.

If the number of deleted null packets is 256, the number of deleted null packets is represented as a plurality of DNP values of 255 or less using a method of adding null packets and/or other DNPs.

As illustrated in FIG. 34(b), if the number of deleted null packets is 255 or less, the number of null packets may be represented using a single DNP.

That is, if the number of null packets is 3, a DNP has a value of "3". If the number of null packets is 251, a DNP has a value of "251".

It may be seen that if the number of null packets is 256 or more, at least one DNP and/or at least one null packet is added.

That is, if the number of null packets is 520, the structure of a DNP inserted into a place from which the 520 null packets have been deleted may be configured to (sequentially) include a first DNP having a value of "255", a first null packet, a second DNP having a value of "255", a second null packet, and a third DNP of an '8' value.

As described above, if a single null packet is added as in FIG. 34, 188 null bytes are transmitted.

The length of a single packet corresponds to 188 bytes.

Accordingly, an unnecessary packet of 188 bytes is transmitted due to the transmission of an additional null packet.

In FIG. 34(a), if a TS packet stream from a TS packet 1 to a TS packet 5 is transmitted, 382 bytes are additionally transmitted by the null packet deletion block, as illustrated in FIG. 34(b).

382 bytes=2 null packets: 376 bytes (188 bytes*2)+6 DNPs ("3", "251", "0", "255", "255", "8"): 6 bytes As described above, in the conventional method of deleting null packets illustrated in FIG. 34, if the number of null packets is 255 or less, the null packets may be represented using a single DNP. If the number of null packets is 256 or more, however, a DNP structure must be generated by additionally increasing at least one null packet and/or at least one DNP.

Furthermore, although there is no null packet, a DNP having a size of 1 byte has to be set to "0" and inserted between TS packets.

That is, as illustrated in FIG. 34(b), if the number of null packets is 520, a DNP structure including a first DNP field indicative of 255 null packets, a single null packet, a second DNP indicative of 255 null packets, a signal null packet, and a third DNP field indicative of 8 null packets may be generated in order to represent the total number of 520 null packets.

A method of generating a DNP structure using two DNPs (e.g., a first DNP and a second DNP) each having a size of 1 byte in order to reduce overhead in the transmission of a TS packet stream attributable to the addition of unnecessary null packets and/or DNPs is described below with reference to FIGS. 35 and 36.

FIG. 35 illustrates an example of a DNP structure proposed by the present invention.

FIG. 35 illustrates an example of a DNP structure for representing the number of null packets using two DNPs, for example, a first DNP and a second DNP.

The DNP structure may also be represented as a DNP counter structure. That is, the DNP structure may be considered to be the format of a DNP for representing the number of null packets.

From FIG. 35(a), it may be seen that a single DNP field is used if the number of null packets is a specific number or less and two DNPs, that is, a first DNP and a second DNP, are used if the number of null packets is a specific number or more.

A value of the first DNP and/or the second DNP and a range of the value depending on a total number of null packets are illustrated in Table 34.

That is, Table 34 illustrates an example of a DNP structure (or a DNP counter structure) capable of representing the number of null packets using a total number of 2 bytes.

TABLE 34

| Number of null packets | First DNP | Second DNP | Total DNP |
|---|---|---|---|
| 0~249 | 0~249 | Not used | 0~249 |
| 250~499 | 250 | 0~249 | 250~499 |
| 500~749 | 251 | 0~249 | 500~749 |
| 750~999 | 252 | 0~249 | 750~999 |
| 1000~1249 | 253 | 0~249 | 1000~1249 |
| 1250~1499 | 254 | 0~249 | 1250~1499 |
| 1500~1749 | 255 | 0~249 | 1500~1749 |

From Table 34, it may be seen that a DNP has a structure capable of using two DNPs (i.e., a first DNP and a second DNP) depending on the number of null packets.

If the number of null packets is 0~249, the null packets may be represented using only a first DNP having a size of 1 byte.

In contrast, if the number of null packets is 250~1749, a DNP may represent the number of null packets using a first DNP and a second DNP.

That is, if the number of null packets is a specific number or more, a DNP structure includes a first DNP and a second DNP.

More specifically, if the number of null packets is 250~499, a DNP structure is represented using a first DNP and a second DNP, the first DNP may be set to "250", and the second DNP may be represented as a value obtained by subtracting the value of the first DNP from the number of null packets. That is, the second DNP is represented as a value of 0~249 value.

For example, if the number of null packets is 251, a DNP structure generated through the null packet deletion block may be represented using a first DNP=250 and a second DNP=1.

In this case, "the first DNP=250" means that the number of null packets starts from 250 and a total number of null packets are represented by a combination of the value of the first DNP and the value of the second DNP.

Furthermore, if the number of null packets is 500~749, a DNP structure is represented using a first DNP and a second DNP, the first DNP is set to "251", and the second DNP is represented as a value obtained by subtracting the value of the first DNP from the number of null packets. Likewise, the second DNP may be represented in a range of 0~249.

For example, if the number of null packets is 520, a DNP structure generated through the null packet deletion block may be represented using a first DNP=251 and a second DNP=20.

In this case, "the first DNP=251" means that the number of null packets starts from 500 and a total number of null packets are represented by a combination of the value of the first DNP and the value of the second DNP.

Furthermore, if the number of null packets is 750~999, a DNP structure is represented using a first DNP and a second DNP, the first DNP is set to "252", and the second DNP is represented as a value obtained by subtracting the value of the first DNP from the number of null packets. Likewise, the second DNP may be represented in a range of 0~249.

For example, if the number of null packets is 800, a DNP structure generated through the null packet deletion block may be represented using a first DNP=252 and a second DNP=50.

In this case, "the first DNP=252" means that the number of null packets starts from 750 and a total number of null packets are represented by a combination of the value of the first DNP and the value of the second DNP.

As illustrated in Table 34, a total number of 1749 null packets can be represented using 2 bytes by dividing the first DNP up to 255 and the second DNP up to 0~249.

Table 34 is only an example. In order to increase a total number of null packets that may be represented, the range of the first DNP may be set small or the range of the first DNP may be set great.

FIG. 36 is a diagram illustrating an example of a method of deleting null packets using the DNP structure of FIG. 35.

Figures 36A, 36B:
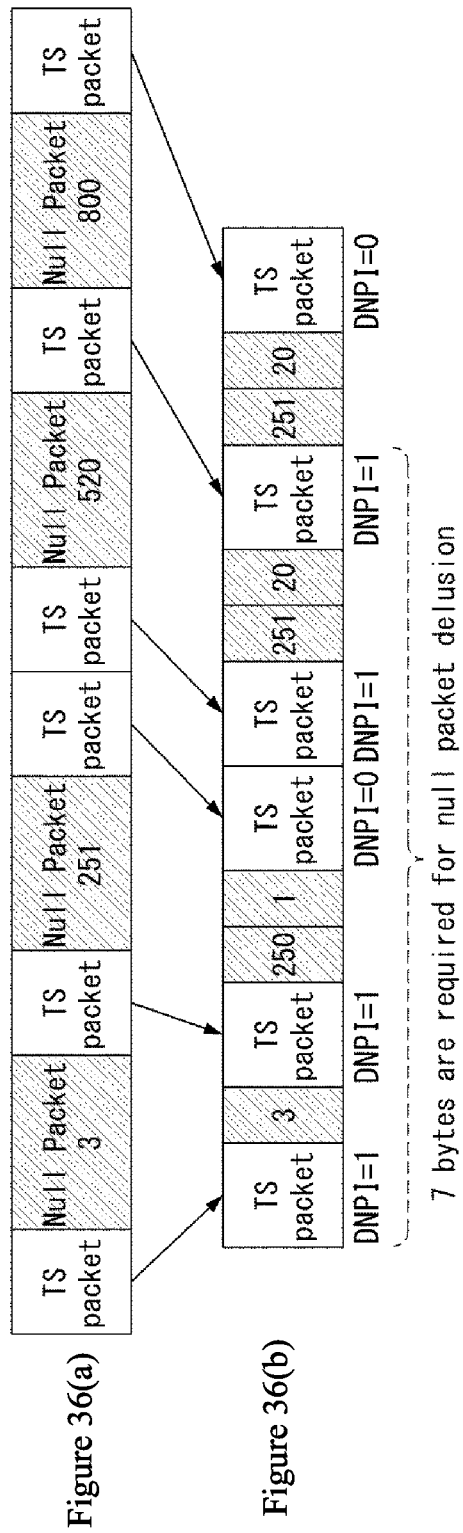
FIG. 36(a) and FIG. 36(b) are diagrams illustrating an example of a method of deleting null packets using the DNP structure of FIG. 35.

FIG. 36(a) illustrates a TS packet stream including at least one TS packets and at least one null packet, and FIG. 36(b) illustrates a TS packet stream, that is, a result of the TS packet stream of FIG. 36(a) output through the null packet deletion module.

From FIG. 36(b), it may be seen that each TS packet includes a DNPI field, the DNPI field has a value of "1" if a TS packet subsequent to a TS packet is a null packet, and the DNPI field has a value of "0" if a TS packet subsequent to a TS packet is a TS packet other than a null packet.

It may also be seen that a DNP structure has one or two DNPs at a location from which null packets have been deleted through the DNP structure of Table 34.

Referring to FIG. 36(b), if the number of null packets is 3, it corresponds to the case where the number of null packets is 250 or less in Table 34. Accordingly, the number of null packets may be represented using only a first DNP (i.e., the first DNP=3).

Furthermore, if the number of null packets is 251, it corresponds to the case where the number of null packets is 250~499 in Table 34. Accordingly, the number of null packets may be represented using a first DNP (=250) and a second DNP (=1).

Furthermore, if the number of null packets is 520, it corresponds to the case where the number of null packets is 500~749 in Table 34. Accordingly, the number of null packets may be represented using a first DNP (=251) and a second DNP (=20).

Furthermore, if the number of null packets is 800, it corresponds to the case where the number of null packets is 750~999 in Table 34. Accordingly, the number of null packets may be represented using a first DNP (=252) and a second DNP (=60).

As described above, if the number of null packets is represented using the conventional method of FIG. 34, 382 bytes are additionally required. If the number of null packets is represented using the method of FIGS. 35 and 36 proposed by the present invention, however, the same function can be performed by adding only 5 bytes.

The aforementioned DNP structures depending on the number of null packets are illustrated in Table 35.

TABLE 35

| Number of null packets | First DNP | Second DNP | Total DNP |
|---|---|---|---|
| 3 | 3 | — | 3 |
| 251 | 250 | 1 | 250 + 1 = 251 |
| 520 | 251 | 20 | 500 + 20 = 520 |
| 800 | 252 | 50 | 750 + 50 = 800 |

The present invention may be applied to a method and apparatus for receiving and sending broadcast signals.

Both the apparatus and method inventions described in the present invention and the descriptions of both the apparatus and method inventions may be complementarily applicable to each other.

It will be appreciated by those skilled in the art that various modifications and variations may be made in the present invention without departing from the spirit or scope of the inventions. Thus, it is intended that the present invention covers the modifications and variations of this invention provided they come within the scope of the appended claims and their equivalents.

What is claimed is:

1. A method for transmitting a broadcast signal by an apparatus for transmitting broadcast signals, comprising:
    formatting input stream to output physical layer pipe (PLP) data, wherein the input stream includes at least one null packet and data packets, wherein the formatting of the input stream comprises:
    deleting the at least one null packet in the input stream, and
    counting a number of the deleted null packet;
    encoding the PLP data;
    generating a signal frame including the PLP data; and
    modulating the signal frame by an orthogonal frequency division multiplexing (OFDM) scheme,
    wherein when the number of the deleted null packet is a first number or less, the number of the deleted null packet is indicated by a first value of a first field,
    wherein when the number of the deleted null packet is a second number more than the first number, the number of the deleted null packet is indicated by a second value of the first field and a value of a second field, and
    wherein one or more data packets follow the first field and the second field.

2. The method of claim 1, when the number of the deleted null packet is the first number or less, the first value of the first field is set as the counted number of the deleted null packet.

3. The method of claim 2, when the number of the deleted null packet is the second number more than the first number, the second value of the first field is set as a specific value other than a counted number of the deleted null packet.

4. The method of claim 3, wherein the specific value is not same as a value obtained by subtracting the value of the second field from the counted number.

5. The method of claim 4, wherein the specific value is less than a value obtained by subtracting the value of the second field from the counted number.

6. A transmission apparatus for transmitting a broadcast signal, comprising:
    an input formatting module configured to format input stream to output physical layer pipe (PLP) data, wherein the input stream includes at least one null packet and data packets, wherein the input formatting module is configured to:
    delete the at least one null packet in the input stream, and count a number of the deleted null packet;
    a bit interleaved coding and modulation (BICM) module configured to encode the PLP data;
    a frame building module configured to generate a signal frame including the PLP data; and
    an orthogonal frequency division multiplexing (OFDM) generation module configured to the signal frame by an orthogonal frequency division multiplexing (OFDM) scheme,
    wherein when the number of the deleted null packet is a first number or less, the number of the deleted null packet is indicated by a first value of a first field, and
    wherein when the number of the deleted null packet is a second number more than the first number, the number of the deleted null packet is indicated by a second value of the first field and a value of a second field.

7. The method of claim 6, when the number of the deleted null packet is the first number or less, the first value of the first field is set as the counted number of the deleted null packet.

8. The method of claim 6, when the number of the deleted null packet is the second number more than the first number, the second value of the first field is set as a specific value other than a counted number of the deleted null packet.

9. The method of claim 8, wherein the specific value is not same as a value obtained by subtracting the value of the second field from the counted number.

10. The method of claim 9, wherein the specific value is less than a value obtained by subtracting the value of the second field from the counted number.

* * * * *